United States Patent
Fettes et al.

(10) Patent No.: US 11,662,895 B2
(45) Date of Patent: May 30, 2023

(54) AUDIO MEDIA PLAYBACK USER INTERFACE

(71) Applicant: Apple Inc., Cupertino, CA (US)

(72) Inventors: Alastair K. Fettes, San Francisco, CA (US); Sherry T. Shao, North Vancouver (CA)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/994,438

(22) Filed: Aug. 14, 2020

(65) Prior Publication Data

US 2022/0050586 A1 Feb. 17, 2022

(51) Int. Cl.
*G06F 3/04847* (2022.01)
*G06F 16/683* (2019.01)
*G06F 3/16* (2006.01)
*G06F 3/0488* (2022.01)
*G06F 3/0485* (2022.01)

(52) U.S. Cl.
CPC ........ *G06F 3/04847* (2013.01); *G06F 3/0485* (2013.01); *G06F 3/0488* (2013.01); *G06F 3/167* (2013.01); *G06F 16/685* (2019.01)

(58) Field of Classification Search
CPC .. G06F 3/04847; G06F 3/0485; G06F 3/0488; G06F 3/167; G06F 16/685
See application file for complete search history.

(56) References Cited

U.S. PATENT DOCUMENTS

| | | | |
|---|---|---|---|
| 9,087,508 B1 | 7/2015 | Dzik | |
| 9,503,675 B2* | 11/2016 | Choi | H04N 5/232933 |
| 9,927,957 B1 | 3/2018 | Sagar et al. | |
| 10,701,434 B1 | 6/2020 | Jindal et al. | |
| 2007/0266304 A1* | 11/2007 | Fletcher | G06F 40/169 |
| | | | 715/230 |
| 2013/0297308 A1* | 11/2013 | Koo | G06F 3/167 |
| | | | 704/235 |
| 2014/0033040 A1* | 1/2014 | Thomas | G09B 5/06 |
| | | | 715/721 |
| 2014/0149861 A1 | 5/2014 | Shih et al. | |
| 2014/0201004 A1* | 7/2014 | Parundekar | G06Q 30/0271 |
| | | | 705/14.62 |
| 2015/0019969 A1 | 1/2015 | Lee et al. | |
| 2015/0113407 A1 | 4/2015 | Hoffert et al. | |
| 2015/0128044 A1 | 5/2015 | Lee et al. | |
| 2016/0299648 A1* | 10/2016 | Migos | G06F 3/0483 |

(Continued)

OTHER PUBLICATIONS

Antonelli Darlene, "How to Bookmark on Audible", Simple Ways to Bookmark on Audible: 7 Steps (with Pictures), wikiHow, to do anything, Online Available at: <https://www.wikihow.com/Bookmark-on-Audible>, Nov. 11, 2019, 2 pages.

(Continued)

*Primary Examiner* — Tan H Tran

(74) *Attorney, Agent, or Firm* — DLA Piper LLP (US)

(57) ABSTRACT

The present disclosure generally relates to a media playback user interface. In some examples, the media playback user interface displays text corresponding to speech of audio content. In some examples, the media playback user interface facilitates management of bookmarks corresponding to the audio content. In some examples, the media playback user interface enables a search for text corresponding to speech of the audio content.

27 Claims, 39 Drawing Sheets

(56) References Cited

U.S. PATENT DOCUMENTS

| | | | |
|---|---|---|---|
| 2016/0328104 A1 | 11/2016 | Chandra | |
| 2017/0336955 A1* | 11/2017 | Cho | H04N 21/41407 |
| 2018/0357245 A1 | 12/2018 | Garg et al. | |
| 2019/0005959 A1 | 1/2019 | Cameron et al. | |
| 2019/0204998 A1 | 7/2019 | Hartrell et al. | |
| 2020/0296317 A1* | 9/2020 | Post, Jr. | G06F 3/0488 |
| 2020/0371675 A1 | 11/2020 | Sung | |
| 2021/0064327 A1* | 3/2021 | Ispahani | G10L 15/26 |
| 2022/0050585 A1 | 2/2022 | Fettes et al. | |

OTHER PUBLICATIONS

Audible Inc., "Can I Use Clips to Go Back to the Saved Locations of an Audiobook on My Android Device?", Android Devices, US Help Center, Online Available at: <https://audible.custhelp.com/app/answers/detail/a_id/8048/related/1>, 1997-2020, 2 pages.

Audible Inc., "How Can I navigate Through the Chapters of an Audiobook on the iPod Shuffle?", US Help Center, Online Available at: <https://audible.custhelp.com/app/answers/detail/a_id/5016/~/how-can-i-navigate-through-the-chapters-of-an-audiobook-on-the-ipod-shuffle%3F>, 1997-2020, 1 page.

Audible Inc., "How Do I Save an Audio Clip in the Audible for Android App?", US Help Center, Android Devices, Online Available at: <https://audible.custhelp.com/app/answers/detail/a_id/4796/~/how-do-i-save-an-audio-clip-in-the-audible-for-android-app%3F>, 1997-2020, 2 pages.

Audible Inc., "Voice Commands for Listening on Alexa Devices", Amazon Devices, US Help Center, Online Available at: <https://audible.custhelp.com/app/answers/detail/a_id/4691/related/1>, 1997-2020, 4 pages.

Hardwick Tim, "How to Search for Songs Using Lyrics in Apple Music", MacRumors, Online Available at: <https://www.macrumors.com/how-to/search-for-songs-using-lyrics-apple-music/>, Feb. 20, 2019, 9 pages.

"Listen to Audiobooks in Apple Books, Apple Support", Online Available at: <https://support.apple.com/en-us/HT208929>, Mar. 24, 2020, 4 pages.

"View Lyrics in Apple Music", Apple Support, Online Available at: <https://support.apple.com/en-us/HT204459>, Sep. 16, 2020, 5 pages.

Non-Final Office Action received for U.S. Appl. No. 16/994,434, dated Jun. 9, 2021, 17 pages.

Applicant-Initiated Interview Summary received for U.S. Appl. No. 16/994,434, dated Aug. 24, 2021, 4 pages.

Final Office Action received for U.S. Appl. No. 16/994,434, dated Jan. 19, 2022, 35 pages.

International Search Report and Written Opinion received for PCT Patent Application No. PCT/US2021/045934, dated Dec. 23, 2021, 21 pages.

Invitation to Pay Additional Fees received for PCT Patent Application No. PCT/US2021/045934, dated Nov. 2, 2021, 15 pages.

International Preliminary Report on Patentability received for PCT Patent Application No. PCT/US2021/045934, dated Feb. 23, 2023, 16 pages.

* cited by examiner

AUDIO MEDIA PLAYBACK USER INTERFACE

FIELD

The present disclosure relates generally to computer user interfaces, and more specifically to techniques for managing audio media playback.

BACKGROUND

A computer system has the ability to control output of audio for a variety of media files, such as music files, audiobook files, video files, and/or other multimedia files. For example, the computer system is configured to play audio of the media files, pause audio of the media files, and/or skip audio of the media files based on user inputs on a user interface.

BRIEF SUMMARY

Some techniques for managing a media playback application using computer systems, however, are generally cumbersome and inefficient. For example, some existing techniques do not display a visual indication of text corresponding to speech in an audio file, such that a user may experience difficulty locating particular speech content in the audio. In addition, some existing techniques use a complex and time-consuming user interface for playing back audio files or for navigating to a specific portion of an audio file, which may include multiple key presses or keystrokes. Existing techniques require more time than necessary, wasting user time and device energy. This latter consideration is particularly important in battery-operated devices.

Accordingly, the present technique provides computer systems with faster, more efficient methods and interfaces for managing a media playback application. Such methods and interfaces optionally complement or replace other methods for managing a media playback application. Such methods and interfaces reduce the cognitive burden on a user and produce a more efficient human-machine interface. For battery-operated computing devices, such methods and interfaces conserve power and increase the time between battery charges. Additionally, such methods and interfaces reduce a number of unnecessary, extraneous, and/or repetitive inputs for playing back a particular portion of an audio file.

Example methods are disclosed herein. An example method includes, at a computer system that is in communication with a display generation component and one or more input devices: displaying, via the display generation component, a media playback interface that includes a set of one or more media playback control user interface objects, where the set of one or more media playback control user interface objects includes a selectable playback position indicator; and while the media playback interface is configured to control playback of a first media item, where the first media item includes audio content that includes speech: detecting, via the one or more input devices, a first input corresponding to the selectable playback position indicator; and in response to detecting the first input: moving the selectable playback position indicator from a first position that corresponds to a first playback time of the first media item to a second position that corresponds to a second playback time of the first media item; and displaying, via the display generation component, first text representing speech of the audio content of the first media item that corresponds to the second playback time.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: displaying, via the display generation component, a media playback interface that includes a set of one or more media playback control user interface objects, where the set of one or more media playback control user interface objects includes a selectable playback position indicator; and while the media playback interface is configured to control playback of a first media item, where the first media item includes audio content that includes speech: detecting, via the one or more input devices, a first input corresponding to the selectable playback position indicator; and in response to detecting the first input: moving the selectable playback position indicator from a first position that corresponds to a first playback time of the first media item to a second position that corresponds to a second playback time of the first media item; and displaying, via the display generation component, first text representing speech of the audio content of the first media item that corresponds to the second playback time.

Example transitory computer-readable storage media are described herein. An example transitory computer-readable storage medium stores one or more programs configured to be executed by one or more processors of a computer system that is in communication with a display generation component and one or more input devices, the one or more programs including instructions for: displaying, via the display generation component, a media playback interface that includes a set of one or more media playback control user interface objects, where the set of one or more media playback control user interface objects includes a selectable playback position indicator; and while the media playback interface is configured to control playback of a first media item, where the first media item includes audio content that includes speech: detecting, via the one or more input devices, a first input corresponding to the selectable playback position indicator; and in response to detecting the first input: moving the selectable playback position indicator from a first position that corresponds to a first playback time of the first media item to a second position that corresponds to a second playback time of the first media item; and displaying, via the display generation component, first text representing speech of the audio content of the first media item that corresponds to the second playback time.

Example computer systems are described herein. An example computer system includes a display generation component; one or more input devices; one or more processors; and memory storing one or more programs configured to be executed by the one or more processors, the one or more programs including instructions for: displaying, via the display generation component, a media playback interface that includes a set of one or more media playback control user interface objects, where the set of one or more media playback control user interface objects includes a selectable playback position indicator; and while the media playback interface is configured to control playback of a first media item, where the first media item includes audio content that includes speech: detecting, via the one or more input devices, a first input corresponding to the selectable playback position indicator; and in response to detecting the first input: moving the selectable playback position indicator from a first position that corresponds to a first playback time of the first media item to a second position that corresponds to a second playback time of the first media item; and displaying, via the display generation component, first text representing speech of the audio content of the first media item that corresponds to the second playback time.

An example computer system includes: a display generation component; one or more input devices; means for displaying, via the display generation component, a media playback interface that includes a set of one or more media playback control user interface objects, where the set of one or more media playback control user interface objects includes a selectable playback position indicator; and while the media playback interface is configured to control playback of a first media item, where the first media item includes audio content that includes speech: means for detecting, via the one or more input devices, a first input corresponding to the selectable playback position indicator; and in response to detecting the first input: means for moving the selectable playback position indicator from a first position that corresponds to a first playback time of the first media item to a second position that corresponds to a second playback time of the first media item; and means for displaying, via the display generation component, first text representing speech of the audio content of the first media item that corresponds to the second playback time.

Example methods are disclosed herein. An example method includes, at a computer system that is in communication with a display generation component and one or more input devices: displaying, via the display generation component, a media playback interface; and while the media playback interface is configured to control playback of a first media item, where the first media item includes audio content that includes speech: displaying, via the display generation component, a selectable playback bookmark indicator; detecting, via the one or more input devices, a first user input corresponding to the selectable playback bookmark indicator; and in response to detecting the first user input, outputting audio content of the first media item from a first playback time that corresponds to speech that is at a start of a first instance of a grammatical structure of a first type, where the grammatical structure of the first type includes a plurality of words.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: displaying, via the display generation component, a media playback interface; and while the media playback interface is configured to control playback of a first media item, where the first media item includes audio content that includes speech: displaying, via the display generation component, a selectable playback bookmark indicator; detecting, via the one or more input devices, a first user input corresponding to the selectable playback bookmark indicator; and in response to detecting the first user input, outputting audio content of the first media item from a first playback time that corresponds to speech that is at a start of a first instance of a grammatical structure of a first type, where the grammatical structure of the first type includes a plurality of words.

Example transitory computer-readable storage media are described herein. An example transitory computer-readable storage medium stores one or more programs configured to be executed by one or more processors of a computer system that is in communication with a display generation component and one or more input devices, the one or more programs including instructions for: displaying, via the display generation component, a media playback interface; and while the media playback interface is configured to control playback of a first media item, where the first media item includes audio content that includes speech: displaying, via the display generation component, a selectable playback bookmark indicator; detecting, via the one or more input devices, a first user input corresponding to the selectable playback bookmark indicator; and in response to detecting the first user input, outputting audio content of the first media item from a first playback time that corresponds to speech that is at a start of a first instance of a grammatical structure of a first type, where the grammatical structure of the first type includes a plurality of words.

Example computer systems are described herein. An example computer system includes a display generation component; one or more input devices; one or more processors; and memory storing one or more programs configured to be executed by the one or more processors, the one or more programs including instructions for: displaying, via the display generation component, a media playback interface; and while the media playback interface is configured to control playback of a first media item, where the first media item includes audio content that includes speech: displaying, via the display generation component, a selectable playback bookmark indicator; detecting, via the one or more input devices, a first user input corresponding to the selectable playback bookmark indicator; and in response to detecting the first user input, outputting audio content of the first media item from a first playback time that corresponds to speech that is at a start of a first instance of a grammatical structure of a first type, where the grammatical structure of the first type includes a plurality of words.

An example computer system includes: a display generation component; one or more input devices; means for displaying, via the display generation component, a media playback interface; and while the media playback interface is configured to control playback of a first media item, where the first media item includes audio content that includes speech: means for displaying, via the display generation component, a selectable playback bookmark indicator; means for detecting, via the one or more input devices, a first user input corresponding to the selectable playback bookmark indicator; and in response to detecting the first user input, means for outputting audio content of the first media item from a first playback time that corresponds to speech that is at a start of a first instance of a grammatical structure of a first type, where the grammatical structure of the first type includes a plurality of words.

Example methods are disclosed herein. An example method includes, at a computer system that is in communication with a display generation component and one or more input devices: displaying, via the display generation component, a search interface of a media playback application; and while the media playback application is configured to control playback of a first media item, where the first media item includes audio content that includes speech: detecting, via the one or more input devices, a first user input that includes a first text search string; and after detecting the first user input, displaying one or more search results that includes a first search result corresponding to a first portion of speech of the audio content of the first media item that matches the first text search string.

Example non-transitory computer-readable storage media are described herein. An example non-transitory computer-readable storage medium stores one or more programs configured to be executed by one or more processors of a computer system that is in communication with a display generation component and one or more input devices, the one or more programs including instructions for: displaying, via the display generation component, a search interface of a media playback application; and while the media playback application is configured to control playback of a first media item, where the first media item includes audio content that includes speech: detecting, via the one or more input devices, a first user input that includes a first text search string; and after detecting the first user input, displaying one or more search results that includes a first search result corresponding to a first portion of speech of the audio content of the first media item that matches the first text search string.

Example transitory computer-readable storage media are described herein. An example transitory computer-readable storage medium stores one or more programs configured to be executed by one or more processors of a computer system that is in communication with a display generation component and one or more input devices, the one or more programs including instructions for: displaying, via the display generation component, a search interface of a media playback application; and while the media playback application is configured to control playback of a first media item, where the first media item includes audio content that includes speech: detecting, via the one or more input devices, a first user input that includes a first text search string; and after detecting the first user input, displaying one or more search results that includes a first search result corresponding to a first portion of speech of the audio content of the first media item that matches the first text search string.

Example computer systems are described herein. An example computer system includes a display generation component; one or more input devices; one or more processors; and memory storing one or more programs configured to be executed by the one or more processors, the one or more programs including instructions for: displaying, via the display generation component, a search interface of a media playback application; and while the media playback application is configured to control playback of a first media item, where the first media item includes audio content that includes speech: detecting, via the one or more input devices, a first user input that includes a first text search string; and after detecting the first user input, displaying one or more search results that includes a first search result corresponding to a first portion of speech of the audio content of the first media item that matches the first text search string.

An example computer system includes: a display generation component; one or more input devices; means for displaying, via the display generation component, a search interface of a media playback application; and while the media playback application is configured to control playback of a first media item, where the first media item includes audio content that includes speech: means for detecting, via the one or more input devices, a first user input that includes a first text search string; and after detecting the first user input, means for displaying one or more search results that includes a first search result corresponding to a first portion of speech of the audio content of the first media item that matches the first text search string.

Executable instructions for performing these functions are, optionally, included in a non-transitory computer-readable storage medium or other computer program product configured for execution by one or more processors. Executable instructions for performing these functions are, optionally, included in a transitory computer-readable storage medium or other computer program product configured for execution by one or more processors.

Thus, devices are provided with faster, more efficient methods and interfaces for managing a media playback application, thereby increasing the effectiveness, efficiency, and user satisfaction with such devices. Such methods and interfaces may complement or replace other methods for managing a media playback application.

DESCRIPTION OF THE FIGURES

For a better understanding of the various described embodiments, reference should be made to the Description of Embodiments below, in conjunction with the following drawings in which like reference numerals refer to corresponding parts throughout the figures.

DESCRIPTION OF EMBODIMENTS

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods and interfaces for managing a media playback application. For example, a user may have a need for visual indications of text corresponding to speech of audio configured to be controlled by media playback application. The visual indication of text enables a user to find a particular portion of an audio file quickly. As another example, a user may utilize a bookmark for an audio file to cause playback of a particular portion of the audio file. Initiating playback of the portion of the audio file associated with the bookmark at a beginning of a grammatical structure facilitates a user's understanding of the audio. As another example, a user may have a need to search for a particular portion of an audio file by using a string of text characters in a search function. Electronic device may cause speech recognition to be performed on an audio file in order to enable the user to search for a particular portion of the audio file. Such techniques can reduce the cognitive burden on a user who interacts with the media playback application, thereby enhancing productivity. Further, such techniques can reduce processor and battery power otherwise wasted on redundant user inputs.

Figure 6A:
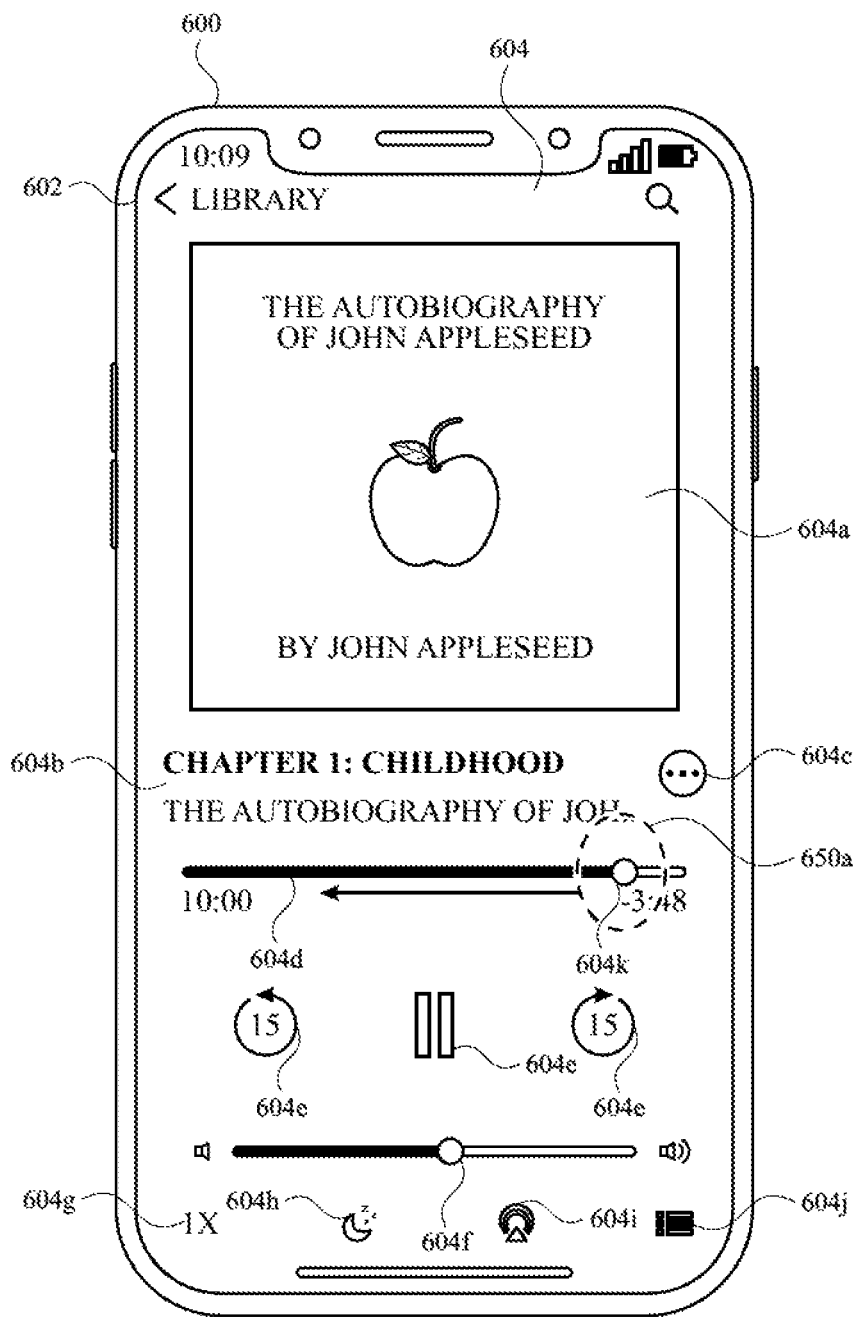
FIGS. 6A-6N illustrate exemplary user interfaces for displaying text corresponding to speech of audio in accordance with some embodiments.
Figure 6N:
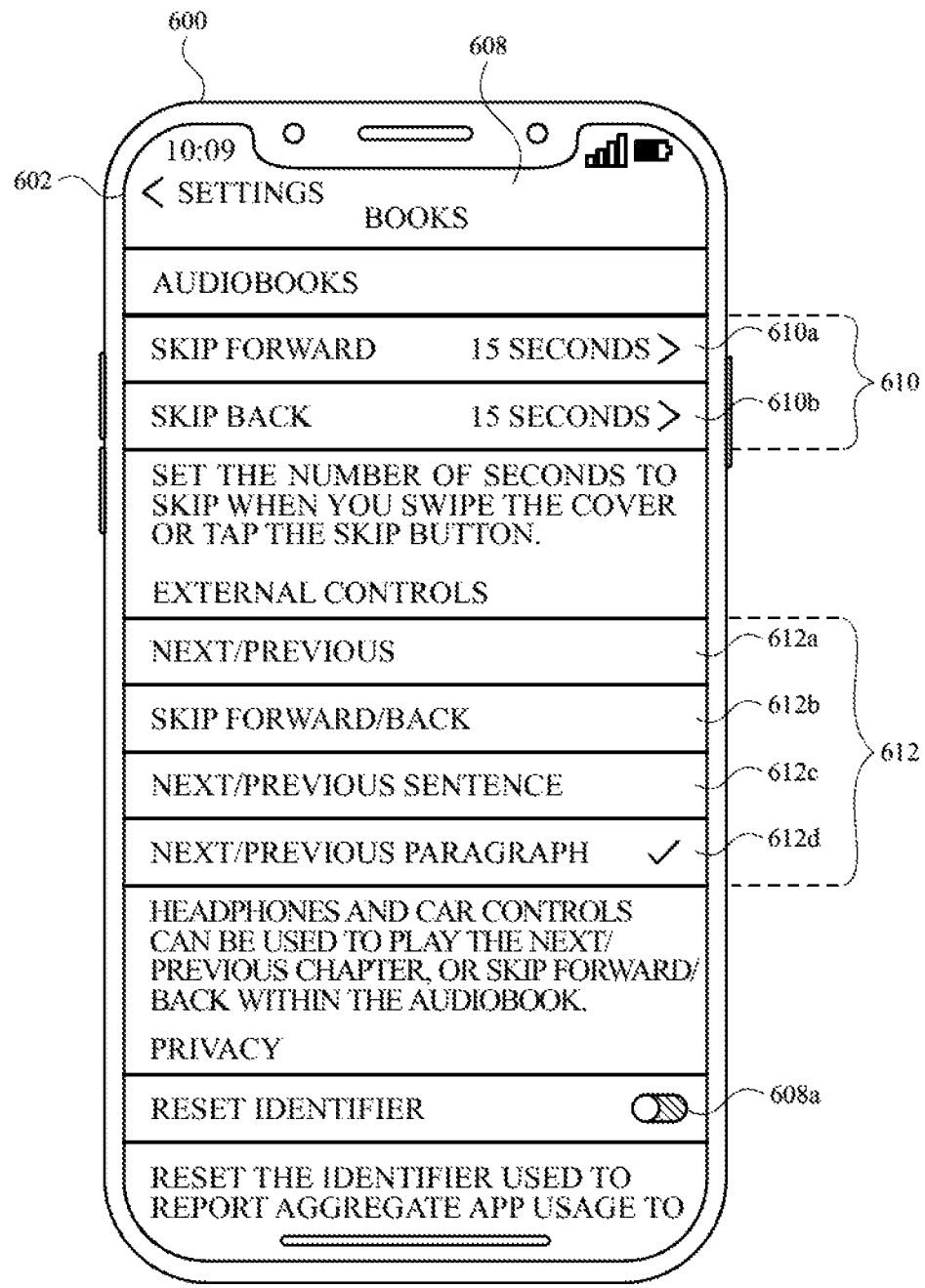
Figure 7:
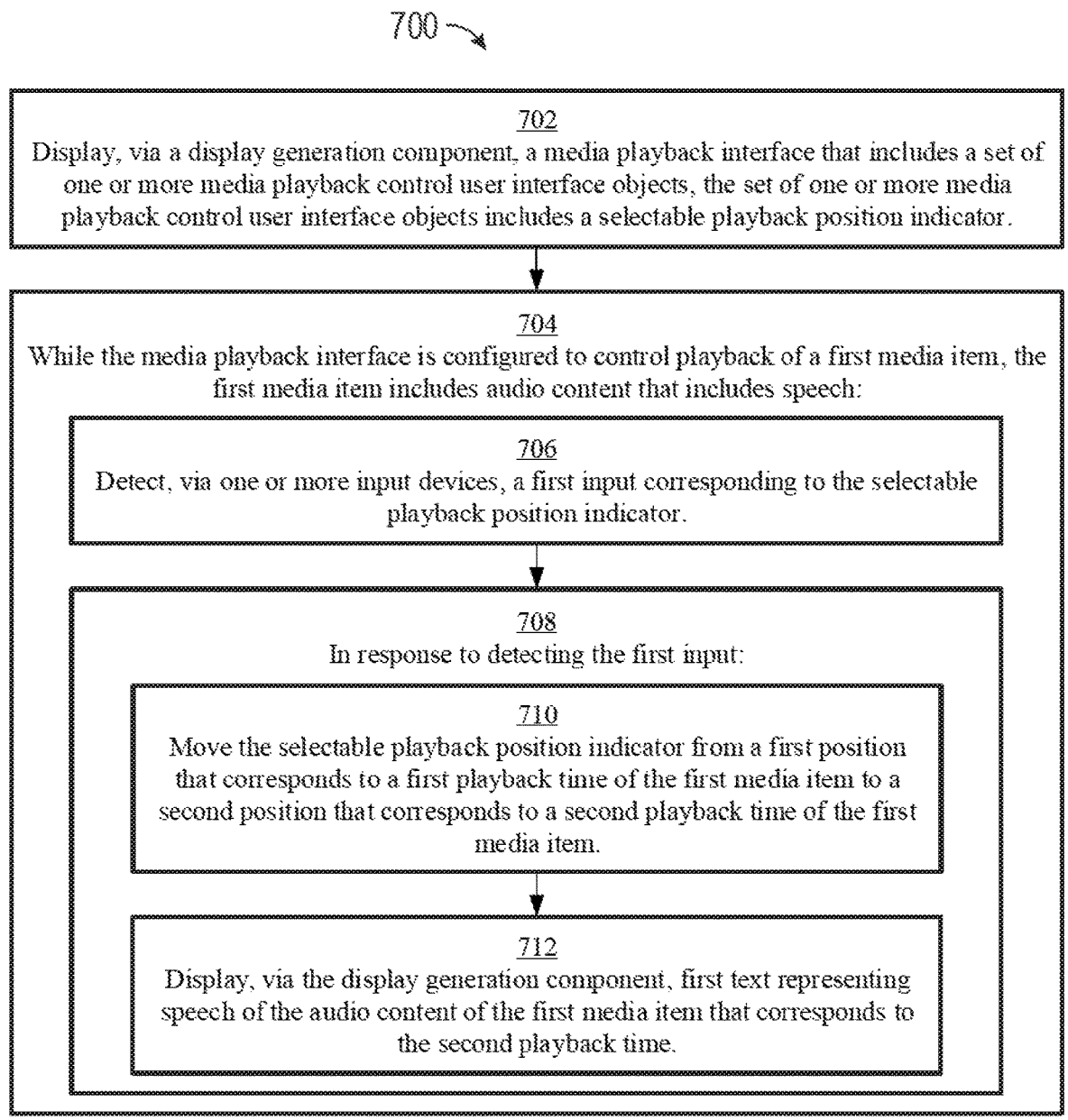
FIG. 7 is a flow diagram illustrating a method for displaying text corresponding to speech of audio in accordance with some embodiments.

Below, FIGS. 1A-1B, 2, 3, 4A-4B, and 5A-5B provide a description of exemplary devices for performing the techniques for managing event notifications. FIGS. 6A-6N illustrate exemplary user interfaces for displaying text corresponding to speech of an audio file in accordance with some embodiments. FIG. 7 is a flow diagram illustrating methods for displaying text corresponding to speech of an audio file in accordance with some embodiments. The user interfaces in FIGS. 6A-6N are used to illustrate the processes described below, including the processes in FIG. 7 FIGS. 8A-8I illustrate exemplary user interfaces for managing bookmarks of an audio file in accordance with some embodiments. FIG. 9 is a flow diagram illustrating methods of managing bookmarks of an audio file in accordance with some embodiments. The user interfaces in FIGS. 8A-8I are used to illustrate the processes described below, including the processes in FIG. 9 FIGS. 10A-10E illustrate exemplary user interfaces for searching for text corresponding to speech of an audio file in accordance with some embodiments. FIG. 11 is a flow diagram illustrating methods of searching for text corresponding to speech of an audio file in accordance with some embodiments. The user interfaces in FIGS. 10A-10E are used to illustrate the processes described below, including the processes in FIG. 11.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, Calif. Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad). In some embodiments, the electronic device is a computer system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system. In some embodiments, the display generation component is separate from the computer system. As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Figure 1A:
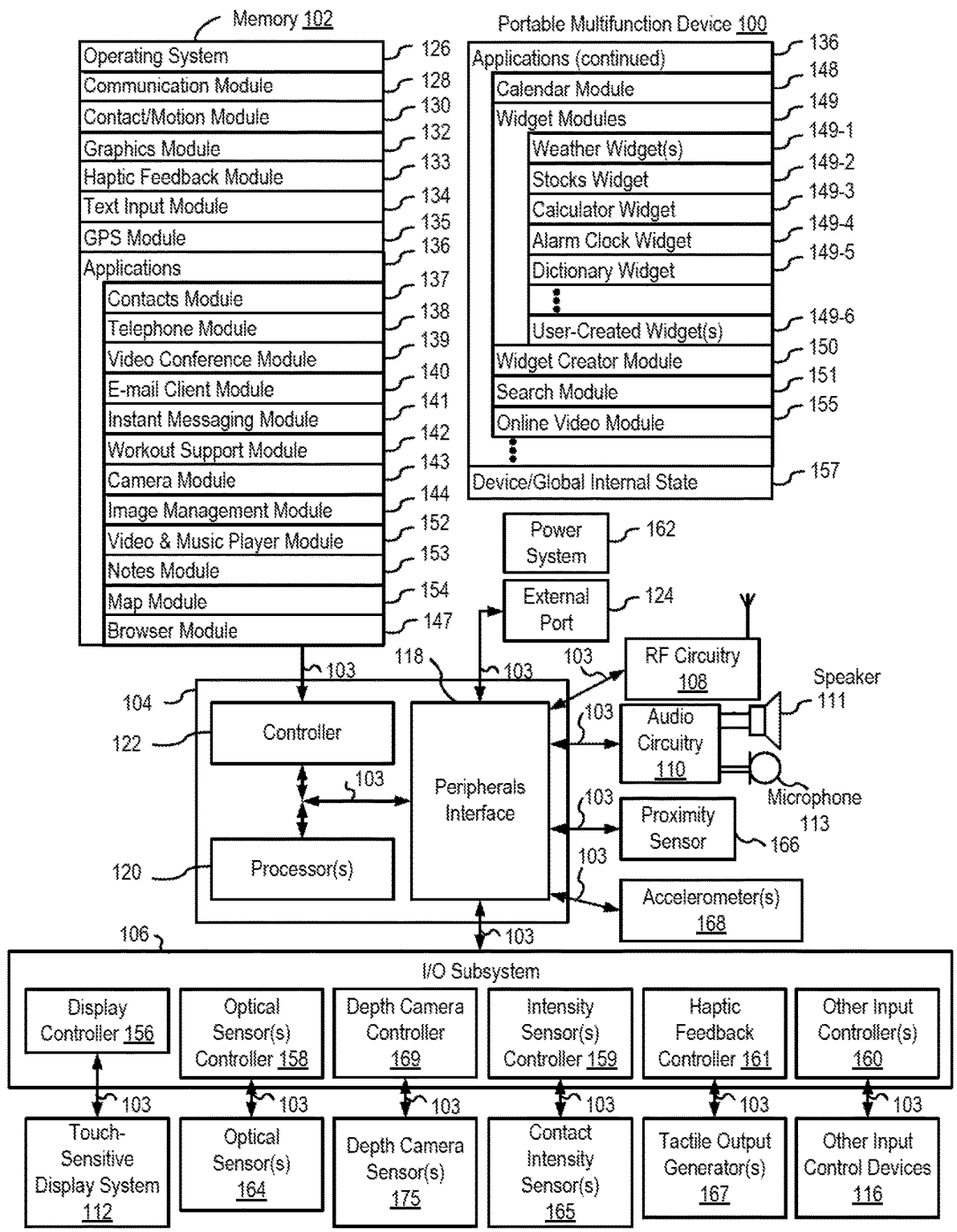
FIG. 1A is a block diagram illustrating a portable multifunction device with a touch-sensitive display in accordance with some embodiments.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, depth camera controller 169, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2). In some embodiments, the electronic device is a computer system that is in communication (e.g., via wireless communication, via wired communication) with one or more input devices. In some embodiments, the one or more input devices include a touch-sensitive surface (e.g., a trackpad, as part of a touch-sensitive display). In some embodiments, the one or more input devices include one or more camera sensors (e.g., one or more optical sensors 164 and/or one or more depth camera sensors 175), such as for tracking a user's gestures (e.g., hand gestures) as input. In some embodiments, the one or more input devices are integrated with the computer system. In some embodiments, the one or more input devices are separate from the computer system.

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, Calif.

A touch-sensitive display in some embodiments of touch screen 112 is, optionally, analogous to the multi-touch sensitive touchpads described in the following U.S. Patents: U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, in addition to the touch screen, device 100 optionally includes a touchpad for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more depth camera sensors 175. FIG. 1A shows a depth camera sensor coupled to depth camera controller 169 in I/O subsystem 106. Depth camera sensor 175 receives data from the environment to create a three dimensional model of an object (e.g., a face) within a scene from a viewpoint (e.g., a depth camera sensor). In some embodiments, in conjunction with imaging module 143 (also called a camera module), depth camera sensor 175 is optionally used to determine a depth map of different portions of an image captured by the imaging module 143. In some embodiments, a depth camera sensor is located on the front of device 100 so that the user's image with depth information is, optionally, obtained for video conferencing while the user views the other video conference participants on the touch screen display and to capture selfies with depth map data. In some embodiments, the depth camera sensor 175 is located on the back of device, or on the back and the front of the device 100. In some embodiments, the position of depth camera sensor 175 can be changed by the user (e.g., by rotating the lens and the sensor in the device housing) so that a depth camera sensor 175 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer and a GPS (or GLONASS or other global navigation system) receiver for obtaining information concerning the location and orientation (e.g., portrait or landscape) of device 100.

Figure 3:
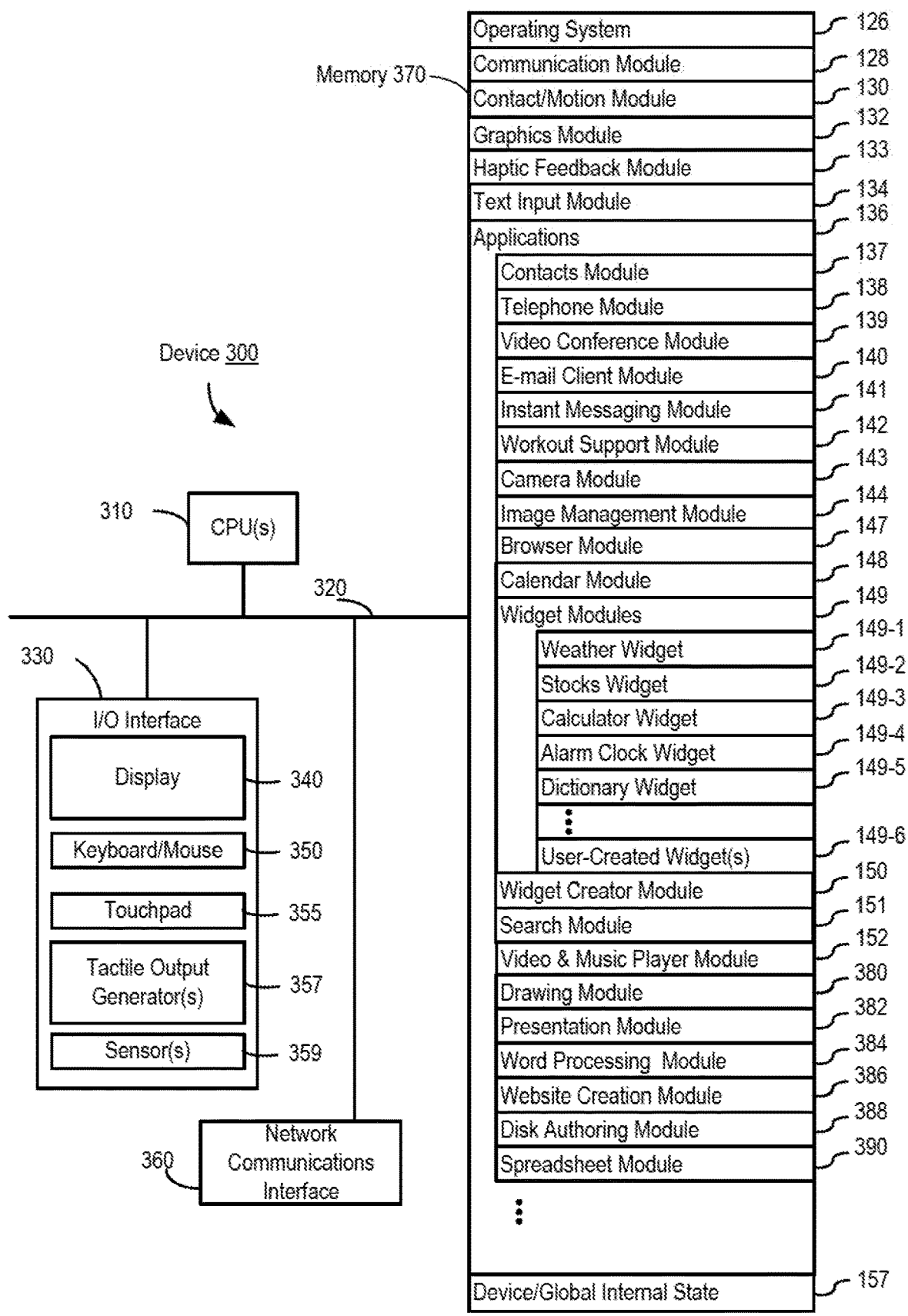
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

Contacts module 137 (sometimes called an address book or contact list);
Telephone module 138;
Video conference module 139;
E-mail client module 140;
Instant messaging (IM) module 141;
Workout support module 142;
Camera module 143 for still and/or video images;
Image management module 144;
Video player module;
Music player module;
Browser module 147;
Calendar module 148;
Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
Widget creator module 150 for making user-created widgets 149-6;
Search module 151;
Video and music player module 152, which merges video player module and music player module;
Notes module 153;
Map module 154; and/or
Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
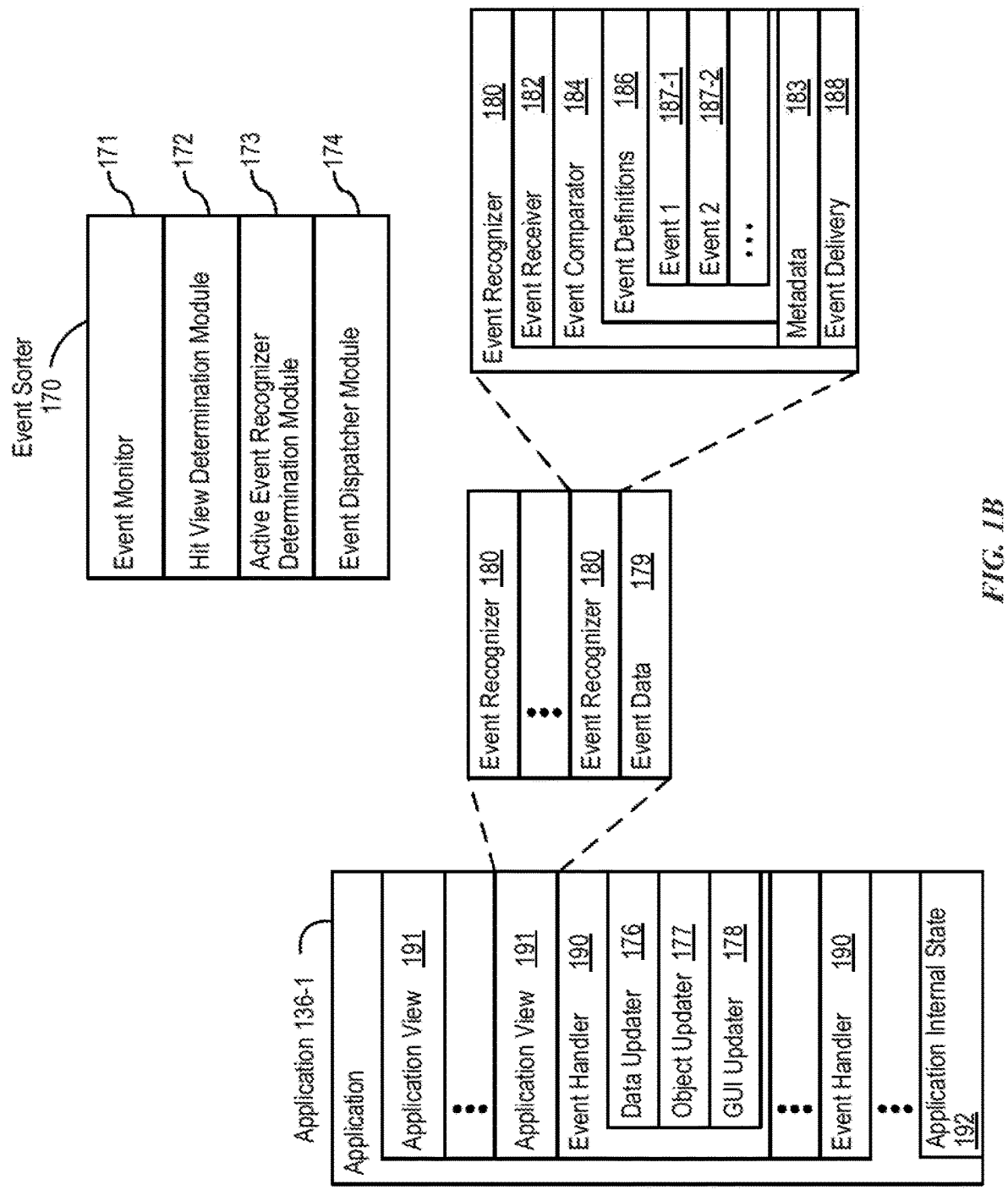
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
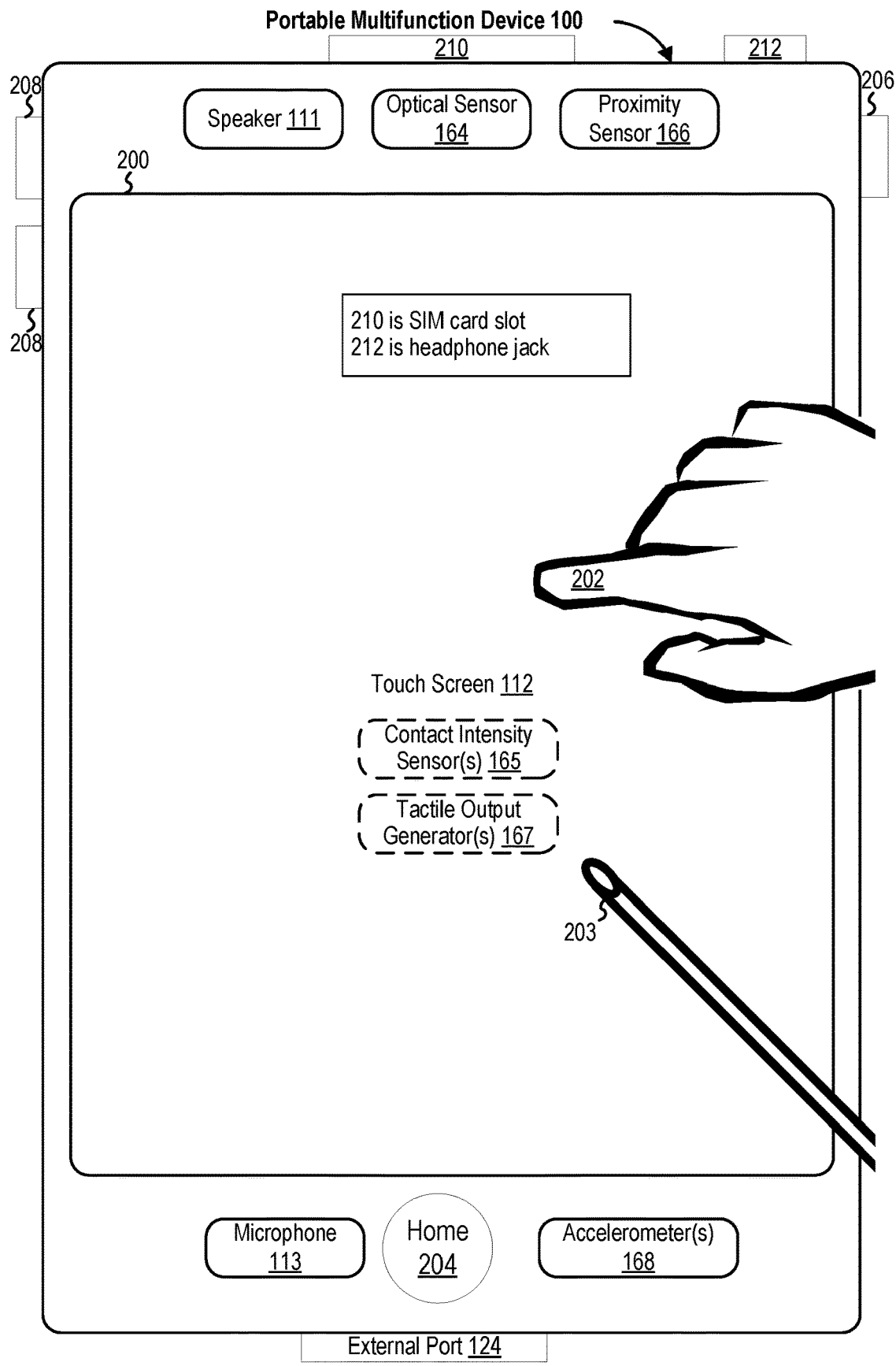
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
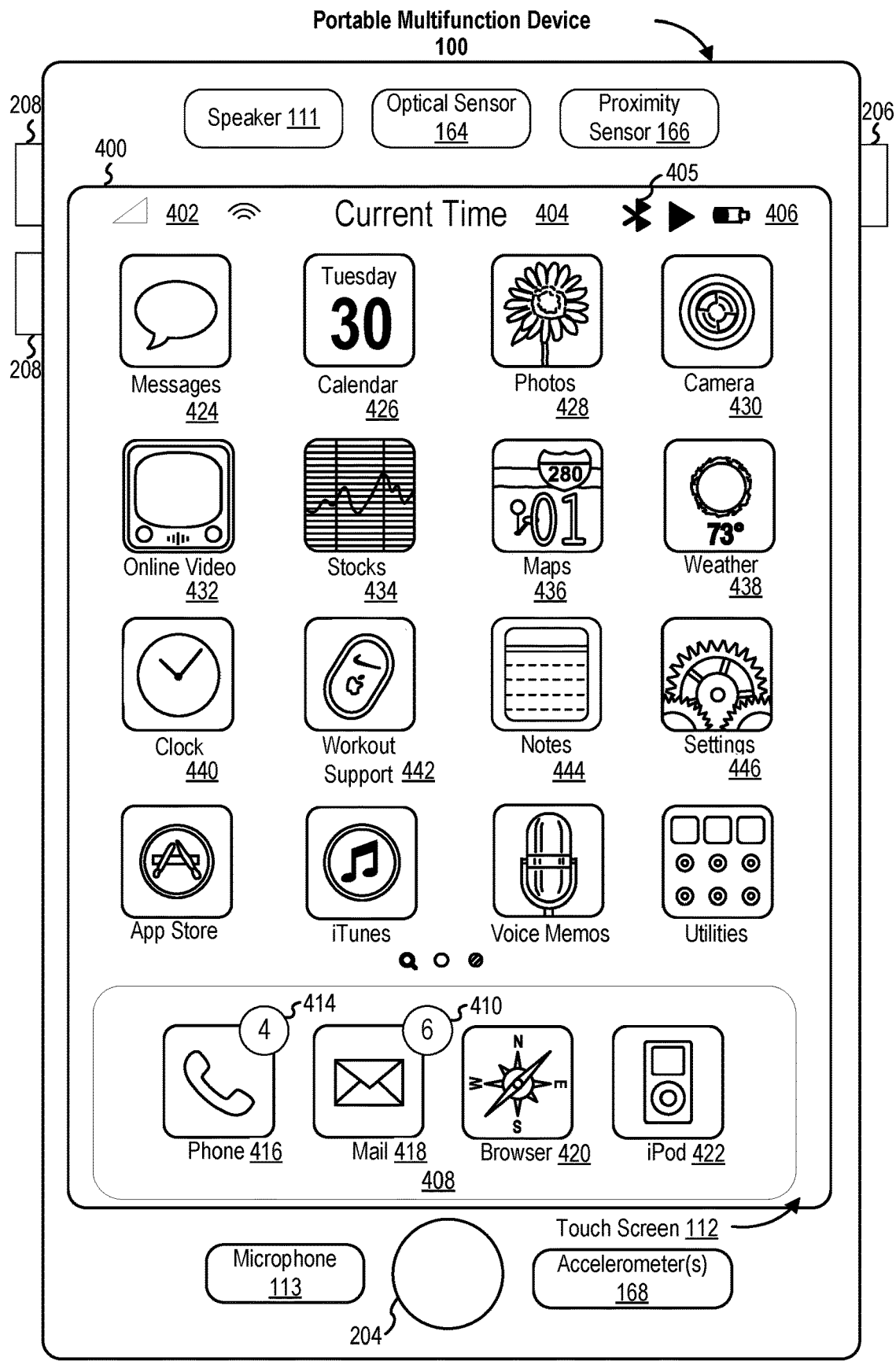
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

- Signal strength indicator(s) 402 for wireless communication(s), such as cellular and Wi-Fi signals;
- Time 404;
- Bluetooth indicator 405;
- Battery status indicator 406;
- Tray 408 with icons for frequently used applications, such as:
  - Icon 416 for telephone module 138, labeled "Phone," which optionally includes an indicator 414 of the number of missed calls or voicemail messages;
  - Icon 418 for e-mail client module 140, labeled "Mail," which optionally includes an indicator 410 of the number of unread e-mails;
  - Icon 420 for browser module 147, labeled "Browser;" and
  - Icon 422 for video and music player module 152, also referred to as iPod (trademark of Apple Inc.) module 152, labeled "iPod;" and
- Icons for other applications, such as:
  - Icon 424 for IM module 141, labeled "Messages;"
  - Icon 426 for calendar module 148, labeled "Calendar;"
  - Icon 428 for image management module 144, labeled "Photos;"
  - Icon 430 for camera module 143, labeled "Camera;"
  - Icon 432 for online video module 155, labeled "Online Video;"
  - Icon 434 for stocks widget 149-2, labeled "Stocks;"
  - Icon 436 for map module 154, labeled "Maps;"
  - Icon 438 for weather widget 149-1, labeled "Weather;"
  - Icon 440 for alarm clock widget 149-4, labeled "Clock;"
  - Icon 442 for workout support module 142, labeled "Workout Support;"
  - Icon 444 for notes module 153, labeled "Notes;" and
  - Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
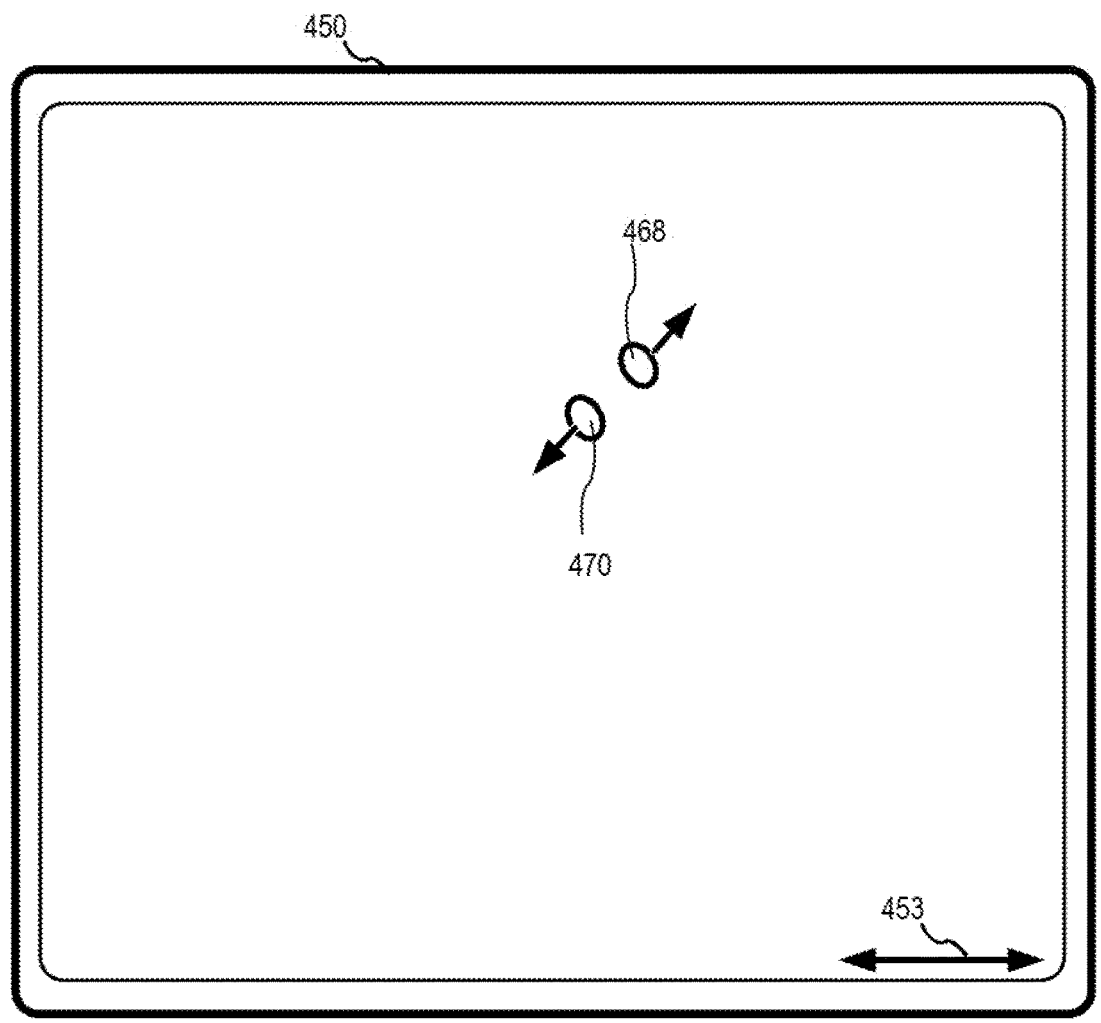
FIG. 4B illustrates an exemplary user interface for a multifunction device with a touch-sensitive surface that is separate from the display in accordance with some embodiments.
Figure 4B:
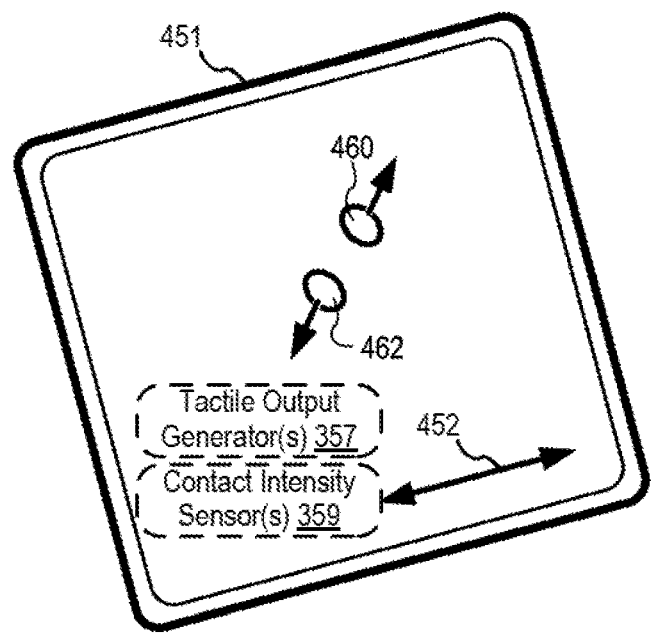

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
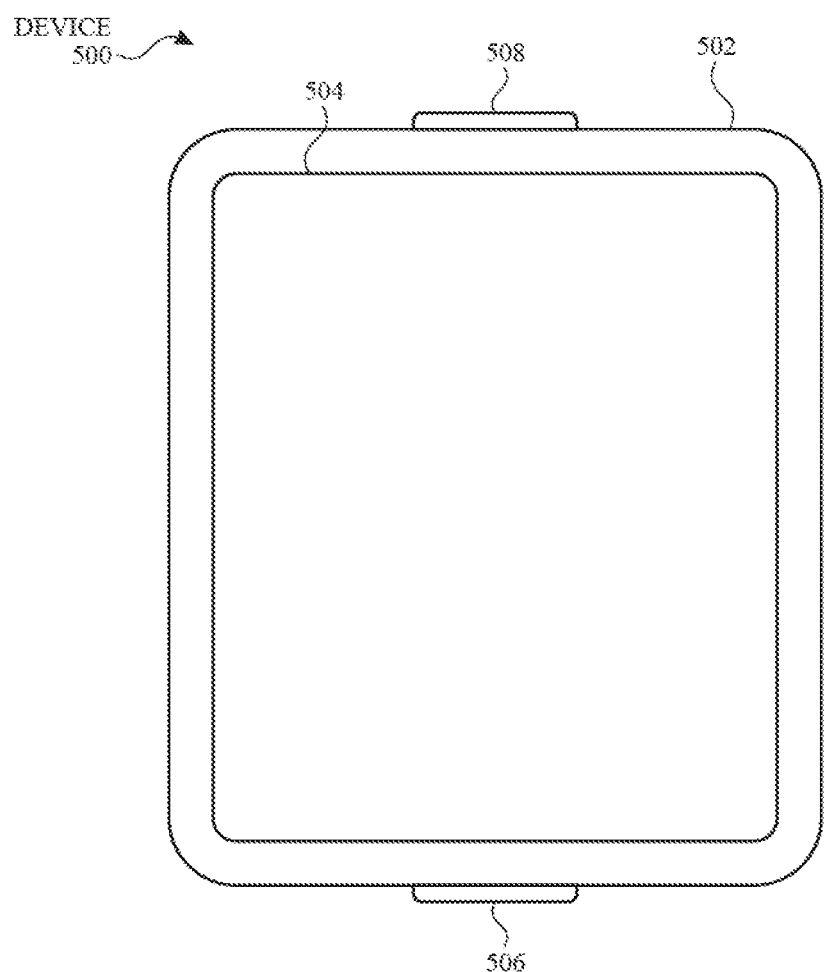
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
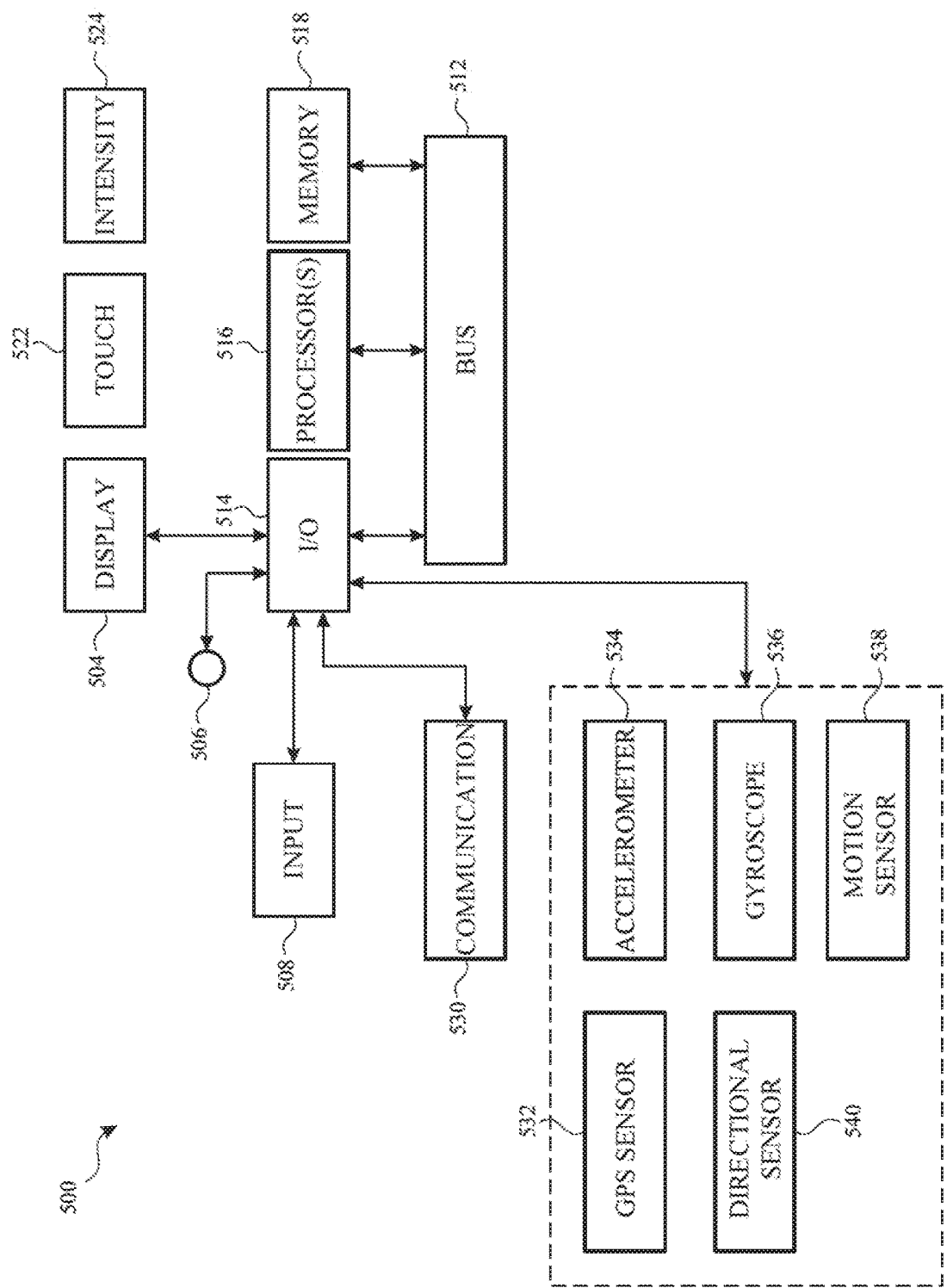
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including processes 700, 900, and 1100 (FIGS. 7, 9, and 11). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

Attention is now directed towards embodiments of user interfaces ("UI") and associated processes that are implemented on an electronic device, such as portable multifunction device 100, device 300, or device 500.

FIGS. 6A-6N illustrate exemplary user interfaces for displaying text corresponding to speech of an audio file, in accordance with some embodiments. The user interfaces in these figures are used to illustrate the processes described below, including the processes in FIG. 7.

FIG. 6A illustrates electronic device 600 (e.g., a smartphone) with display 602 (e.g., touch screen). In some embodiments, device 600 includes one or more features of devices 100, 300, and/or 500. At FIG. 6A, electronic device 600 displays, on display 602, media playback user interface 604 associated with a media application (e.g., a books application, an audiobooks application) of electronic device 600. Media playback user interface 604 enables a user of electronic device 600 to adjust and/or control audio settings of media output by electronic device 600. Media playback user interface 604 is configured to control playback of audio files. In some embodiments, the audio files may be audiobook files, music files, podcast files, multimedia files (e.g., video files), and/or other media files that include audio.

A user of electronic device 600 may wish to view text representing speech (e.g., words and/or lyrics) of the audio files. For example, a user may wish to cause playback of an audio file at a particular portion of the audio file that includes specific dialogue and/or lyrics. However, in some embodiments, including the embodiment of FIGS. 6A-6N, the audio files do not include pre-generated text data corresponding to the speech of the audio files. In other words, the audio files do not include metadata, embedded data, and/or any associated data including the text of the speech. As such, electronic device 600 (or an external device in communication with electronic device 600) performs speech recognition of and/or transcribes the audio files to generate text corresponding to speech in the audio files. In some embodiments, speech recognition is performed in real time (e.g., while electronic device 600 outputs audio of an audio file), at the time when a particular audio file is selected for control via media playback user interface 604, and/or at the time when an audio file is stored on electronic device 600 (e.g., in memory of electronic device 600 and/or in a cloud). Electronic device 600 can thus display text corresponding to speech of audio that is output at a specific time in the audio file, such that a user can control playback of the audio file to output a desired portion of the speech of the audio by viewing the text generated via speech recognition. The manner in which media playback user interface 604 displays the text corresponding to speech of an audio file (e.g., an audiobook file) is discussed in detail with reference to FIGS. 6A-6N.

At FIG. 6A, media playback user interface 604 controls playback of audio of an audiobook file entitled "The Autobiography of John Appleseed." At FIG. 6A, media playback user interface 604 includes audiobook indicator 604a, such as an image of a book cover of an audiobook associated with the audiobook file as well as text identifying the audiobook file. Media playback user interface 604 includes now playing indicator 604b, such as text indicating a chapter or portion of the selected audiobook file and/or text indicating a title of the selected audiobook file. Media playback user interface also includes settings user interface object 604c that, when selected via user input, causes electronic device 600 to display a settings user interface that includes various control user interface objects, such as a bookmark user interface object. Media playback user interface 604 further includes a scrubber bar 604d that enables a user to adjust a playback time of the audio via user input. Media playback user interface 604 includes audio control user interface objects 604e that enable a user to control playback of the audio by pausing, playing, and/or skipping the audio. Additionally, media playback user interface 604 includes volume control user interface object 604f that enables a user to adjust a volume of the audio output via user input. Further still, media playback user interface 604 includes audio speed user interface object 604g that enables a user to adjust a playback speed of the audio output, sleep setting user interface object 604h that enables a user to select a duration for electronic device 600 to continue audio output before pausing and/or stopping the audio output, and share audio user interface object 604i enabling a user to transmit data related to the audiobook file to an external device. Media playback user interface 604 further includes table of contents user interface object 604j that, when selected via user input, causes electronic device 600 to display a table of contents user interface, a bookmark user interface, and/or a notes user interface.

Figure 6B:
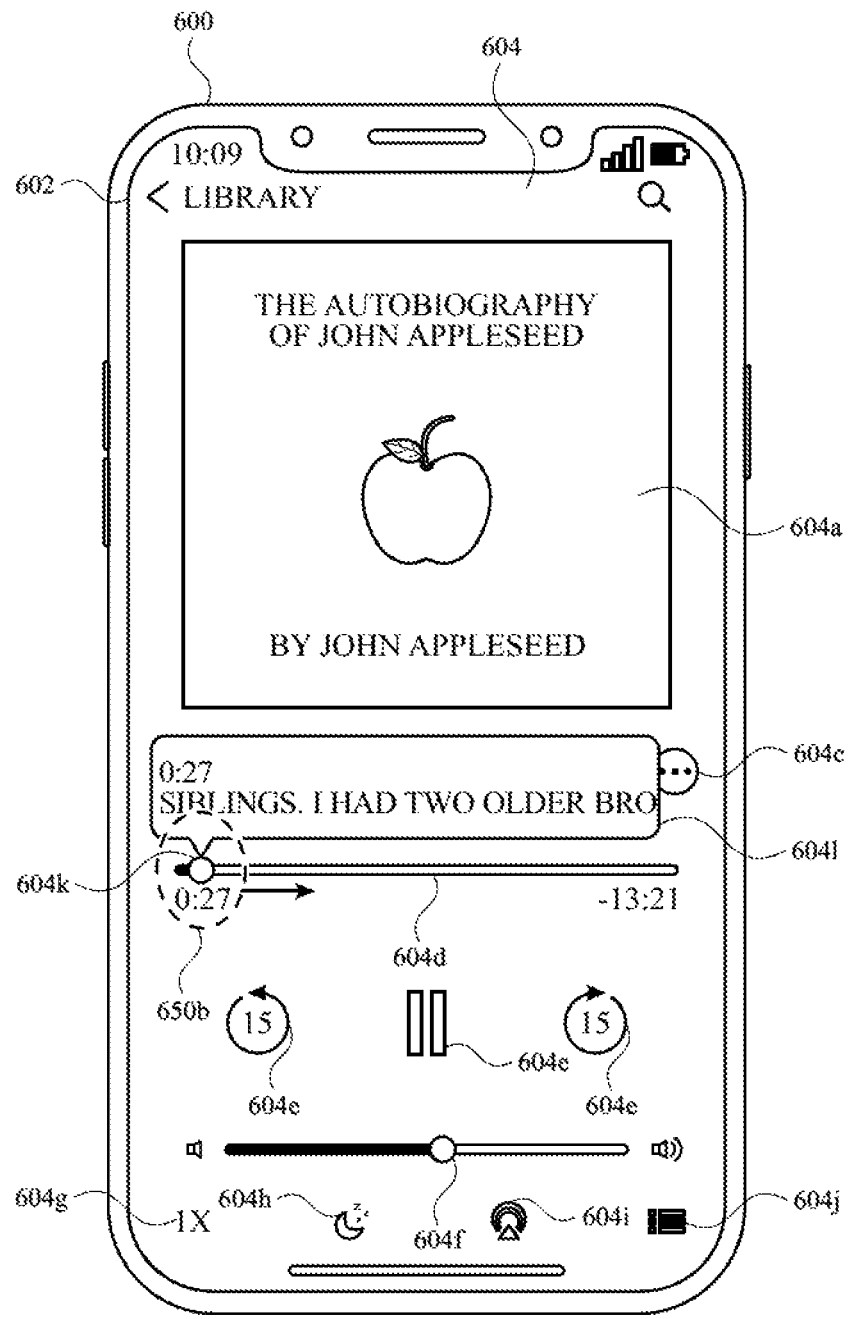

At FIG. 6A, electronic device 600 detects user input 650a, which is a movement of a tap and hold gesture in a first direction and/or a tap and swipe gesture in the first direction, on thumb 604k of scrubber bar 604d while thumb 604k is at a first position on scrubber bar 604d (e.g., the first position is associated with time 10:00 of the audiobook file). In response to detecting user input 650a, electronic device 600 displays text indicator 604l, as shown at FIG. 6B. User input 650a includes movement of a touch and hold gesture in a leftward direction. Upon detecting contact of user input 650a, electronic device displays text indicator 604l showing text corresponding to speech of the audio file at a time associated with a second position of thumb 604k on scrubber bar 604d (e.g., time 0:27). Additionally, movement of user input 650a causes thumb 604k to move from the first position on scrubber bar 604d in the leftward direction (e.g., the first direction and/or the same direction as the movement of the touch and hold gesture or user input 650a) to the second position. As such, text indicator 604l displays text corresponding to speech of the audio at the second position (e.g., text corresponding to speech of the audio at time 0:27). In some embodiments, text indicator 604l is displayed with text corresponding to speech of the audio at the first position (e.g., text corresponding to speech of the audio at time 10:00) upon initial contact of user input 650a (e.g., when a finger contact is detected on thumb 604k for a predetermined period of time).

In some embodiments, user input 650a includes movement in multiple directions and/or along two different axes (e.g., a vertical axis and a horizontal axis with respect to display 602). For instance, user input 650a can include horizontal movement and vertical movement along display 602. In some embodiments, electronic device 600 recognizes movement associated with user input 650a along only a single axis (e.g., a horizontal axis or direction with respect to display 602). Accordingly, while user input 650a may include movement in multiple directions, electronic device 600 displays text in text indicator 604l based on movement along a single axis. In some embodiments, movement associated with user input 650a along a second axis (e.g., a vertical axis or direction with respect to display 602) is ignored by electronic device 600 and/or is not otherwise utilized to determine text displayed by text indicator 604l.

In some embodiments, electronic device 600 ceases to cause audio output upon detection of user input 650a. For instance, electronic device 600 ceases to cause audio output (e.g., via speakers of electronic device 600 (e.g., internal speakers of electronic device 600 or external speakers in communication with electronic device 600)) upon detecting a touch and hold portion of user input 650a. In some embodiments, electronic device 600 causes audio output upon detecting a movement portion of user input 650a (e.g., while touch and hold occurs, electronic device 600 causes output of audio at a speed that is in conjunction with a speed of the movement portion of user input 650a and/or a detected amount of movement of the movement portion of user input 650a). In some embodiments, electronic device 600 ceases to cause audio output until a lift off of user input 650a is detected (e.g., audio output is ceased until finger contact of user input 650a on display 602 is broken or no longer detected).

At FIG. 6B, text indicator 604l (e.g., pop-up bubble) is displayed as being overlaid on now playing indicator 604b. As such, text indicator 604l at least partially covers and/or at least partially blocks display of now playing indicator 604b. In some embodiments, text indicator 604l is overlaid over different elements of media playback user interface 604, such as audiobook indicator 604a, settings user interface object 604c, audio control user interface objects 604e, and/or volume control user interface object 604f. In some embodiments, text indicator 604l is displayed as being overlaid over scrubber bar 604d. Further, in some embodiments, text indicator 604l is at least partially transparent, such that a user may continue to view elements of media playback user interface 604 while displaying text indicator 604l (e.g., user can view elements of media playback user interface 604 behind text indicator 604l).

At FIG. 6B, text indicator 604l includes a ticker-tape (e.g., scrolling set of text) display of text corresponding to speech of the audio file at the second position of thumb 604k. For example, text indicator 604l displays at least a portion of a first sentence of text corresponding to speech of the audio and a second sentence of text corresponding to speech of the audio. In some embodiments, text displayed by text indicator 604l highlights a particular word of text that corresponds to speech of the audio that is output at the particular time associated with the position of thumb 604k. Additionally, text indicator 604l includes words that precede and/or follow the particular word of text that corresponds to speech of the audio that is output at the particular time of the audio file associated with position of thumb 604k. In some embodiments, text indicator 604l includes only words that follow the particular word of text that corresponds to speech of the audio that is output at the particular time of the audio file associated with position of thumb 604k.

Figure 6C:
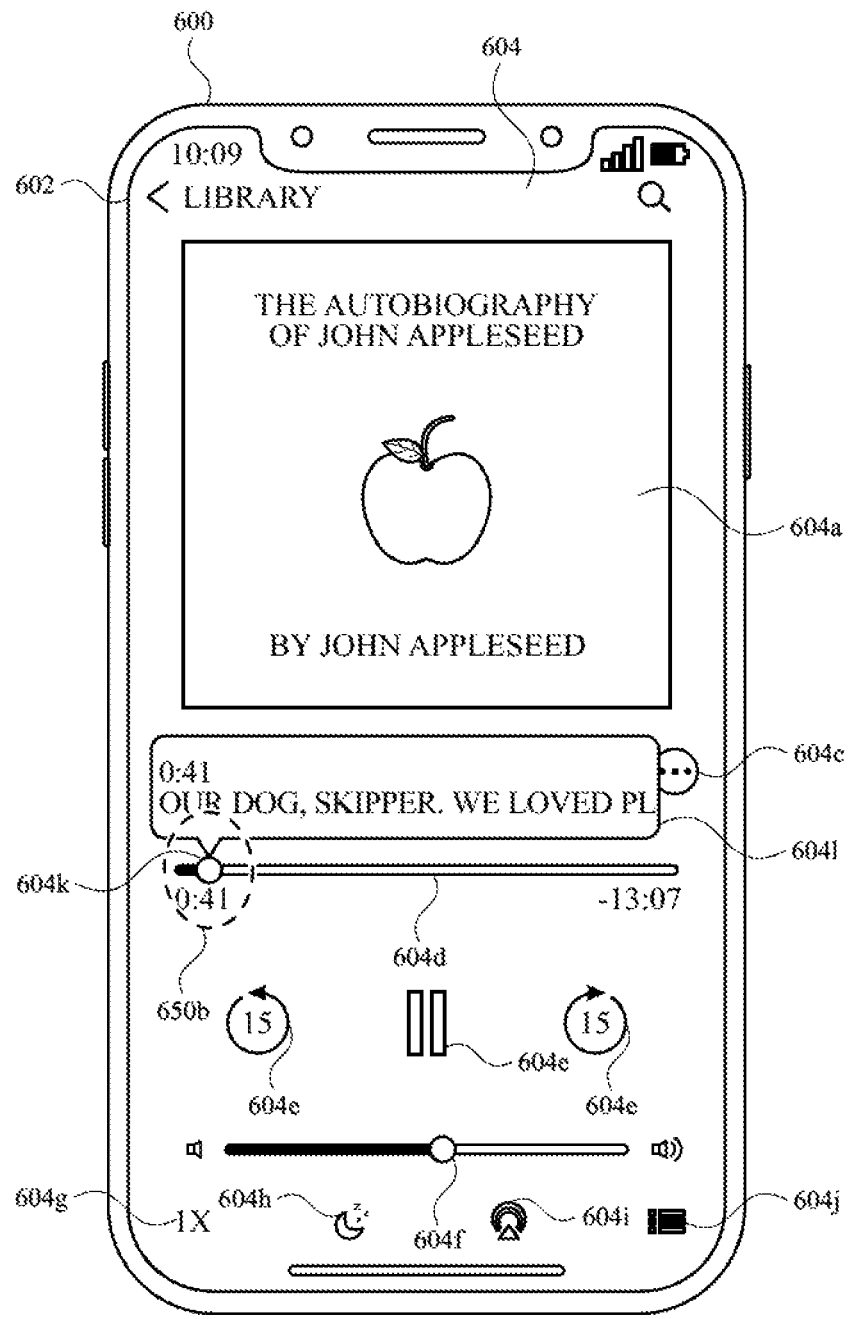

At FIG. 6B, electronic device 600 detects user input 650b (e.g., movement of a tap and hold gesture in a second direction, opposite the first direction, or a tap and swipe gesture in the second direction) on thumb 604k of scrubber bar 604d while thumb 604k is at the second position. In response to detecting user input 650b, electronic device 600 causes thumb 604k to move from the second position to a third position (e.g., a position associated with time 0:41), different from the first position and the second position. As such, the position of thumb 604k moves in a rightward direction (e.g., the second direction and/or the same direction as the movement associated with user input 650b), as shown at FIG. 6C. At FIG. 6C, electronic device 600 displays text indicator 604l having text corresponding to speech of the audio at the time associated with the third position of thumb 604k (e.g., different text than what is displayed when thumb 604k is at the second position). Accordingly, user input on thumb 604k can rewind (e.g., skip backward in time) or fast forward (e.g., skip forward in time) audio output of the audiobook file.

Figure 6D:
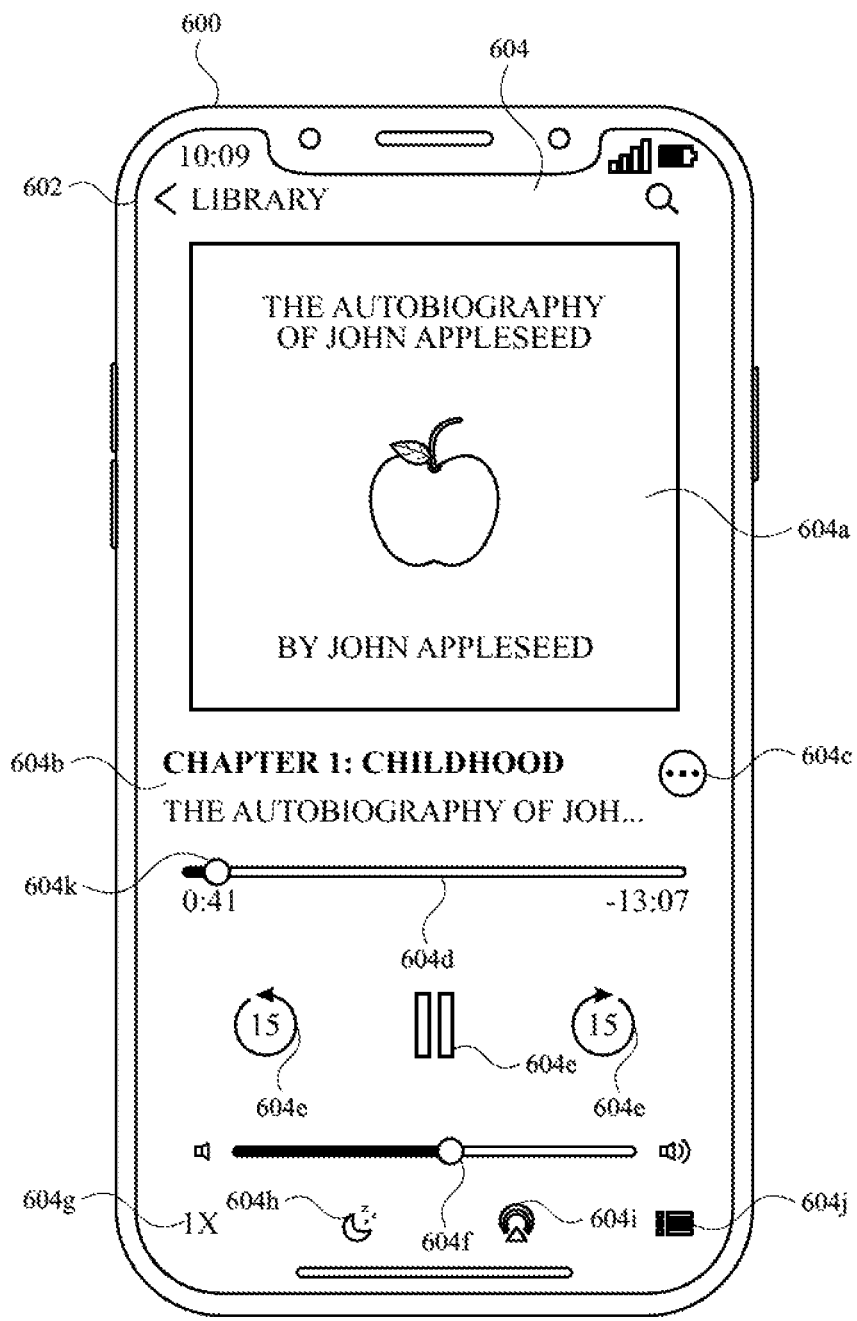

At FIG. 6C, text included in text indicator 604l includes text corresponding to speech at the third position of thumb 604k (e.g., time 0:41). Additionally, at FIG. 6C, electronic device 600 detects that user input 650b is maintained on display 602 (e.g., finger contact of user input 650b has not been broken or removed from screen 602). At FIG. 6D, user input 650b is no longer detected by electronic device 600 and a liftoff of contact is detected by electronic device 600. As set forth above, electronic device 600 causes audio output of the audiobook file at the time corresponding to the third position of thumb 604k (e.g., the position of thumb 604k when liftoff of user input 650b is detected). Further, at FIG. 6D, electronic device 600 ceases display of text indicator 604l on media playback user interface 604.

As discussed above, FIGS. 6A-6D illustrate examples of text indicator 604l having a ticker-tape display of text corresponding to speech of the audio. In some embodiments, electronic device 600 is configured to switch between display of text in text indicator 604l as a ticker-tape format and as an entire structural component of speech format. For example, electronic device 600 detects user input on a settings user interface (e.g., a settings user interface of media application and/or a general settings user interface of a system application (e.g., an operating system) of electronic device 600) corresponding to selection of a particular format for displaying text indicator 604l. As such, electronic device 600 displays text in text indicator 604l in accordance with the format selected (e.g., ticker tape or the entire structural component of speech). In some embodiments, electronic device 600 includes a default format for displaying text in text indicator 604l, which cannot be adjusted and/or changed via user input.

Figure 6E:
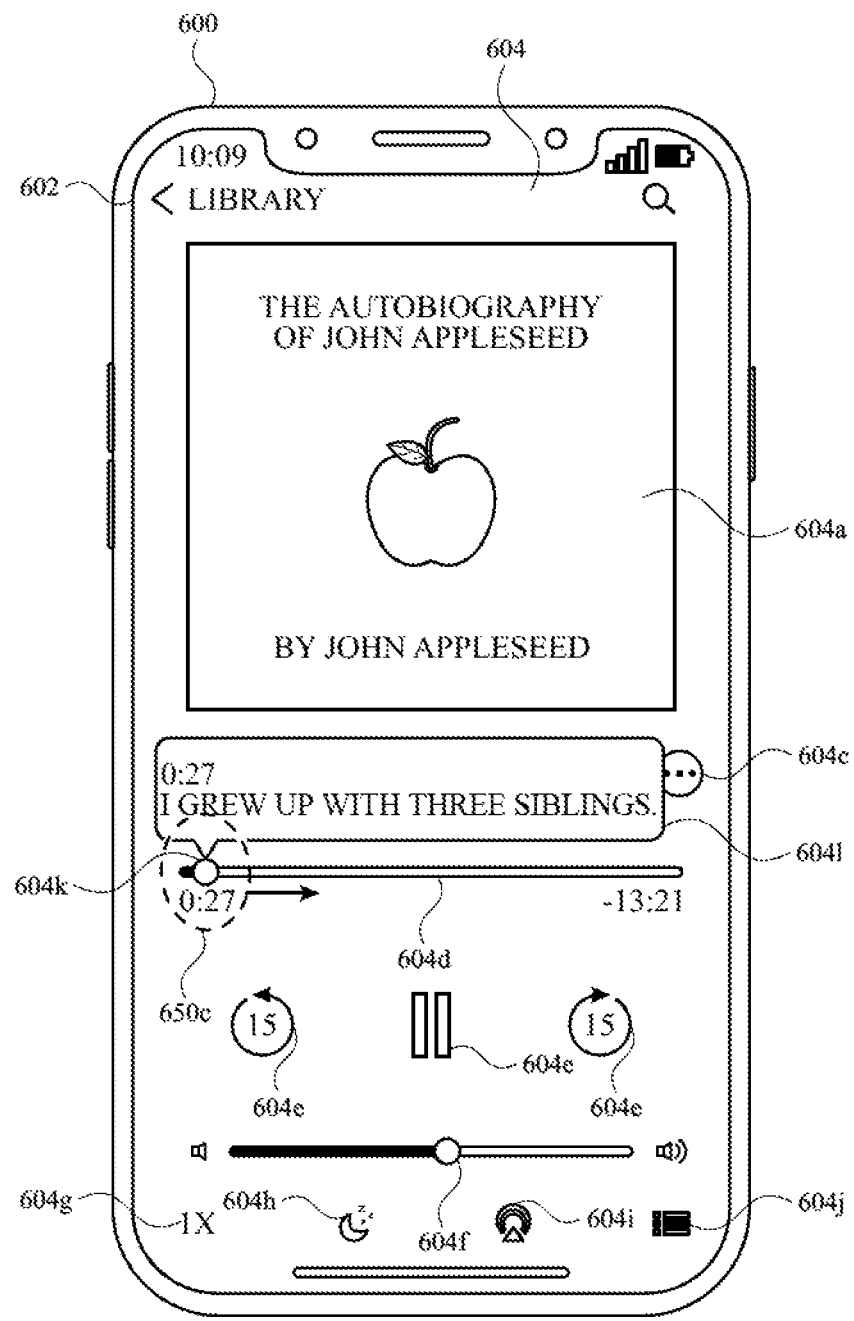

At FIG. 6E, electronic device 600 displays text in text indicator using an entire structural component of speech format. As shown at FIG. 6E, electronic device 600 detects user input 650c (e.g., movement of a tap and hold gesture in the second direction and/or a tap and swipe gesture in the second direction) on thumb 604k of media playback user interface 604 while thumb 604k is at a fourth position. Accordingly, in response to detecting user input 650c, electronic device 600 displays text indicator 604l. At FIG. 6E, text indicator 604l includes text corresponding to an entire sentence of speech of the audio, where the entire sentence includes at least one word of speech of the audio at the time associated with the position of thumb 604k. For example, audio output of at least a portion of the word "having" may occur at time 0:27 of the audiobook file. Accordingly, text indicator 604l displays the entire sentence that includes the word "having" (e.g., "I loved having three siblings.").

Figure 6F:
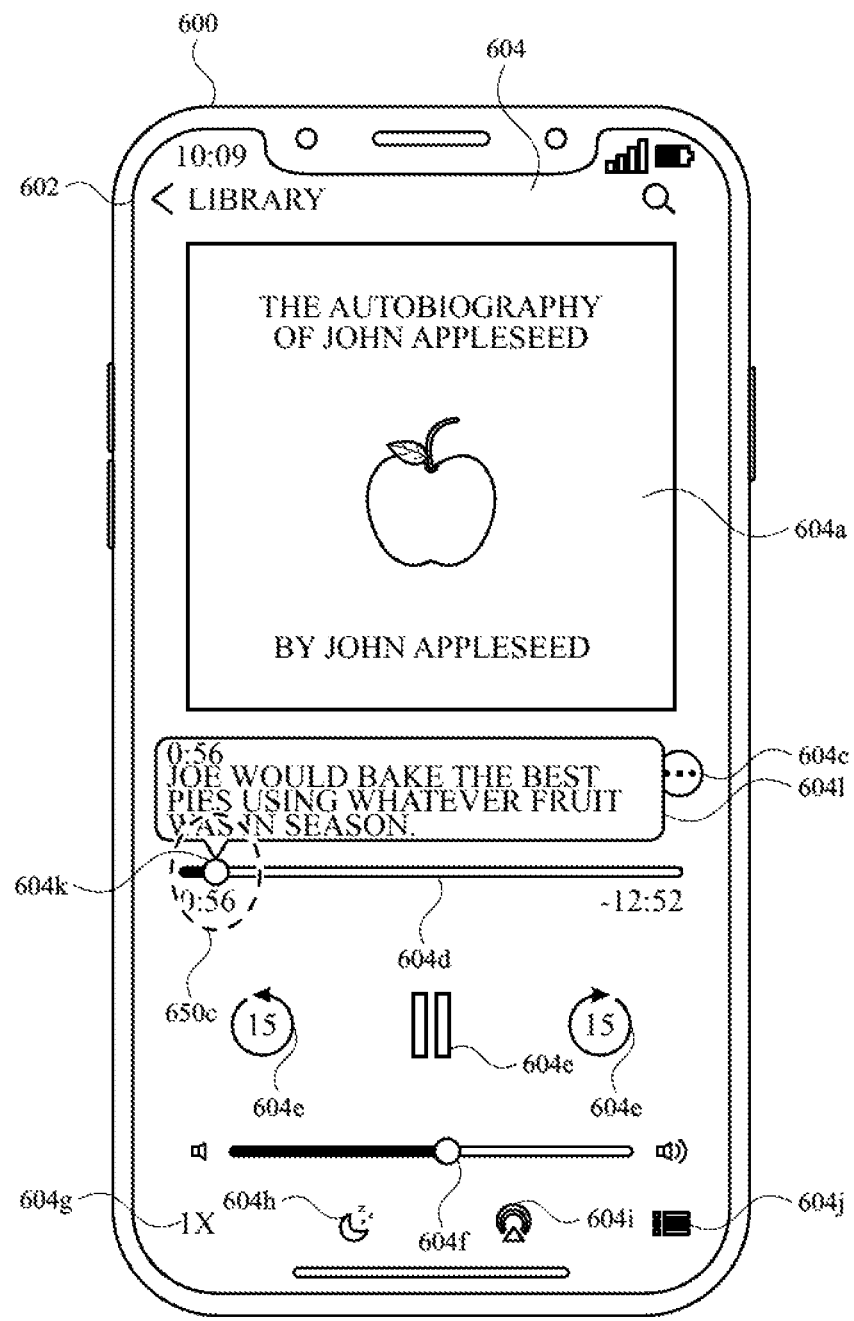

At FIG. 6E, user input 650c includes movement in the second direction (e.g., a rightward direction). In response to detecting a movement portion of user input 650c, electronic device 600 moves thumb 604k from the fourth position to a fifth position, as shown at FIG. 6F. At FIG. 6F, text indicator 604l includes text corresponding to an entire sentence of speech of the audio, where the entire sentence includes at least one word of speech of the audio at the time associated with the fifth position of thumb 604*k*. For example, audio output of at least a portion of the word "pies" may occur at time 0:56 of the audiobook file. Accordingly, text indicator 604*l* displays the entire sentence that includes the word "pies" (e.g., "Joe would bake the best pies using whatever fruit was in season.").

Figure 6G:
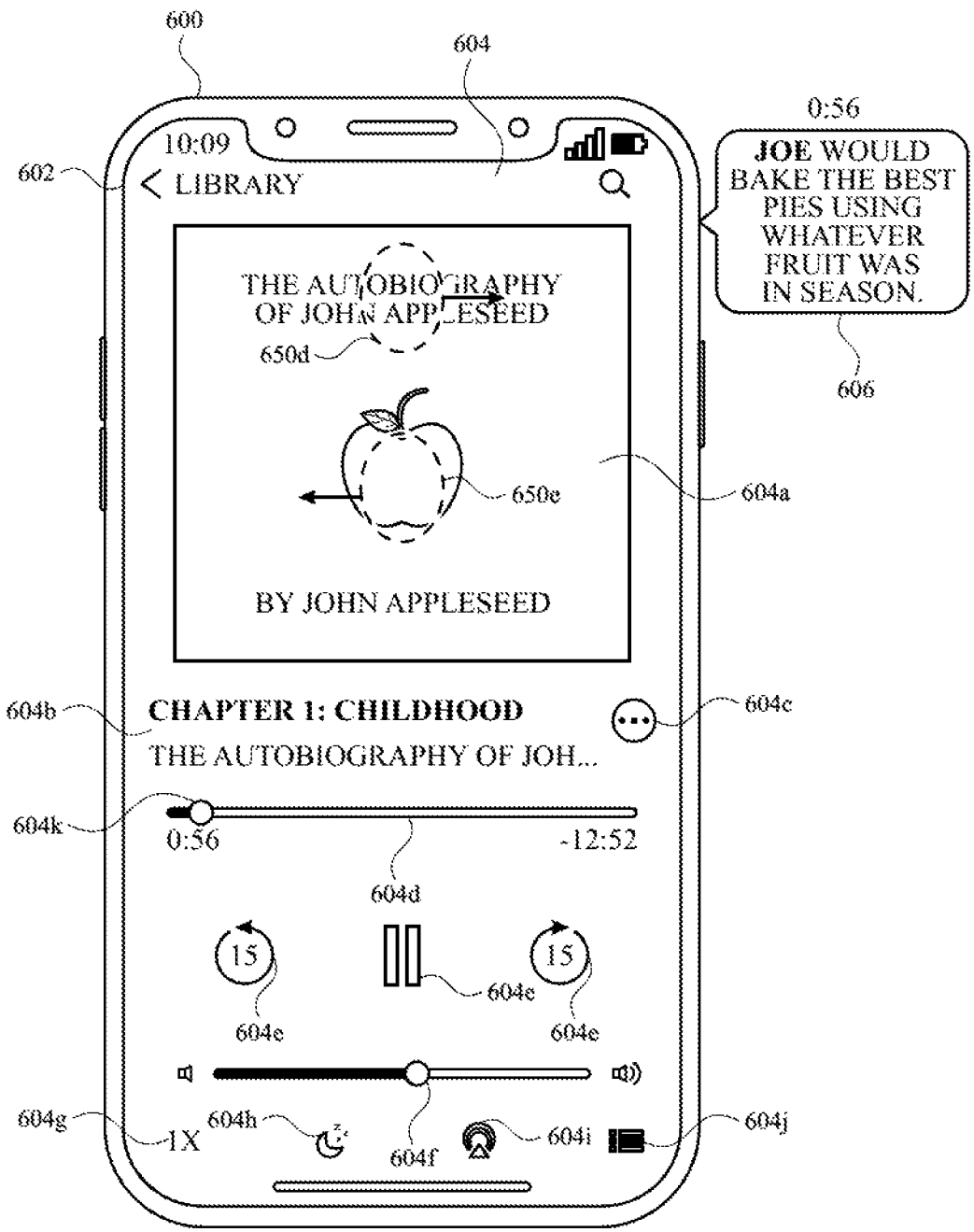

At FIG. 6G, electronic device 600 detects liftoff (e.g., a break of contact from a finger of a user) of user input 650*c*. In response to detecting liftoff of user input 650*c*, electronic device 600 ceases to display text indicator 604*l*. As set forth above, in some embodiments, electronic device 600 resumes audio output of the audiobook file at the time associated with position of thumb 604*k* when liftoff of user input 650*c* is detected. At FIG. 6G, outputted audio 606 includes text representing speech of the audio output at the time associated with the position of thumb 604*k*; outputted audio 606, and other audio indicators described herein, is not a part of the user interface and is provided in these figures to visually illustrate audio being outputted by device 600. Specifically, outputted audio 606 emphasizes a portion of the text (e.g., the word "Joe") indicating a particular portion of audio that is output at the time associated with the position of thumb 604*k*. Accordingly, in response to detecting liftoff of user input 650*c*, electronic device 600 causes playback of the audiobook file (e.g., via a speaker of electronic device 600 (e.g., an internal speaker) and/or via a speaker in communication with electronic device 600 (e.g., headphones connected to electronic device 600 via Bluetooth).

At FIG. 6G, electronic device 600 detects user input 650*d* (e.g., a right swipe gesture on audiobook indicator 604*a*). In response to detecting user input 650*d*, electronic device 600 causes audio output of the audiobook file to skip forward in time (e.g., fast forward). In some embodiments, electronic device 600 causes audio output of the audiobook file to skip forward a predetermined amount of time (e.g., 10 seconds, 15 seconds, 20 seconds, 30 seconds, 34 seconds). Alternatively, electronic device 600 detects user input 650*e* (e.g., a left swipe gesture on audiobook indicator 604*a*). In response to detecting user input 650*e*, electronic device 600 causes audio output of the audiobook file to skip backwards in time (e.g., rewind). In some embodiments, electronic device 600 causes audio output of the audiobook file to skip backwards by a predetermined amount of time (e.g., 10 seconds, 15 seconds, 20 seconds, 30 seconds, 34 seconds). In some embodiments, the predetermined amount of time is based on an amount of movement associated with user input 650*d* and/or 650*e* (e.g., a larger amount of movement of user input 650*d* and/or 650*e* increases the predetermined amount of time compared to a smaller amount of movement of user input 650*d* and/or 650*e*). In some embodiments, the predetermined amount of time is based on user selection, as discussed below with reference to FIG. 6N.

In some embodiments, user input 650*d* and/or 650*e* causes electronic device 600 to skip forward and/or backwards in time by a predefined structural component of speech of the audio (e.g., skip forward to a sentence and/or paragraph following a current sentence and/or paragraph and/or skip backwards to a preceding sentence and/or paragraph from the current sentence and/or paragraph). In some embodiments, electronic device 600 determines whether to skip forward and/or backwards by the predetermined amount of time or the predefined structural component based on user selection. For example, as set forth below with reference to FIG. 6N, electronic device 600 enables a user to select that user input 650*d* and/or 650*e* causes electronic device 600 to skip forward and/or backward in time by a sentence and/or a paragraph instead of a predetermined amount of time.

In response to user input 650*d*, electronic device 600 causes movement of audiobook indicator 604*a* to visually indicate to a user of electronic device 600 that user input 650*d* was detected. For example, at FIG. 6H, audiobook indicator 604*a* moves from a center position on display 602 (e.g., as shown at FIG. 6G) in a first direction (e.g., a rightward direction) toward an edge of display 602. In some embodiments, a portion of audiobook indicator 604*a* moves off of display 602 in response to user input 650*d*. A user of electronic device 600 may thus visually comprehend that user input 650*d* was detected by electronic device 600 and that audio output of the audiobook file has been skipped forward in time.

Figure 6H:
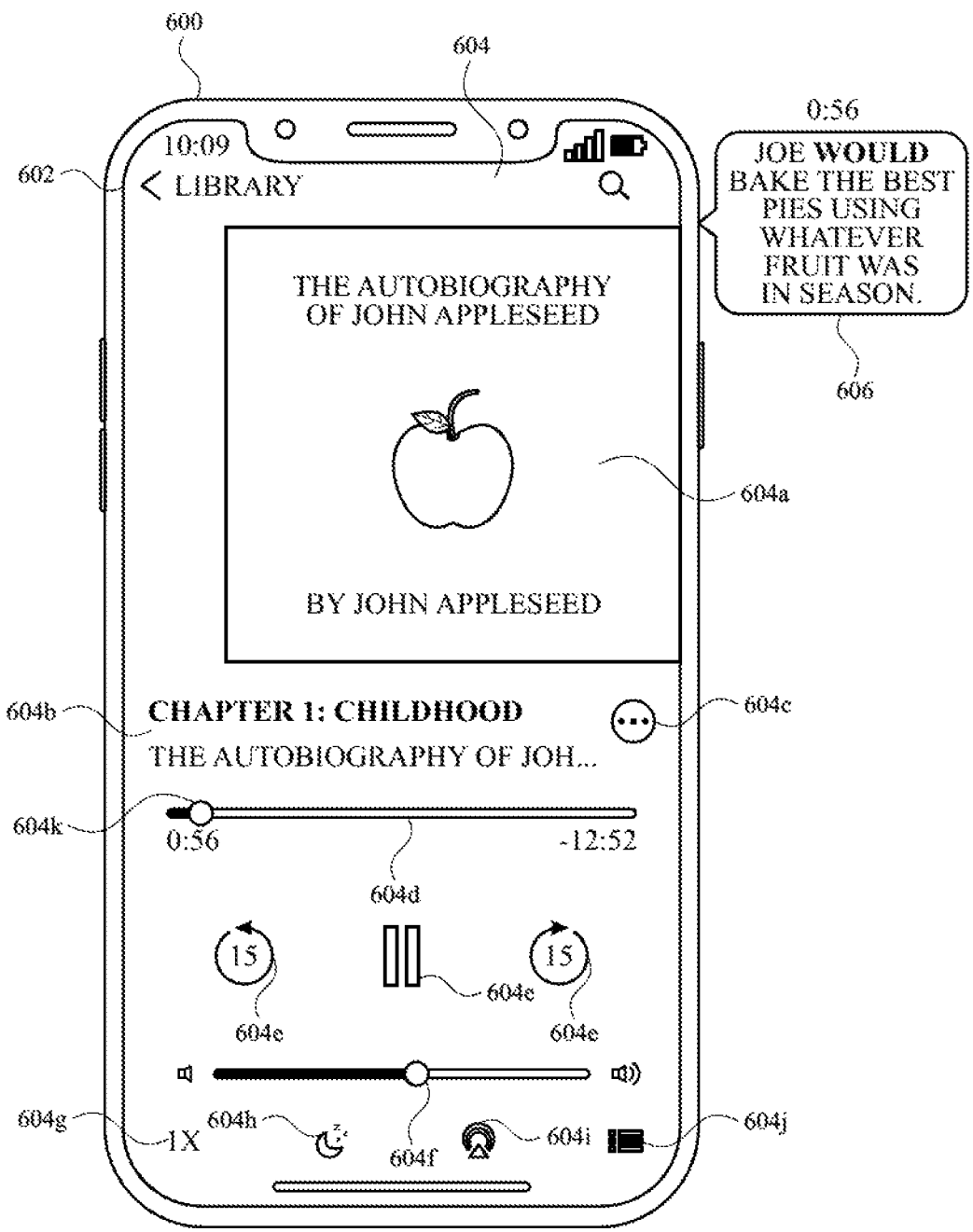
Figure 6I:
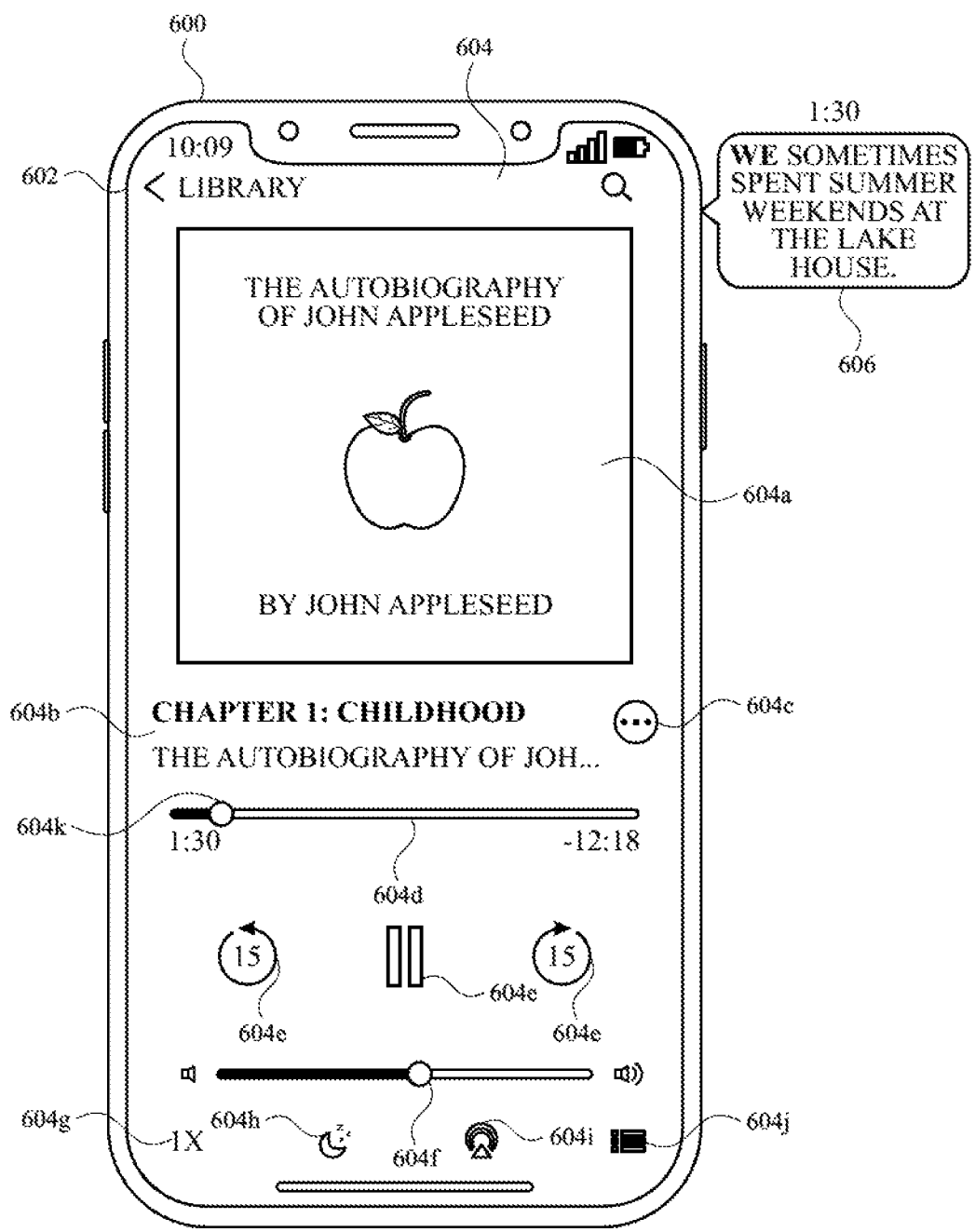

At FIG. 6I, electronic device 600 causes a position of thumb 604*k* to move from a first position (e.g., as shown at FIGS. 6G and 6H) to a second position. The second position of thumb 604*k* is associated with a later time of the audiobook file than the first position of thumb 604*k*. As such, user input 650*d* causes playback of audio of the audiobook file to skip forward and begin playback of audio of the audiobook file at a time associated with the second position of thumb 604*k*. At FIG. 6I, outputted audio 606 includes text representing speech of the audio output at the time associated with the second position of thumb 604*k*. Specifically, outputted audio 606 emphasizes a portion of the text (e.g., the word "We") indicating the portion of audio that is output at the particular time associated with the second position of thumb 604*k*. Thus, electronic device 600 causes audio output of the audiobook file to skip forward, thereby playing back audio at a later time than the audio playing before electronic device detects user input 650*d*.

Figure 6J:
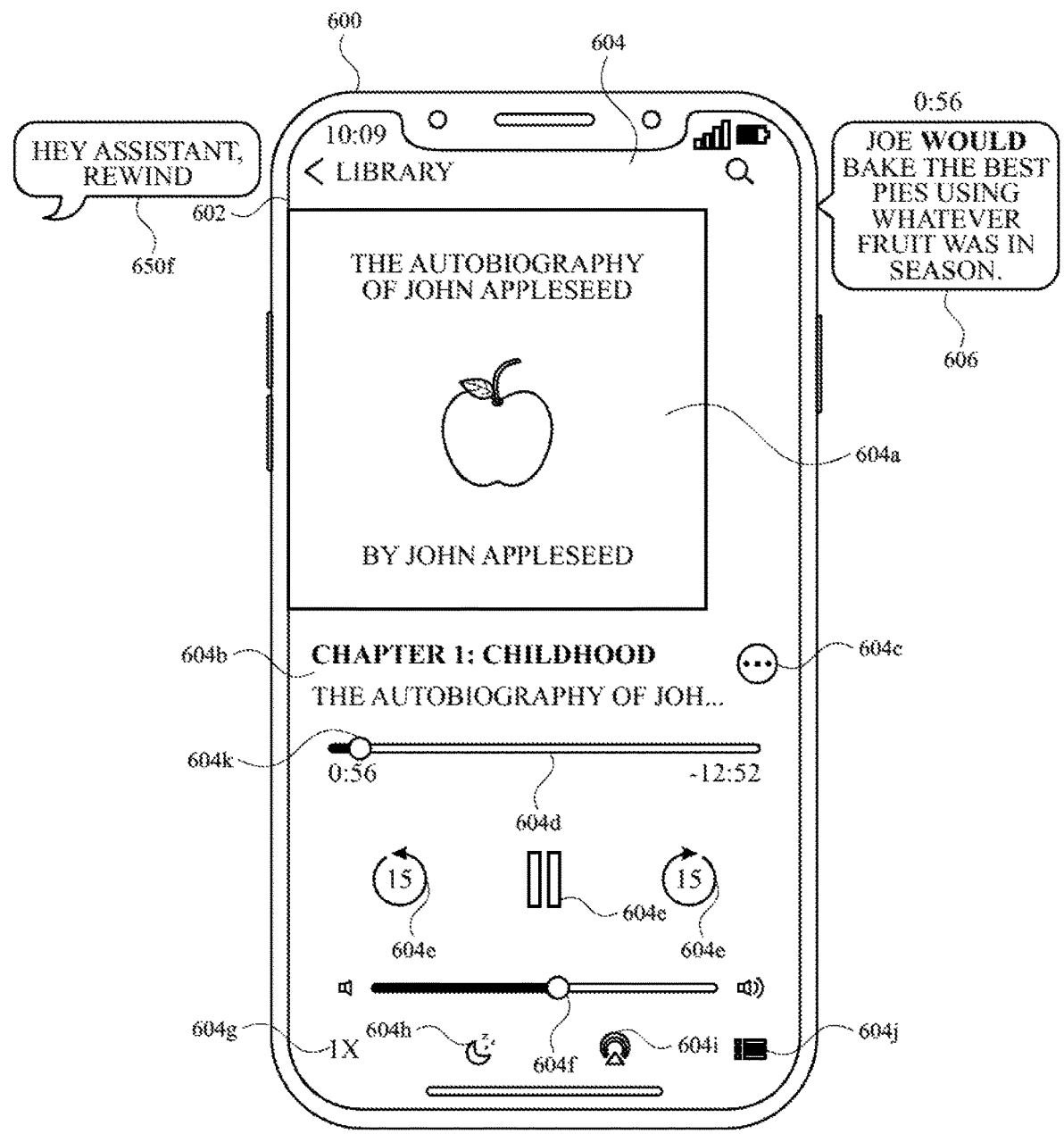

In some embodiments, electronic device 600 is configured to cause audio output to skip forward in time and/or skip backwards in time via voice commands in addition to user gestures (e.g., tap gestures and/or swipe gestures). At FIG. 6J, electronic device 600 detects user input 650*f* (e.g., a voice command stating "Hey Assistant, Rewind"). In response to detecting user input 650*f*, electronic device 600 causes playback of audio of the audiobook file to skip backward in time (e.g., because user input 650*f* including the voice command "Rewind"). At FIG. 6J, outputted audio 606 emphasizes a portion of the text (e.g., the word "would") indicating the portion of audio that is output at the particular time associated with the position of the thumb 604*k*.

Figure 6K:
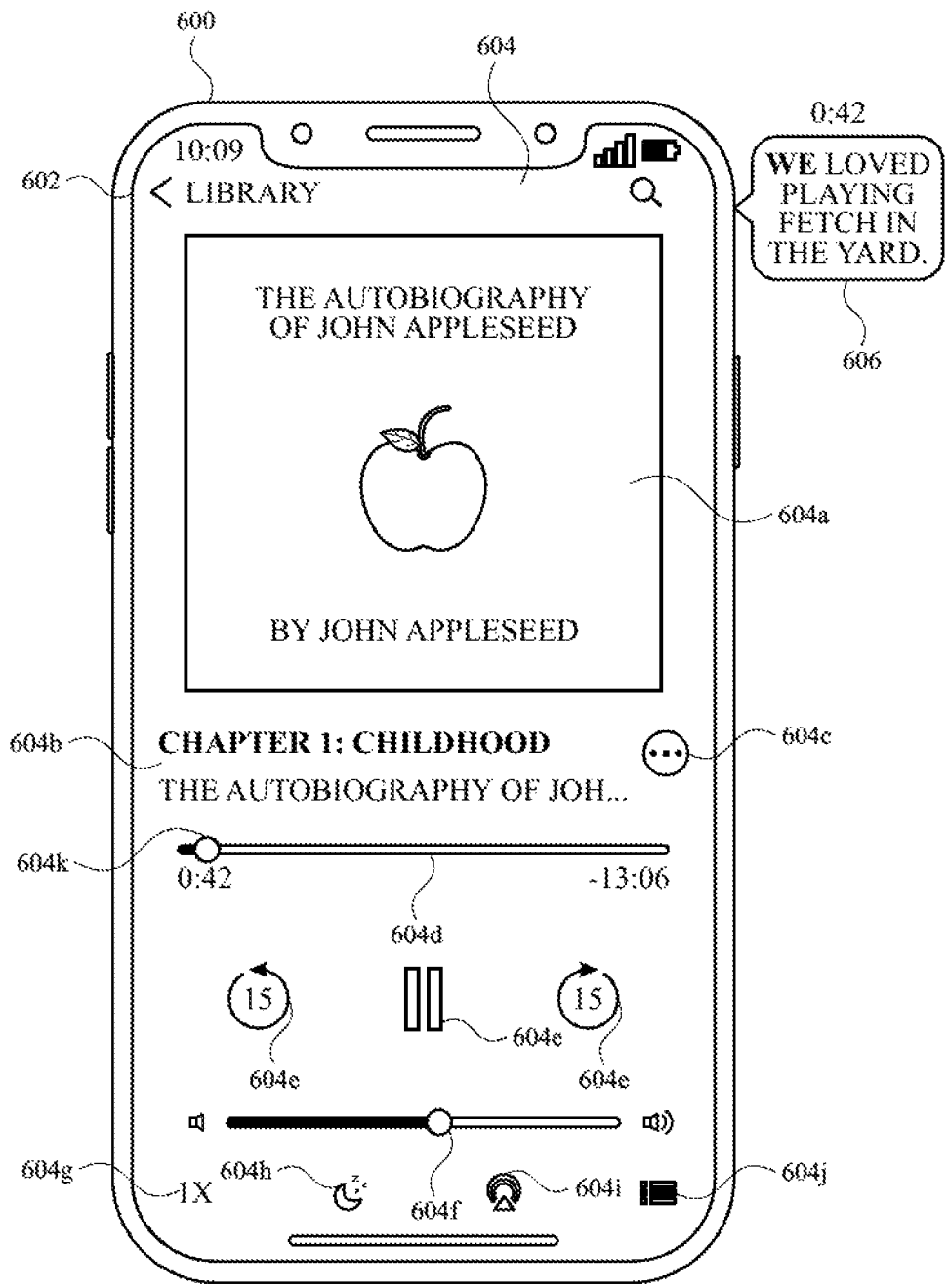

At FIG. 6K, electronic device 600 causes a position of thumb 604*k* to move from the first position (e.g., as shown at FIGS. 6G and 6K) to a third position. The third position of thumb 604*k* is associated with an earlier time of the audiobook file than the first position of thumb 604*k*. As such, user input 650*f* causes playback of audio of the audiobook file to skip backward and begin playback of audio of the audiobook file at a time associated with the third position of thumb 604*k*. At FIG. 6K, outputted audio 606 includes text representing speech of the audio output at the time associated with the third position of thumb 604*k*. Specifically, outputted audio 606 emphasizes a portion of the text (e.g., the word "We") indicating the portion of audio output at the particular time associated with the third position of thumb 604*k*. Thus, electronic device 600 causes audio output of the audiobook file to skip backwards in time, thereby playing back audio at an earlier time than the audio playing before electronic device detects user input 650*f*.

At FIG. 6K, in response to detecting user input 650*f*, electronic device 600 causes movement of audiobook indicator 604a in a second direction (e.g., in a leftward direction), opposite the first direction, indicating that electronic device 600 detected user input 650f. Accordingly, electronic device 600 displays a visual indication that user input 650f was detected. Further, electronic device 600 visually indicates whether audio output is skipped forward (e.g., by moving audiobook indicator 604a in the first direction) or skipped backward (e.g., by moving audiobook indicator 604a in the second direction) in time, such that the user of electronic device 600 receives a visual confirmation of the user input 650d, 650e, and/or 650f.

Figure 6L:
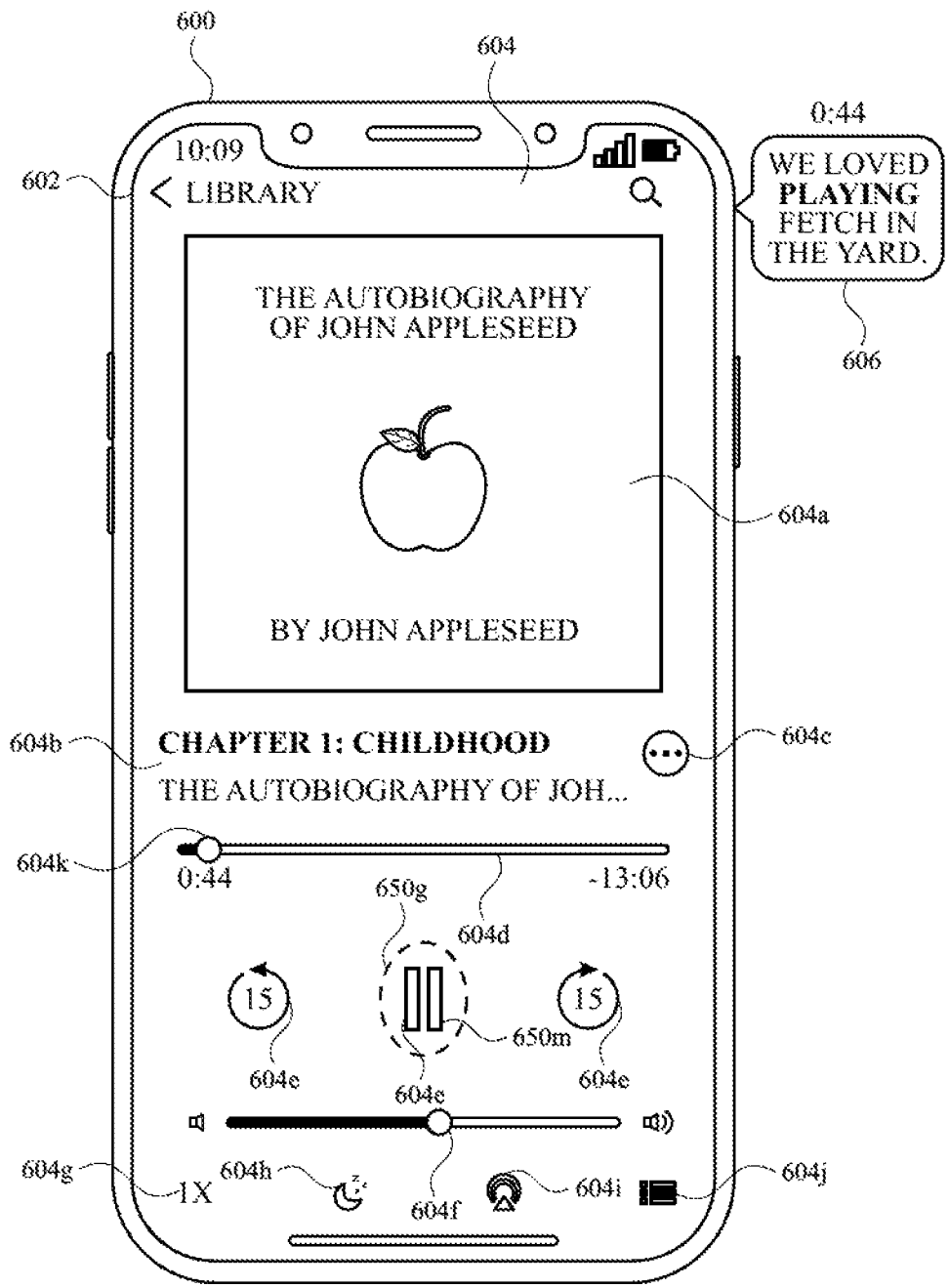

At FIG. 6L, electronic device 600 continues playback of audio of the audiobook file as compared to FIG. 6K. Outputted audio 606 emphasizes a portion of the text (e.g., the word "playing") indicating the portion of audio output at the particular time associated with a fourth position of thumb 604k (e.g., 0:44). At FIG. 6L, electronic device 600 detects tap gesture 650g on pause user interface object 604m of audio control user interface objects 604e. In response to detecting tap gesture 650g, electronic device 600 ceases to cause audio output of the audiobook file (e.g., via a speaker of electronic device 600 (e.g., internal speakers) and/or via a speaker in communication with electronic device 600).

Figure 6M:
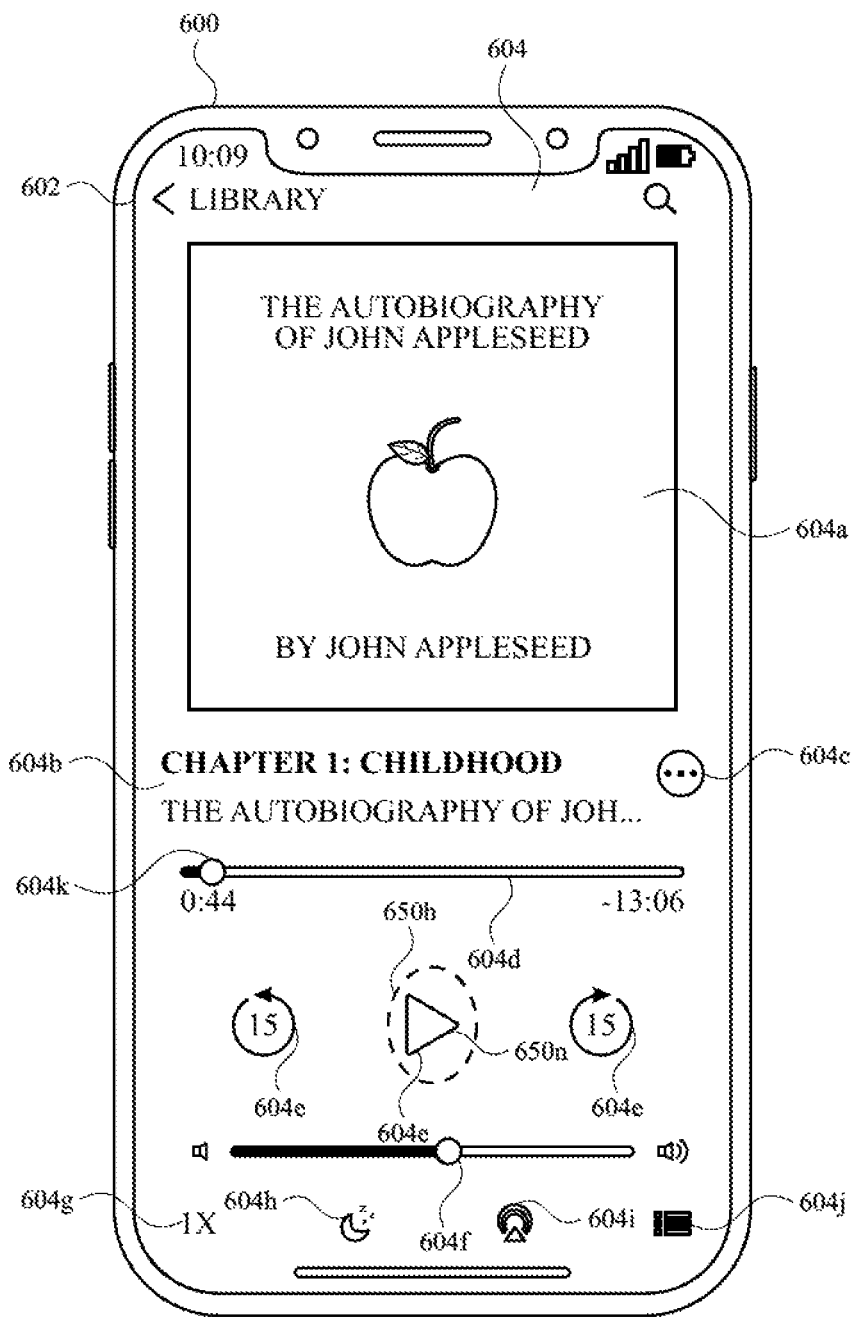

At FIG. 6M, outputted audio 606 is not displayed, thereby indicating that audio output has ceased in response to electronic device 600 detecting tap gesture 650g. In addition, in response to detecting tap gesture 650g, electronic device 600 ceases to display pause user interface object 604m and displays play user interface object 604n of audio control user interface objects 604e. Display of pause user interface object 604m and play user interface object 604n visually indicates to user whether audio output of the audiobook file is occurring (e.g., when pause user interface object 604m is displayed) or not occurring (e.g., when play user interface object 604n is displayed). At FIG. 6M, electronic device 600 detects tap gesture 650h on play user interface object 604n. In response to detecting tap gesture 650h, electronic device 600 causes resumption of audio output of the audiobook file.

In some embodiments, resumption of audio output of the audiobook file includes playing back audio at a time associated with a position of thumb 604k (e.g., resuming playback at any position within a structural component of speech (e.g., a sentence and/or a paragraph) of the audio at the time associated with the position of thumb 604k). For example, at FIG. 6L, electronic device 600 ceases audio output at a first time (e.g., 0:44) associated with a position of thumb 604k when electronic device 600 detects tap gesture 650g. In response to detecting tap gesture 650h at FIG. 6M, electronic device 600 can resume playback of audio output at the first time (e.g., 0:44), such that the word "playing" of the speech of the audio is output (e.g., as shown by outputted audio 606 at FIG. 6L).

In some embodiments, electronic device 600 resumes audio output at a beginning of a structural component (e.g., a sentence and/or a paragraph) of the speech of the audio instead of resuming audio output at the time associated with the position of thumb 604k when tap gesture 650g is detected. For example, in response to detecting tap gesture 650h at FIG. 6M, electronic device 600 may skip backward in time to a beginning of a structural component of speech of the audio, where the structural component of speech of the audio includes a word that would be output at the time associated with the position of thumb 604k when tap gesture 650g is detected. Thus, electronic device 600 resumes playback of audio at a second time (e.g., 0:42) that is before the first time (e.g., 0:44) to initiate audio output at the beginning of the structural component of speech of the audio. In other words, electronic device 600 resumes audio output at the second time (e.g., 0:42) instead of resuming audio output at the first time (e.g., 0:44) when tap gesture 650g was detected. Initiating playback of the audio output at the beginning of the structural component of speech of the audio may facilitate user comprehension of the audio. For example, a user may pause audio output (e.g., via tap gesture 650g) and resume audio output (e.g., via tap gesture 650h) after a prolonged interval (e.g., one hour and/or one day later). Accordingly, by resuming audio output at the beginning of the structural component of speech of the audio, a user receives additional context to refresh their memory related to the audio output at the time when tap gesture 650g was detected (e.g., when electronic device 600 caused audio output to pause).

As set forth above, electronic device 600 may skip forward and/or skip backward in time in response to user input 650d, 650e, and/or 650f by a predetermined amount of time or by a predefined structural component of speech of the audio. For example, at FIG. 6N, electronic device 600 displays settings user interface 608. Settings user interface 608 includes predetermined time area 610, control options area 612, and reset user interface object 608a.

At FIG. 6N, predetermined time area 610 includes skip forward user interface object 610a and skip backward user interface object 610b. As set forth above, in some embodiments, electronic device 600 causes audio output to skip forward and/or skip backwards by a predetermined period of time in response to user input 650d, 650e, and/or 650f. In response to detecting user input on skip forward user interface object 610a, electronic device 600 enables a user to select a first predetermined period of time for skipping audio output forward in time (e.g., 15 seconds). Similarly, in response to detecting user input on skip backward user interface object 610b, electronic device 600 enables a user to select a second predetermined period of time for skipping audio output backward in time (e.g., 15 seconds). In some embodiments, the first predetermined period of time and the second predetermined period of time are different from one another.

At FIG. 6N, control options area 612 includes user interface objects 612a-612d configured to adjust a setting for skipping audio output forward and/or backwards in time. First user interface object 612a corresponds to skipping audio output forward and/or backward in time by a predefined portion of the audiobook file (e.g., a chapter and/or a section of the audiobook file). Second user interface object 612b corresponds to skipping audio output forward and/or backward in time by the predetermined period of time (e.g., the first predetermined period of time associated with skip forward user interface object 610a and the second predetermined period of time associated with skip backward user interface object 610b). Third user interface object 612c corresponds to skipping audio output forward and/or backward in time by a first structural component of speech of the audio (e.g., a sentence). Fourth user interface object 612d corresponds to skipping audio output forward and/or backward in time by a second structural component of speech of the audio (e.g., a paragraph). Accordingly, electronic device 600 adjusts an amount by which audio is skipped forward and/or skipped backward (e.g., in response to user input 650d, 650e, and/or 650f) based on user input corresponding to one of user interface objects 612a-612d.

In some embodiments, settings user interface 608 is configured to adjust audio output settings for other devices (e.g., external devices) in addition to electronic device 600.

For example, electronic device 600 can be in communication with (e.g., wirelessly connected to) external devices that output and/or control output of audio of the audiobook file (e.g., by receiving a transmission from electronic device 600). Accordingly, the external devices are also configured to skip forward and/or backward in time based on the selected setting of settings user interface 608 in response to detecting user input (e.g., user input to the external device).

FIG. 7 is a flow diagram illustrating a method for displaying text corresponding to speech of an audio file using an electronic device in accordance with some embodiments. Method 700 is performed at a computer system (e.g., 100, 300, 500, 600) with a display generation component and one or more input devices. Some operations in method 700 are, optionally, combined, the orders of some operations are, optionally, changed, and some operations are, optionally, omitted.

As described below, method 700 provides an intuitive way for displaying text corresponding to speech of an audio file. The method reduces the cognitive burden on a user for accessing and/or finding a particular portion of the audio file, thereby creating a more efficient human-machine interface. For battery-operated computing devices, enabling a user to access a particular portion of the audio file faster and more efficiently conserves power and increases the time between battery charges.

In method 700, the computer system (e.g., 600) (e.g., a smart phone; a tablet computer; a personal computer; an electronic document reader) is in communication with a display generation component (e.g., 602) (e.g., an integrated display, a connected (e.g., wirelessly) display) and one or more input devices (e.g., a touch-sensitive surface (e.g., a touchscreen); a mouse). The computer system (e.g., 600) displays (702), via the display generation component (e.g., 602), a media playback interface (e.g., 604) (e.g., an interface of an audiobook playback application) that includes a set of one or more media playback control user interface objects (e.g., 604*c*, 604*d*, 604*e*, 604*g*, 604*h*, 604*i*, 604*j*, and/or 604*k*). The set of one or more media playback control user interface objects (e.g., 604*c*, 604*d*, 604*e*, 604*g*, 604*h*, 604*i*, 604*j*, and/or 604*k*) includes a selectable playback position indicator (e.g., 604*k*). In some embodiments, the selectable playback position indicator is displayed relative to (e.g., is positioned on) a graphical user interface object (e.g., a line; a trough of a scrubber bar) that depicts the total playback duration of the first media item. In some embodiments, the selectable playback position indicator is the thumb of a scrubber bar.

While the media playback interface (e.g., 604) is configured to control playback of a first media item (704) (e.g., an audiobook; a vocal recording), the first media item includes audio content that includes speech (e.g., recorded human speech; synthesized speech), the computer system (e.g., 600) detects (706), via the one or more input devices, a first input (e.g., 650*a*, 650*b*, and/or 650*c*) (e.g., a swipe gesture; a held mouse click with movement of the mouse) corresponding to the selectable playback position indicator (e.g., 604*k*).

While the media playback interface (e.g., 604) is configured to control playback of a first media item (704) (e.g., an audiobook; a vocal recording), the first media item includes audio content that includes speech (e.g., recorded human speech; synthesized speech), and in response to detecting the first input (708), the computer system (e.g., 600) moves (710) the selectable playback position indicator (e.g., 604*k*) from a first position that corresponds to a first playback time (e.g., the start; the end; a time measured in hours, minutes, and/or seconds) of the first media item to a second position that corresponds to a second playback time of the first media item.

While the media playback interface (e.g., 604) is configured to control playback of a first media item (704) (e.g., an audiobook; a vocal recording), the first media item includes audio content that includes speech (e.g., recorded human speech; synthesized speech), and in response to detecting the first input (708), the computer system (e.g., 600) displays (712), via the display generation component (e.g., 602), first text (e.g., 604*l*) representing speech of the audio content of the first media item (e.g., a transcription of the speech) that corresponds to the second playback time (e.g., the text includes at least speech at the precise second playback time; the text includes speech that is the closest detected speech to the second playback time (e.g., closest detected speech either before or after; closest detected speech after)).

Displaying the first text representing speech of the audio content of the first media item provides improved visual feedback to the user. For example, the user may comprehend a portion of the audio content visually, thus facilitating the user's ability to select a portion of the audio content for playback. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, displaying the first text (e.g., 604*l*) representing speech of the audio content of the first media item includes the computer system (e.g., 602) overlaying the first text over one or more graphical elements (e.g., 604*b*) (e.g., a playback control of the set of one or more media playback control user interface objects; a non-selectable graphical element) of the media playback interface (e.g., 604). In some embodiments, the first text is displayed in a pop-up window or bubble overlaid on the interface.

In some embodiments, the first text (e.g., 604*l*) includes an entirety of the words of a grammatical structure of a first type (e.g., a sentence; independent clause; paragraph) that corresponds to the second playback time.

In some embodiments, the first text (e.g., 604*l*) is a first instance of the grammatical structure of the first type (e.g., is a first sentence; first paragraph). Additionally, while the computer system (e.g., 600) displays the selectable playback position indicator (e.g., 604*k*) at the second position and while the computer system (e.g., 600) displays the first text (e.g., 604*l*), the computer system (e.g., 600) detects, via the one or more input devices, a second user input (e.g., 650*a*, 650*b*, and/or 650*c*) (e.g., continuation of the first input; an input distinct from the first input) corresponding to the selectable playback position indicator (e.g., 604*k*). In response to detecting the second user input (e.g., 650*a*, 650*b*, and/or 650*c*), the computer system (e.g., 600) moves the selectable playback position indicator (e.g., 604*k*) from the second position to a third position that corresponds to a third playback time of the first media item that does not correspond to speech that is included in the first instance of the grammatical structure of the first type (e.g., the second playback time corresponds to a first sentence and the third playback time corresponds to a different sentence). In response to detecting the second user input (e.g., 650*a*, 650*b*, and/or 650*c*), the computer system (e.g., 600) displays, via the display generation component (e.g., 602), second text (e.g., 604*l*) representing speech of the audio content of the first media item (e.g., a transcription of the speech) that includes an entirety of the words of a second instance of the grammatical structure of the first type. The second instance is adjacent to the first instance in the speech included in the audio content (e.g., the next sentence or the previous sentence from the sentence of the first text). In some embodiments, once the playback indicator is moved beyond a time associated with the currently displayed sentence (e.g., the first text), the previous or next sentence is displayed.

In some embodiments, the first text (e.g., **604*l***) is displayed as part of a scrolling set of text that represents speech of the audio content of the first media item that corresponds to the period between (e.g., that includes and/or spans the first and second playback times) the first playback time and the second playback time.

In some embodiments, in accordance with a determination that the media playback user interface (e.g., 604) is currently configured (e.g., configured via a settings user interface) to display text representing speech of the audio content in a first manner, the computer system (e.g., 600) displays the first text (e.g., **604*l*) as a plurality of words of a grammatical structure of a second type (e.g., different than the first type; the same as the first type) that corresponds to the second playback time. In some embodiments, in accordance with a determination that the media playback user interface (e.g., 604) is currently configured to display text representing speech of the audio content in a second manner, the computer system (e.g., 600) displays the first text (e.g., 604*l***) as part of a scrolling set of text that represents speech of the audio content of the first media item that corresponds to the period between the first playback time and the second playback time.

In some embodiments, the first user input (e.g., **650*a*, 650*b*, and/or 650*c*) includes movement of a touch and hold gesture on the selectable playback position indicator (e.g., 604*k***).

In some embodiments, while the computer system (e.g., 600) displays the selectable playback position indicator (e.g., **604*k*) at the second position and while the computer system (e.g., 600) displays the first text (e.g., 604*l*), the computer system (e.g., 600) detects, via the one or more input devices, a fourth user input (e.g., 650*a*, 650*b*, and/or 650*c*) (e.g., continuation of the first input; an input distinct from the first input) corresponding to the selectable playback position indicator (e.g., 604*k*). In response to the fourth user input (e.g., 650*a*, 650*b*, and/or 650*c*), the computer system (e.g., 600) moves the selectable playback position indicator (e.g., 604*k*) to a fourth position that corresponds to a fourth playback time of the first media item. In response to the fourth user input (e.g., 650*a*, 650*b*, and/or 650*c*) and in accordance with a determination that the fourth playback time precedes (e.g., is earlier in the sequential playback of the first media item) the second playback time, the computer system (e.g., 600) displays third text (e.g., 604*l*) representing speech of the audio content of the first media item that precedes the speech of the audio content of the first media item that is represented by the first text (e.g., 604*l*). In response to the fourth user input (e.g., 650*a*, 650*b*, and/or 650*c*) and in accordance with a determination that the fourth playback time succeeds (e.g., is later in the sequential playback of the first media item) the second playback time, the computer system (e.g., 600) displays fourth text (e.g., 604*l*) representing speech of the audio content of the first media item that succeeds the speech of the audio content of the first media item that is represented by the first text (e.g., 604*l*). In some embodiments, the third text (e.g., 604*l*) represents speech that is immediately adjacent to the speech represented by the first text (e.g., 604*l*). In some embodiments, the third text (e.g., 604*l*) represents speech that corresponds to the fourth playback time that is not adjacent to the speech represented by the first text (e.g., 604*l***) (e.g., there is intervening speech between the speech represented by the third and first texts).

In some embodiments, the first user input (e.g., **650*a*, 650*b*, and/or 650*c*) includes a sustained input component (e.g., a contact on a touch-sensitive surface; clicking and holding a mouse button). In some embodiments, the sustained input component of the first input persists after the first input is completed (e.g., the first input is swipe gesture where the contact is maintained after movement ceases). In addition, while computer system (e.g., 600) displays the first text (e.g., 604*l*), the computer system (e.g., 600) detects that the sustained input component has ceased (e.g., that contact has been lifted; that the mouse button is no longer being held). In response to detecting that the sustained input component has ceased, the computer system (e.g., 600) ceases to display the first text (e.g., 604*l***).

In some embodiments, displaying the first text (e.g., **604*l*) includes the computer system (e.g., 600**) displaying an indication of the second playback time.

In some embodiments, the first media item does not include pre-generated text data corresponding to speech of the audio content. In some embodiments, the first media item is received at the computer system (e.g., downloaded) without text data corresponding to speech of the audio content included in the media item or received in conjunction with the media item. In some embodiments, the first text is determined (e.g., generated for display) using one or more speech-to-text functions directly from the audio content of the first media item.

Displaying the first text representing speech of the audio content of the first media item even though the first media item does not include pre-generated text data provides improved visual feedback to the user. For example, the user may comprehend a portion of the audio content visually, thus facilitating the user's ability to select a portion of the audio content for playback. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, while computer system (e.g., 600) outputs a first portion of audio content of the first media item (e.g., while playing the first media item), the first portion of audio content includes speech that is part of a first instance of a grammatical structure of a third type (e.g., a sentence; independent clause; paragraph) (e.g., different than the first type and/or the second type; the same as the first type and/or the second type), the computer system (e.g., 600) detects, via the one or more input devices, a fifth user input (e.g., **650*d*, 650*e*, and/or 650*f*) (e.g., an input corresponding to a request to skip back or skip ahead in the first media item). In some embodiments, the first portion of audio content includes speech that is part of a first sentence. In response to the fifth user input (e.g., 650*d*, 650*e*, and/or 650*f*) and in accordance with a determination that a second instance of the grammatical structure of the third type starts at a fifth playback time of the first media item, the second instance of the grammatical structure of the third type is adjacent to the first instance of the grammatical structure of the third type in the speech included in the audio content (e.g., the next sentence or the previous sentence from the sentence that was being outputted), the computer system (e.g., 600) outputs (e.g., by skipping ahead or back) a second portion of the audio content of the first media item that starts at the fifth playback time. In response to the fifth user input (e.g., 650***d*, 650*e*, and/or 650*f*) and in accordance with a determination that the second instance of the grammatical structure of the third type starts at a sixth playback time of the first media item, the computer system (e.g., 600) outputs a third portion of the audio content of the first media item that starts at the sixth playback time. In some embodiments, while playing the first media item, the computer system (e.g., 600) skips ahead or rewinds playback of audio that includes speech by a predefined structural component of the speech (e.g., a sentence or a paragraph).

In some embodiments, while the computer system (e.g., 600) outputs audio content of the first media item (e.g., while playing the first media item) that includes speech that is part of a first instance of a grammatical structure of a fourth type (e.g., a sentence; independent clause; paragraph) (e.g., different than the first, second, and/or third type; the same as the first, second, and/or third type), the computer system (e.g., 600) detects, via the one or more input devices, a sixth user input (e.g., 650*g*) (e.g., an input corresponding to a request to pause playback of the first media item). In some embodiments, the audio content of the first media item includes speech that is part of a first sentence. In response to the sixth user input (e.g., 650*g*), the computer system (e.g., 600) pauses output of the audio content of the first media item. After pausing output of the audio content of the first media item, the computer system (e.g., 600) detects, via the one or more input devices, a seventh user input (e.g., 650*h*) (e.g., an input corresponding to a request to resume output). In response to detecting the seventh user input (e.g., 650*h*), the computer system (e.g., 600) resumes output of the audio content of the first media item at a seventh playback time that includes (e.g., matches) speech that is at the start of the first instance of the grammatical structure of the fourth type. In some embodiments, after pausing playback, resumption of playback starts from the beginning of the current structural component of the speech in the audio (e.g., resuming playback at the start of a sentence after pausing in the middle of the sentence).

In some embodiments, the grammatical structure of the third type is a user-selectable type of grammatical structure. In some embodiments, the user can configure the type of grammatical structure (e.g., sentence, paragraph) that is used when skipping ahead or back.

In some embodiments, the grammatical structure of the third type is a sentence or a paragraph.

In some embodiments, the user selected grammatical structure (e.g., sentence or paragraph) is transmitted to one or more external computer systems and used by such systems to control the unit of skipping forward or backwards while playing back media items (e.g., while playing back the first media item).

In some embodiments, the media playback interface (e.g., 604) includes a graphical representation of the first media item (e.g., 604*a*) (e.g., a book cover) and the fifth user input is a swipe gesture (e.g., 650*d* and/or 650*e*) corresponding to the graphical representation of the first media item (e.g., 604*a*).

In some embodiments, the fifth user input is a voice input (e.g., 650*f*) (e.g., a spoken command) detected by one or more microphones in connection with the computer system (e.g., 600).

Note that details of the processes described above with respect to method 700 (e.g., FIG. 7) are also applicable in an analogous manner to the methods described below/above. For example, methods 900 and 1100 optionally include one or more of the characteristics of the various methods described above with reference to method 700. For example, a user may wish to view text corresponding to speech of the audio content in order to bookmark a specific portion of an audio file. As another example, a user may wish to search for a portion of an audio file that is proximate to a particular portion of the audio file and view the text corresponding to speech of the audio content to ultimately find the particular portion of the audio file. For brevity, these details are not repeated below.

FIGS. 8A-8I illustrate exemplary user interfaces for managing bookmarks of an audio file, in accordance with some embodiments. The user interfaces in these figures are used to illustrate the processes described below, including the processes in FIG. 9.

Figure 8A:
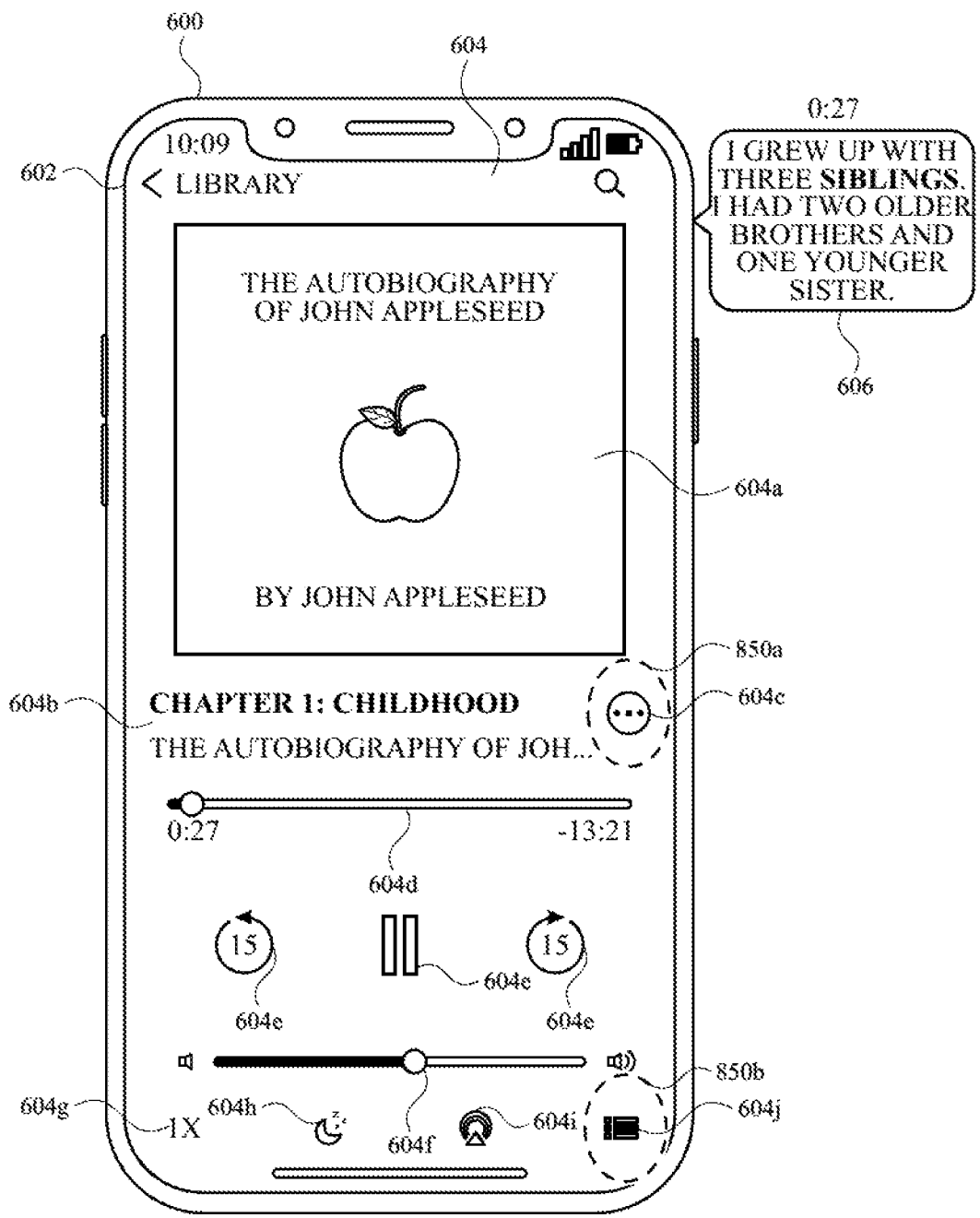
FIGS. 8A-8I illustrate exemplary user interfaces for managing bookmarks of an audio file in accordance with some embodiments.
Figure 9:
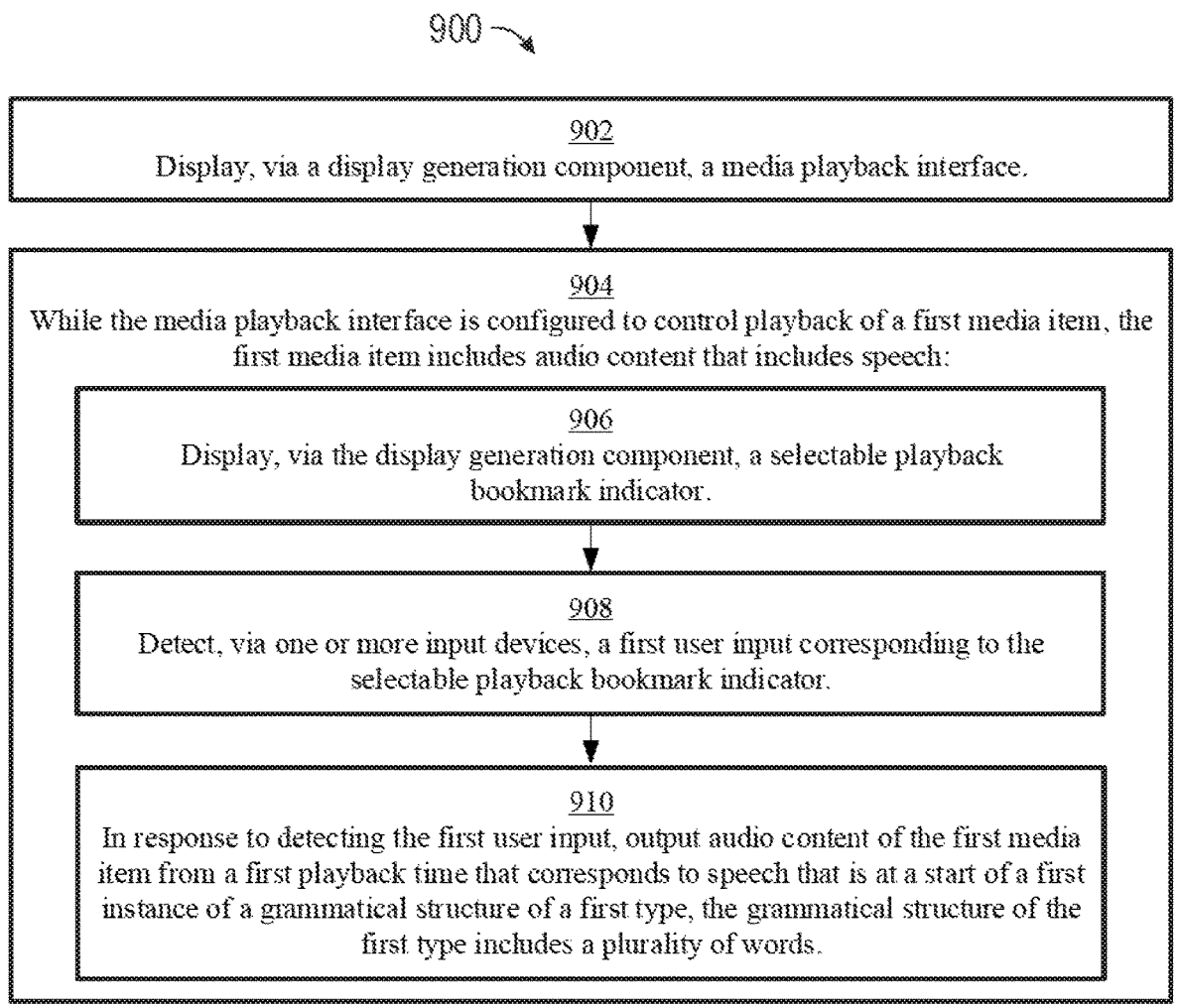
FIG. 9 is a flow diagram illustrating a method for managing bookmarks of an audio file in accordance with some embodiments.

FIG. 8A illustrates electronic device 600 with display 602. At FIG. 8A, electronic device 600 displays, on display 602, media playback user interface 604 associated with the media application (e.g., a books application, an audiobooks application) of electronic device 600.

A user of electronic device 600 may wish to bookmark portions of an audio file configured to be played back by media playback user interface 604. For example, a user may wish to cause playback of an audio file at a particular portion of the audio file that includes specific dialogue and/or lyrics. Media playback user interface 604 includes features that facilitate a user's ability to find and cause playback of particular portions of an audio file that are created and/or stored by electronic device 600.

At FIG. 8A, media playback user interface 604 controls playback of audio of an audiobook file entitled "The Autobiography of John Appleseed." At FIG. 8A, outputted audio 606 illustrates text corresponding to audio currently being output by electronic device 600 (e.g., via internal speakers of electronic device 600 and/or external speakers in communication with electronic device 600). For example, outputted audio 606 indicates that the word "siblings" corresponding to speech of the audio is output at a first time (e.g., 0:27) of the audiobook file. In some embodiments, audio output by electronic device 600 may be paused at the first time (e.g., via detecting user input on audio control user interface objects 604*e* at the first time).

Figure 8B:
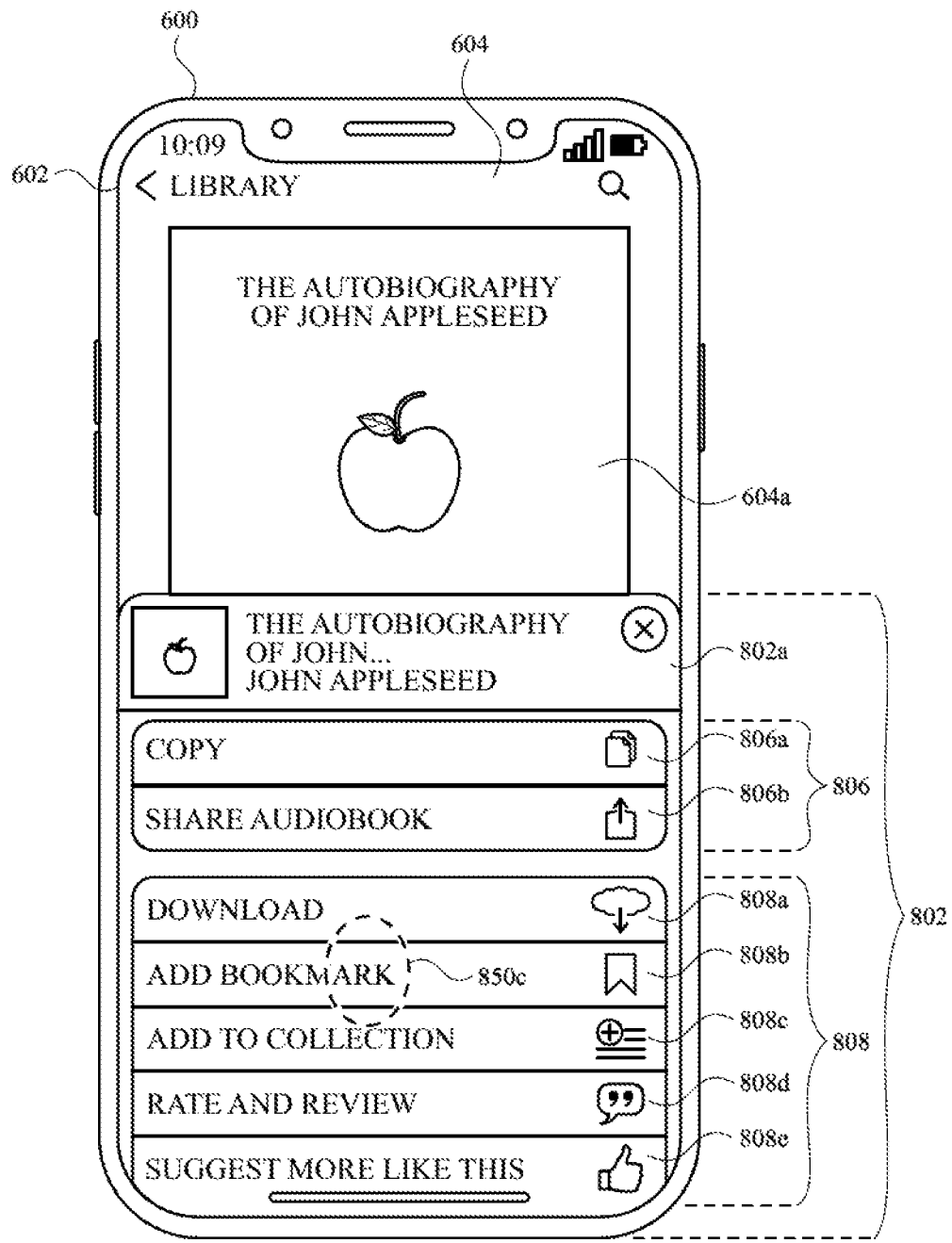
Figure 8C:
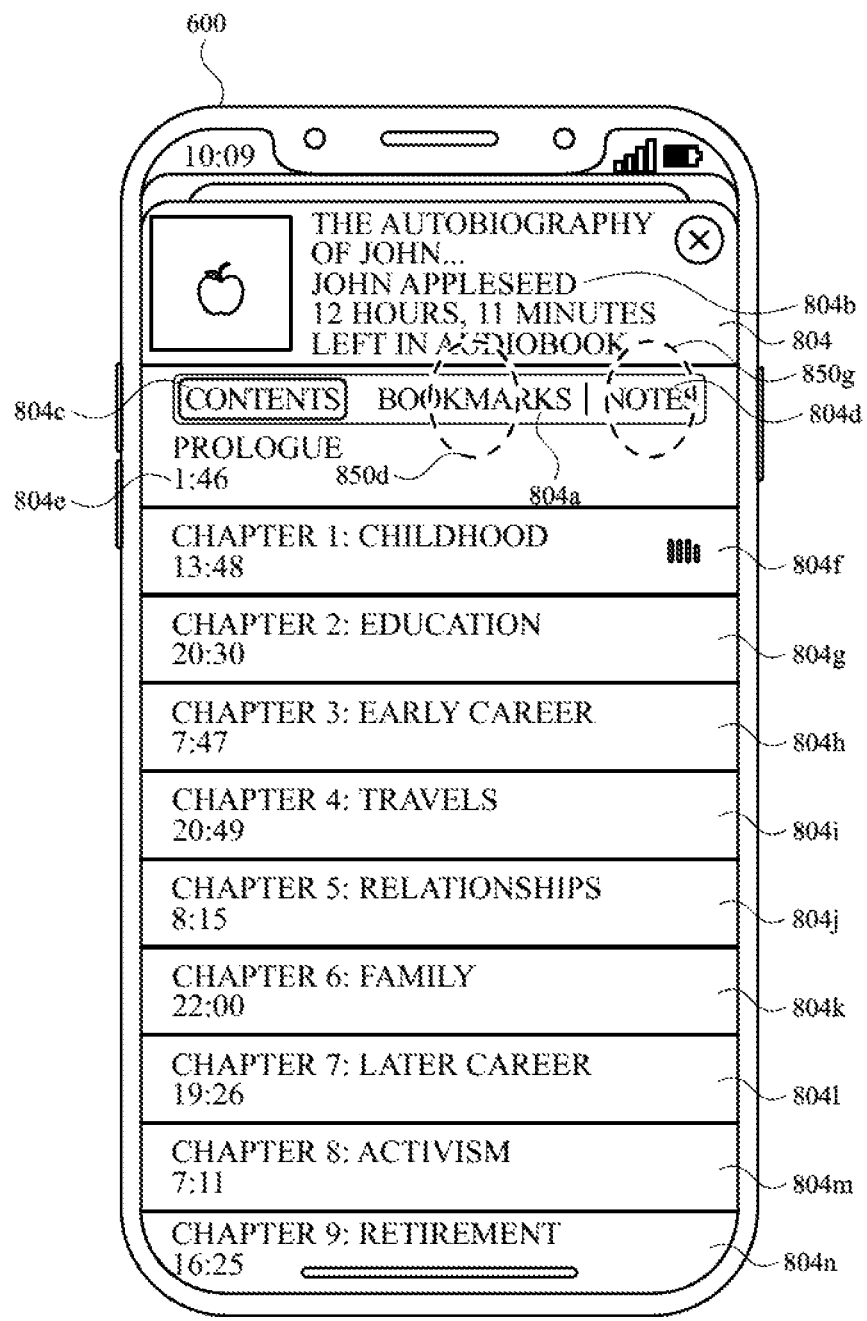

At FIG. 8A, electronic device 600 detects tap gesture 850*a* on settings user interface object 604*c*. In response to detecting tap gesture 850*a* on settings user interface object 604*c*, electronic device 600 displays settings user interface 802, as shown at FIG. 8B. Alternatively, electronic device 600 detects tap gesture 850*b* on table of contents user interface object 604*j*. In response to detecting tap gesture 850*b* on table of contents user interface object 604*j*, electronic device displays table of contents user interface 804, as shown at FIG. 8C.

At FIG. 8B, settings user interface 802 is displayed as partially overlapping (e.g., partially overlaid on) media playback user interface 604. Settings user interface 802 includes audiobook indicator 802*a* (e.g., text indicating a title and/or author of an audiobook file, such as "The Autobiography of John . . . John Appleseed," and/or a visual indication of a cover of the audiobook), first command area 806, and second command area 808. At FIG. 8B, first command area 806 includes copy user interface object 806*a* for copying a link to the audiobook file and share audiobook user interface object 806*b* for initiating a process for sending information associated with the audiobook file to an external device. Additionally, second command area 808 includes download user interface object 808*a*, add bookmark user interface object 808*b*, add to collection user interface object 808*c*, rate and review user interface object 808*d*, and/or suggestions user interface object 808*e*.

At FIG. 8B, electronic device 600 detects tap gesture 850*c* on add bookmark user interface object 808*b*. In response to detecting tap gesture 850*c*, electronic device 600 initiates a process to create a bookmark at a time of the audiobook file when tap gesture 850*c* is detected. In some embodiments, electronic device 600 initiates the process to create a bookmark at the time of the audiobook file when a voice command is detected (e.g., "Hey Assistant, Create a Bookmark").

In response to tap gesture 850*c* and/or voice command, the electronic device 600 creates a bookmark that includes information and/or data corresponding to the audiobook file at the time when tap gesture 850*c* (or voice command) is detected. In some embodiments, the information and/or data of the bookmark includes information and/or data associated with the audiobook file currently being played back via media playback user interface 604 (e.g., a title of the audiobook file and/or a location of data corresponding to audiobook file in media application), text corresponding to speech of the audio of the audiobook file at and/or near the time when tap gesture 850*c* is detected, a time stamp of the time in the audiobook file when tap gesture 850*c* is detected, data associated with a portion of the audiobook file at the time when tap gesture 850*c* is detected (e.g., a chapter title and/or section title of the audiobook file), and/or location information for the particular portion of the audiobook file currently being played back at the time when tap gesture 650*c* is detected (e.g., data storage location information).

A user that creates a bookmark via tap gesture 850*c* may wish to access the bookmark and cause electronic device 600 to output audio of the audiobook file at the time associated with the bookmark (e.g., a time of the audiobook file at which tap gesture 850*c* was detected). Accordingly, electronic device 600 includes bookmark user interface 810 that displays all bookmarks created and/or stored for a particular audiobook file (e.g., the currently selected and/or currently playing audiobook file). Electronic device 600 displays bookmark user interface 810 in response to tap gesture 850*b* on table of contents user interface object 604*j* and tap gesture 850*d* on bookmarks tab 804*a* on table of contents user interface 804.

Figure 8D:
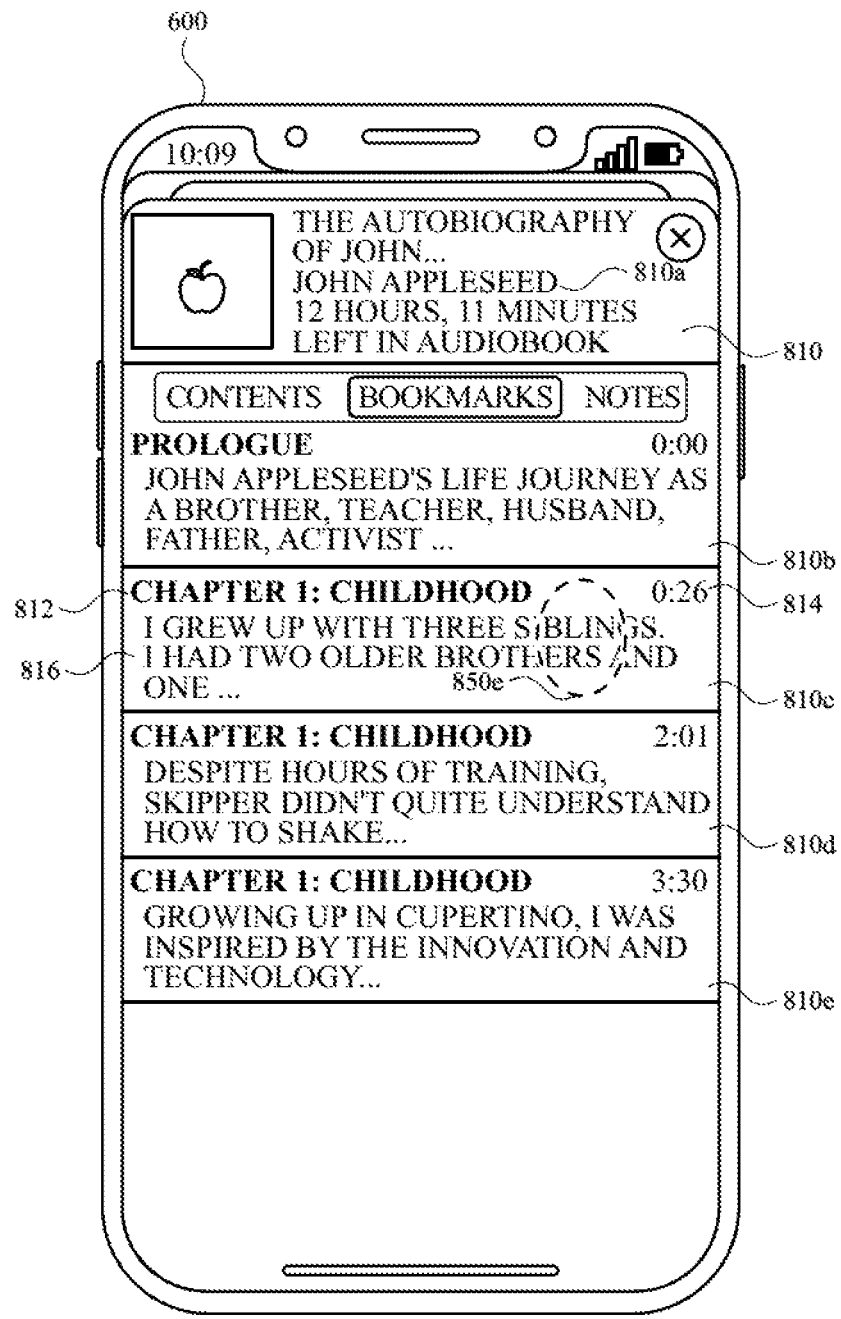

At FIG. 8C, electronic device 600 displays table of contents user interface 804 in response to tap gesture 850*b*. Table of contents user interface 804 includes audiobook indicator 804*b*, contents tab 804*c*, bookmarks tab 804*a*, notes tab 804*d*, and contents user interface objects 804*e*-804*n*. At FIG. 8C, electronic device 600 detects tap gesture 850*d* on bookmarks tab 804*a*. In response to detecting tap gesture 850*d*, electronic device 600 displays bookmark user interface 810, as shown at FIG. 8D. In some embodiments, electronic device 600 displays bookmark user interface 810 in response to a voice command (e.g., "Hey Assistant, Open Bookmarks").

At FIG. 8D, bookmark user interface 810 includes audiobook indicator 810*a*, first bookmark user interface object 810*b*, second bookmark user interface object 810*c*, third bookmark user interface object 810*d*, and fourth bookmark user interface object 810*e*. As set forth above, tap gesture 850*c* on add bookmark user interface object 808*b* causes electronic device 600 to initiate a process for creating a bookmark associated with the audiobook file. Second bookmark user interface object 810*c* corresponds to the bookmark created in response to tap gesture 850*c*.

At FIG. 8D, second bookmark user interface object 810*c* includes information identifying the bookmark created in response to tap gesture 850*c*. Second user interface object 810*c* includes audiobook portion indicator 812 (e.g., "Chapter 1: Childhood"), time stamp 814, and text 816 corresponding to speech of the audio at and/or near the time associated with the bookmark (e.g., the time when tap gesture 850*c* is detected).

Text 816 of the second bookmark user interface object 810*c* includes text corresponding to speech of the audio at and/or near the time when electronic device 600 detects tap gesture 850*c*. At FIG. 8D, text 816 includes a visual indication of speech of the audio that is configured to be output at the time associated with bookmark (e.g., 0:26 of Chapter 1). In some embodiments, text 816 displays words that precede and/or follow a particular word of speech of the audio that is configured to be output at the time associated with the bookmark. For example, tap gesture 850*c* is detected by electronic device at time 0:27 (e.g., as shown at FIGS. 8A and 8B). At time 0:27, the word "siblings" corresponding to speech of the audio is output, as indicated by outputted audio 606 at FIG. 8A. Therefore, text 816 of second bookmark user interface object 810*c* includes the word "siblings" as well as words preceding (e.g., "I grew up with three") and words following (e.g., "I had two older brothers and one . . . ") the word "sibling."

At FIG. 8D, time stamp 814 indicates a time for the bookmark that is earlier than the time at which tap gesture 850*c* is detected. For example, at FIG. 8A, the current time of playback of the audiobook file is at 0:27. As shown at FIG. 8A, outputted audio 606 illustrates the speech of the audio currently being output. Specifically, outputted audio 606 indicates that the word "siblings" is the current speech of the audio at time 0:27 (e.g., the current speech of the audio being played at time 0:27). The word "siblings" is in the middle of the sentence "I grew up with three siblings, I had two older brothers and one younger sister." Accordingly, time stamp 814 (e.g., 0:26) is associated with a time of the audiobook file that the word "I," at the beginning of the sentence that includes the word "siblings," is output. Thus, electronic device 600 initiates the process of creating a bookmark for a time associated with the beginning of a sentence that includes the word associated with the time of the audiobook file when tap gesture 850*c* is detected.

At FIG. 8D, electronic device 600 detects tap gesture 850*e* on second bookmark user interface object 810*c*. In response to detecting tap gesture 850*e*, electronic device 600 causes playback of the audiobook file at the time corresponding to the bookmark of second bookmark user interface object 810*c* (e.g., at time 0:26), as shown at FIG. 8E.

Figure 8E:
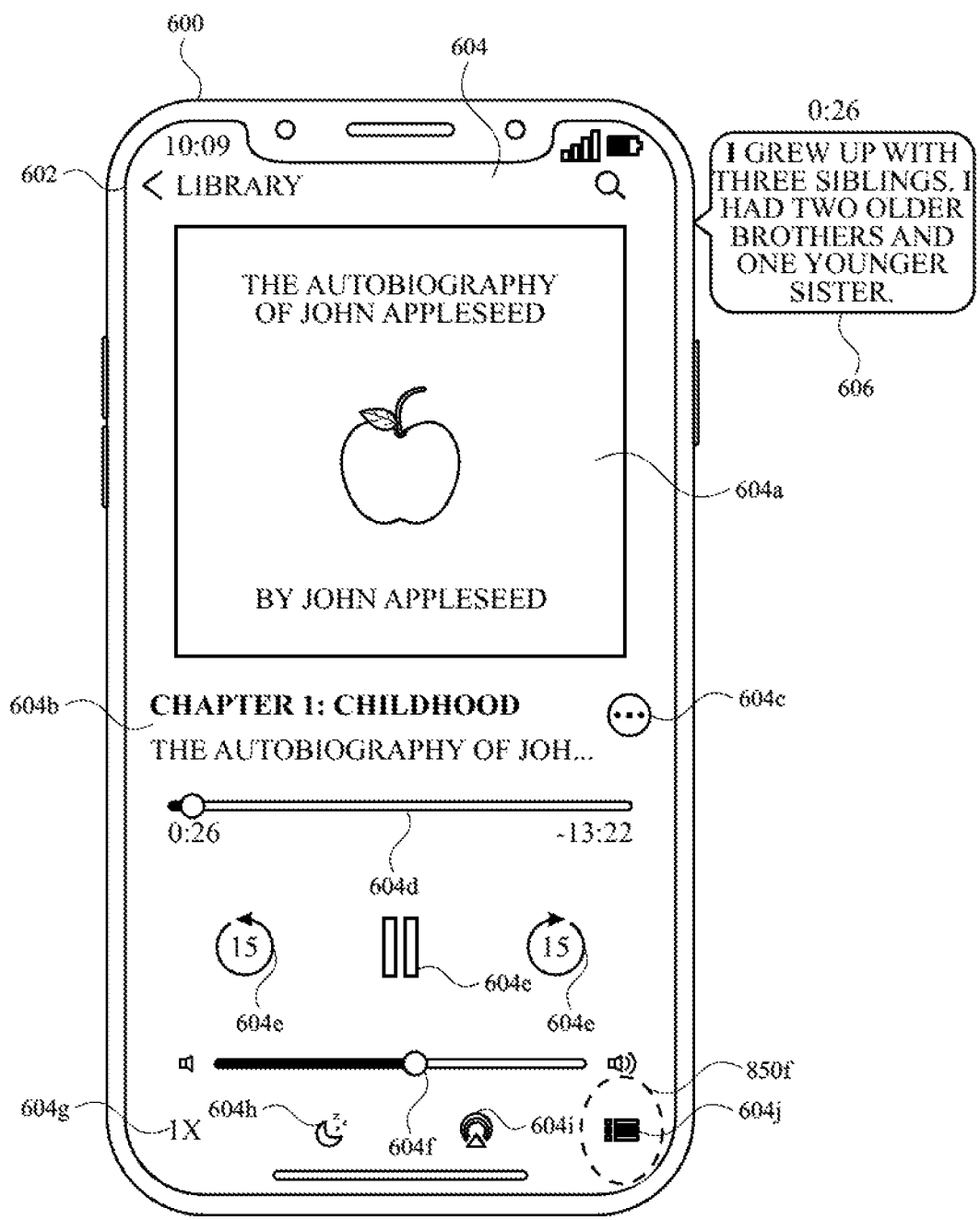

At FIG. 8E, electronic device 600 displays media playback user interface 604. Outputted audio 606 indicates that the word "I" corresponding to speech of the audio is output at time 0:26. Thus, selection of second bookmark user interface object 810*c* causes output of audio at the beginning of a structural component (e.g., a sentence or a paragraph) of speech of the audio. In some embodiments, selection of second bookmark user interface object 810*c* causes electronic device 600 to initiate output at the beginning of the structural component of speech of the audio regardless of when tap gesture 650*c* initiating creation of the bookmark occurs. In other words, electronic device 600 initiates playback of audio at a time associated with a beginning of the structural component in response to selection of second bookmark user interface object 810*c* even when tap gesture 650*c* was detected at a time associated with the middle of the structural component.

Initiating playback of the audio at the beginning of the structural component facilitates user comprehension of the audio by providing the user additional context related to the audio. For example, beginning playback of the audio in the middle of a sentence may cause confusion to the user because the user does not hear the entire context of the audio. Additionally, the user may select second bookmark user interface object 810c after pausing or otherwise not listening to the audio for a prolonged period of time (e.g., one day, one week, one month). As such, providing the additional context of the beginning of the structural component may refresh the user's memory and enable the user to better understand the portion of audio corresponding to the bookmark of second bookmark user interface object 810c.

Figure 8F:
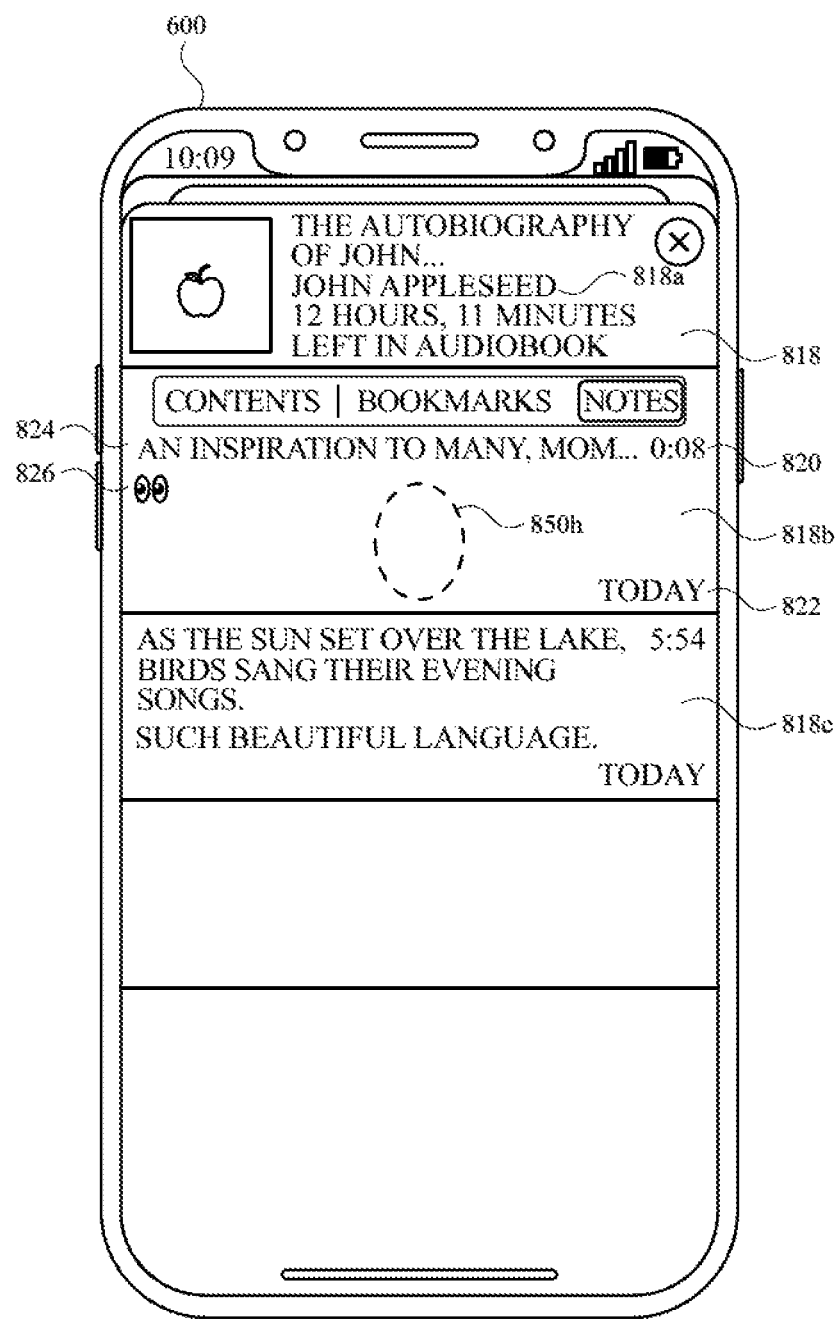

At FIG. 8E, electronic device 600 detects tap gesture 850f on table of contents user interface object 604j. In response to detecting tap gesture 850f, electronic device displays table of contents user interface 804, as shown at FIG. 8C. Further, electronic device 600 detects tap gesture 850g on notes tab 804d, as shown at FIG. 8C. In response to detecting tap gesture 850g, electronic device 600 displays notes user interface 818, as shown at FIG. 8F. In some embodiments, electronic device 600 displays notes user interface 818 in response to a voice command (e.g., "Hey Assistant, Open Notes").

At FIG. 8F, notes user interface 818 includes audiobook indicator 818a, first note user interface object 818b, and second note user interface object 818c. In some embodiments, electronic device 600 causes a note to be displayed in notes user interface 818 via user input (e.g., a tap and hold gesture) on one of bookmark user interface objects 810b-810e. In response to the user input, electronic device 600 enables the user to input a custom note (e.g., a note including alphanumeric characters, emoji characters, images, and/or videos input via a keyboard and/or selectable options) corresponding to the same portion of the audiobook file as the selected one of the bookmark user interface objects 810b-810e. In some embodiments, electronic device causes a note to be displayed in notes user interface 818 via user input (e.g., a voice command) that electronic device 600 detects and recognizes as a command for adding a new note.

At FIG. 8F, first note user interface object 818b corresponds to time 0:08 of the audiobook file. First note user interface object 818b includes time stamp 820 (e.g., corresponding to a time of the audiobook file for which the note relates), time indicator 822 (e.g., corresponding to a time when note was created, such as "Today"), text indicator 824 (e.g., text corresponding to speech of the audio at the time of the audiobook file associated with time stamp 820), and note indicator 826 (e.g., text, images, and/or videos input by the user).

Similar to bookmarks, a user may wish to listen to the audio associated with a note in notes user interface 818. Accordingly, electronic device 600 detects tap gesture 850h on first note user interface object 818b, as shown at FIG. 8F. In response to tap gesture 850h, electronic device 600 causes audio output of the audiobook at the time associated with first note user interface object 818b (e.g., time 0:08).

Figure 8G:
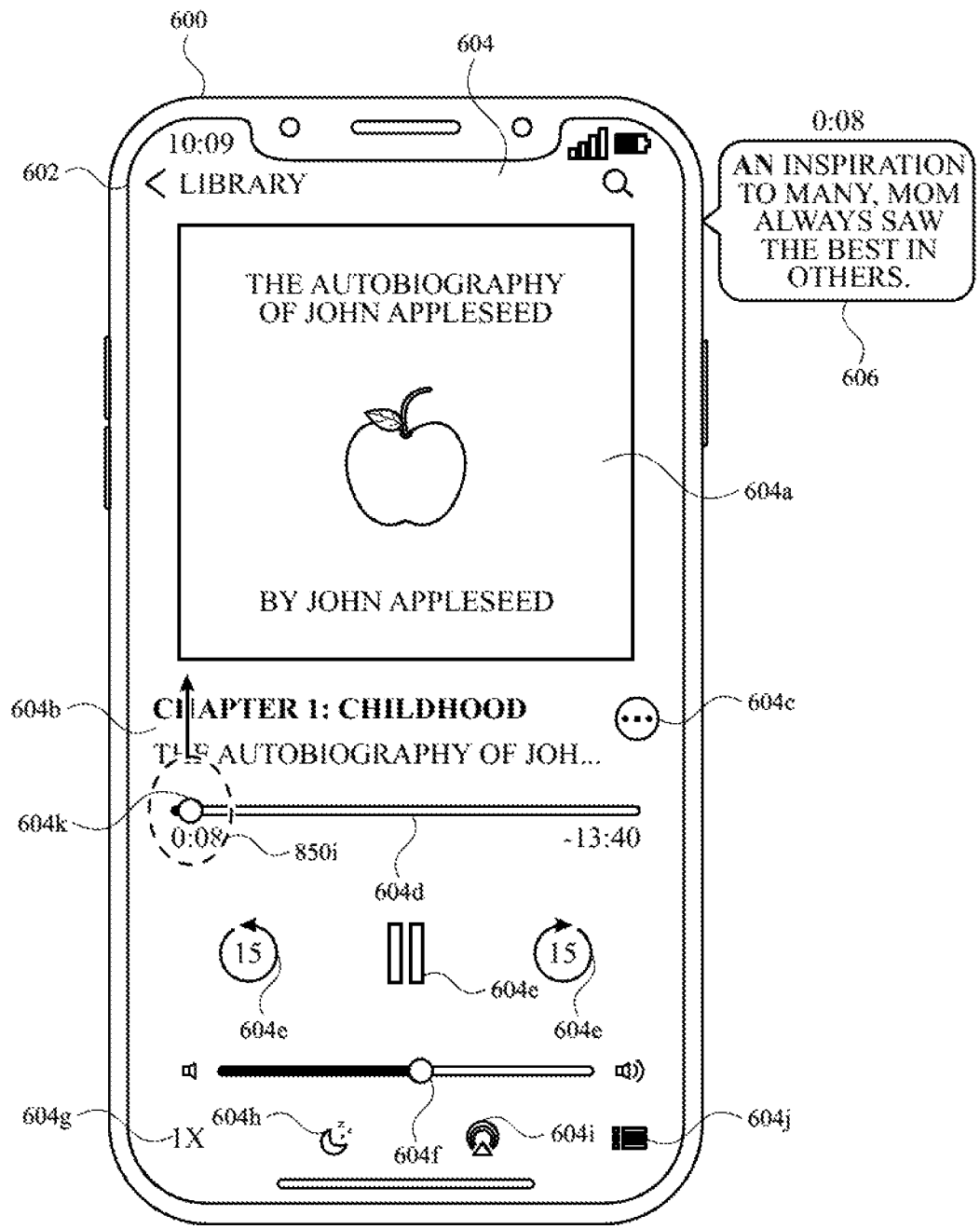

At FIG. 8G, electronic device 600 causes audio to be played back at the time associated with first note user interface object 818b. Outputted audio 606 of FIG. 8G illustrates text corresponding to speech of the audio at the time associated with first note user interface object 818b (e.g., "An inspiration to many, Mom always saw the best in others."). In some embodiments, electronic device 600 initiates audio output at the beginning of a structural component of the speech of the audio. In other words, even when the note associated with first note user interface object 818b is created at a time when speech of the audio is in the middle of the structural component, electronic device 600 initiates audio output at the beginning of the structural component. As set forth above, initiating audio output at the beginning of the structural component may facilitate user comprehension of the audio related to first note user interface object 818b.

At FIG. 8G, electronic device 600 detects user input 850i (e.g., an upward swipe gesture) on media playback user interface 604. In some embodiments, user input 850i is on thumb 604k of media playback user interface 604. In some embodiments, user input 850i is received at any position on media playback user interface 604. In response to detecting user input 850i, electronic device 600 initiates a process for creating a bookmark.

Figure 8H:
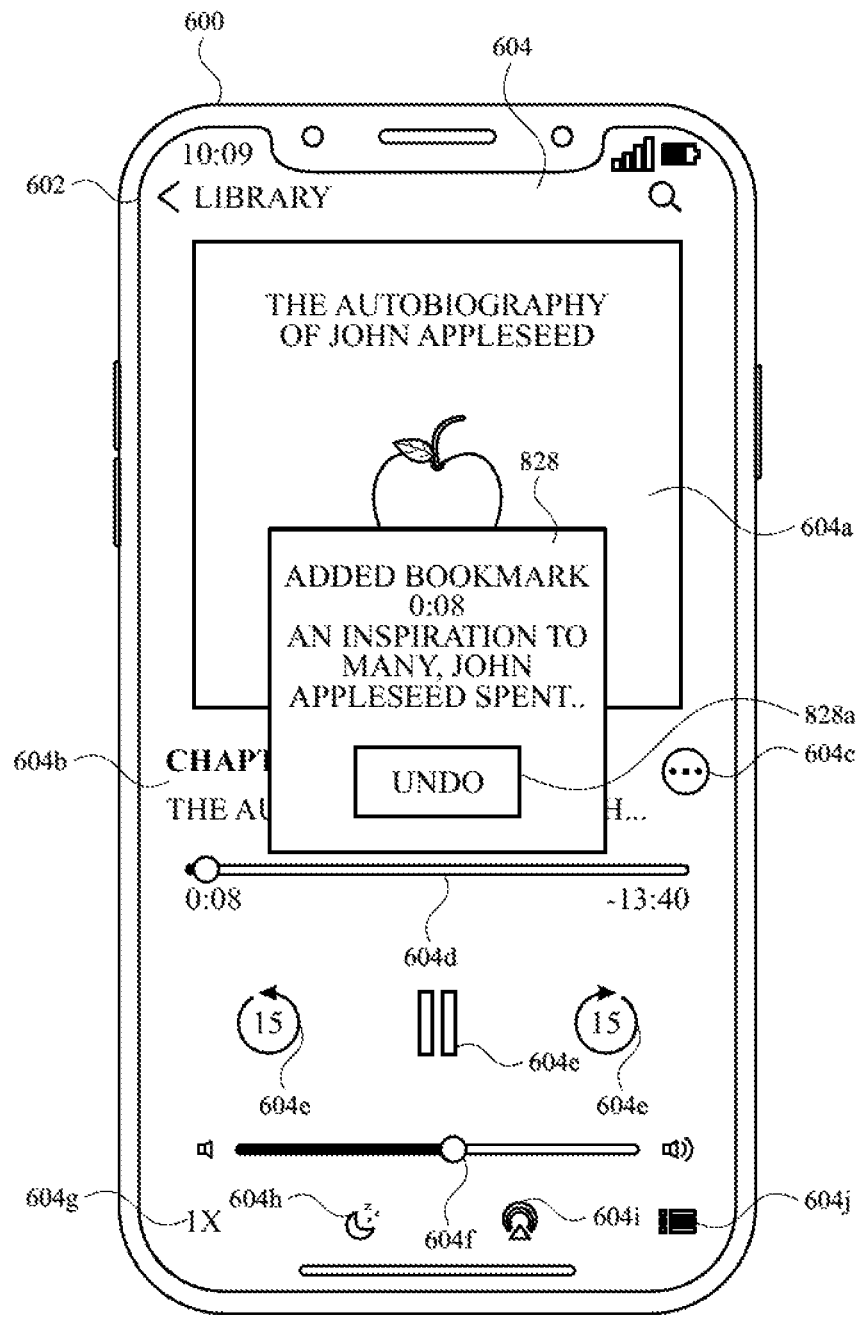

At FIG. 8H, in response to detecting user input 850i, electronic device 600 displays notification 828 indicating that the process for creating a bookmark has been initiated at the time of audiobook file when user input 850i is detected (e.g., time 0:08). In some embodiments, electronic device 600 ceases to display notification 828 after a predetermined period of time (e.g., 1 second, 5 seconds). In some embodiments, electronic device 600 ceases to display notification 828 in response to user input on media playback user interface 604.

In some embodiments, notification 828 includes undo user interface object 828a, as shown at FIG. 8H. In response to detecting user input (e.g., a tap gesture) on undo user interface object 828a, electronic device 600 terminates the process for creating the bookmark and does not add a new bookmark user interface object to bookmark user interface 810. Therefore, a user that inadvertently inputs user input 850i may cancel the creation of a bookmark, thereby preventing a bookmark user interface object to be included in bookmark user interface 810 that was not intended by the user. In the absence of user input on undo user interface object 828a, electronic device 600 creates a bookmark and adds a bookmark user interface object to bookmark user interface 810 at a time of the audiobook file when user input 850i was detected (e.g., time 0:08).

Figure 8I:
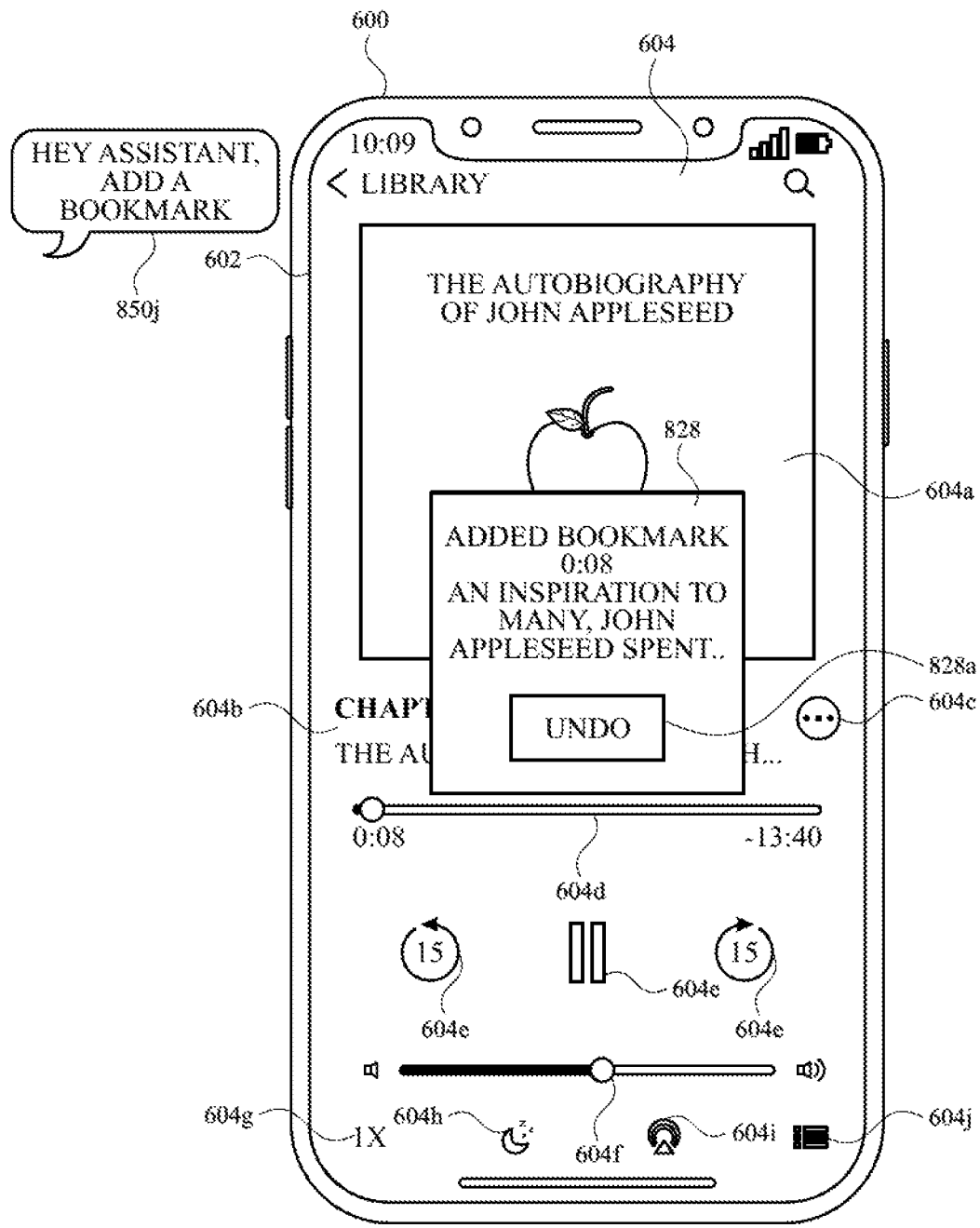

Turning now to FIG. 8I, electronic device 600 may also initiate the process for creating a bookmark in response to voice commands. At FIG. 8I, electronic device detects voice command 850j (e.g., "Hey Assistant, Add a Bookmark"). In response to detecting voice command 850j, electronic device 600 displays notification 828 on media playback user interface 604 indicating that electronic device 600 detected voice command 850j and initiated the process for creating a bookmark. As set forth above, in some embodiments, notification 828 includes undo user interface object 828a that, when selected, causes electronic device 600 to terminate creation of the bookmark.

FIG. 9 is a flow diagram illustrating a method for managing bookmarks of an audio file using an electronic device in accordance with some embodiments. Method 900 is performed at a computer system (e.g., 100, 300, 500, 600) with a display generation component and one or more input devices. Some operations in method 900 are, optionally, combined, the orders of some operations are, optionally, changed, and some operations are, optionally, omitted.

As described below, method 900 provides an intuitive way for managing bookmarks of an audio file. The method reduces the cognitive burden on a user for accessing and/or finding a particular portion of the audio file, thereby creating a more efficient human-machine interface. For battery-operated computing devices, enabling a user to access a particular portion of the audio file faster and more efficiently conserves power and increases the time between battery charges.

In method 900, the computer system (e.g., 600) (e.g., a smart phone; a tablet computer; a personal computer; an electronic document reader) is in communication with a display generation component (e.g., 602) (e.g., an integrated display, a connected (e.g., wirelessly) display) and one or more input devices (e.g., a touch-sensitive surface (e.g., a touchscreen); a mouse). The computer system (e.g., 600) displays (902), via the display generation component, a media playback interface (e.g., 604) (e.g., an interface of an audiobook playback application) (e.g., that includes a set of one or more media playback control user interface objects).

While the media playback interface (e.g., 604) is configured to control playback of a first media item (904) (e.g., an audiobook; a vocal recording), the first media item includes audio content that includes speech (e.g., recorded human speech; synthesized speech), the computer system (e.g., 600) displays (906), via the display generation component (e.g., 602), a selectable playback bookmark indicator (e.g., 810*b*, 810*c*, 810*d*, and/or 810*e*). While the media playback interface is configured to control playback of the first media item (904), the computer system (e.g., 600) detects (908), via the one or more input devices, a first user input (e.g., 850*e*) corresponding to the selectable playback bookmark indicator (e.g., 810*b*, 810*c*, 810*d*, and/or 810*e*). In some embodiments, the selectable playback bookmark indicator (e.g., 810*b*, 810*c*, 810*d*, and/or 810*e*) is one of a plurality of selectable playback position bookmark indicators.

In response to detecting the first user input (e.g., 850*e*), the computer system (e.g., 600) outputs audio content of the first media item from a first playback time (a time measured in hours, minutes, and/or seconds within the overall playback time of the first media item) that corresponds to (e.g., matches) speech that is at a start of a first instance of a grammatical structure of a first type (e.g., a sentence; a paragraph). The grammatical structure of the first type includes a plurality of words. In some embodiments, outputting the audio content includes initiating output of audio content while no audio is being outputted. In some embodiments, outputting the audio content includes skipping to the first playback time, while audio was already being outputted.

Outputting audio content of the first media item from a first playback time that corresponds to speech that is at a start of a first instance of a grammatical structure provides improved audio feedback to the user. For example, the start of the first instance of the grammatical structure enables the user to obtain additional context for the remaining portion of the grammatical structure. Providing improved audio feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, prior to the computer system (e.g., 600) displaying the selectable playback bookmark indicator (e.g., 810*b*, 810*c*, 810*d*, and/or 810*e*) and while the computer system (e.g., 600) outputs audio content of the first media item at a second playback time or while the media playback interface (e.g., 604) is configured to output audio content of the first media item at the second playback time (e.g., while playback is paused at the second playback time), the computer system (e.g., 600) detects, via the one or more input devices, a second user input (e.g., an input corresponding to a request to create a bookmark). In response to detecting the second user input, the computer system (e.g., 600) creates a playback bookmark that corresponds to the selectable playback bookmark indicator (e.g., 810*b*, 810*c*, 810*d*, and/or 810*e*). The second playback time is different from the first playback time. In some embodiments, the second playback time corresponds to speech that is a part of the first instance of the grammatical structure of the first type other than the start.

In some embodiments, the second user input includes a flick gesture (e.g., 850*i*) (e.g., a contact followed by a quick movement and lift-off of the contact). In some embodiments, the second user input includes selection of a selectable bookmark creation user interface object.

Creating a playback bookmark in response to detecting the flick gesture reduces the number of inputs required by a user. Reducing the number of inputs needed enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first user input is a voice input (e.g., a spoken command) detected by one or more microphones in connection with the computer system (e.g., 600).

In some embodiments, the computer system (e.g., 600) displays the selectable playback bookmark indicator (e.g., 810*b*, 810*c*, 810*d*, and/or 810*e*) by displaying text (e.g., 816) corresponding to the first playback time (e.g., at the first playback time; text of a sentence that starts at the first playback time).

Displaying the selectable playback bookmark indicator having text corresponding to the first playback time provides improved visual feedback to the user. For example, a user may easily view the text and determine which bookmark they are seeking, thereby reducing a time that the user spends searching for a particular bookmark. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) detects, via the one or more input devices, a third user input, wherein the third user input is a voice input (e.g., a spoken command) detected by one or more microphones in connection with the computer system. In response to detecting the third user input, the computer system (e.g., 600) creates a note (e.g., a text string) corresponding to the selectable playback bookmark indicator (e.g., 810*b*, 810*c*, 810*d*, and/or 810*e*).

In some embodiments, the selectable playback bookmark indicator (e.g., 810*b*, 810*c*, 810*d*, and/or 810*e*) is displayed in a first portion (e.g., 810) of the media playback interface (e.g., 604). In addition, the computer system (e.g., 600) displays, via the display generation component (e.g., 602), a note user interface object (e.g., 818*b* and/or 818*c*) that includes user-entered text (e.g., 826) that corresponds to the first media item. The note user interface object (e.g., 818*b* and/or 818*c*) is displayed in a second portion (e.g., 818) of the media playback interface (e.g., 604) that is visibly distinct from the first portion (e.g., 810) of the media playback interface (e.g., 604) (e.g., in a different tab or different interface page or screen of the media playback interface).

In some embodiments, the computer system (e.g., 600) detects, via the one or more input devices, a fourth user input (e.g., 850*h*) corresponding to the note user interface object (e.g., 818*b* and/or 818*c*). In response to detecting the fourth user input (e.g., 850*h*), the computer system (e.g., 600) outputs audio content of the first media item from a third playback time (a time measured in hours, minutes, and/or seconds within the overall playback time of the first media item) that corresponds to (e.g., matches) speech that is at the start of a first instance of a grammatical structure of a second type (e.g., a sentence; a paragraph) (e.g., that is different than the first type; that is the same as the first type). The grammatical structure of the second type includes a plurality of words. In some embodiments, outputting the audio content includes initiating output of audio content while no audio is being outputted. In some embodiments, outputting the audio content includes skipping to the third playback time, while audio was already being outputted.

In some embodiments, the first media item does not include pre-generated text data corresponding to speech of the audio content. In some embodiments, the first media item is received at the computer system (e.g., 600) (e.g., downloaded) without text data corresponding to speech of the audio content included in the media item or received in conjunction with the media item. In some embodiments, the first text is determined (e.g., generated for display) using one or more speech-to-text functions directly from the audio content of the first media item.

Note that details of the processes described above with respect to method 900 (e.g., FIG. 9) are also applicable in an analogous manner to the methods described below/above. For example, methods 700 and 1100 optionally include one or more of the characteristics of the various methods described above with reference to method 900.

FIGS. 10A-10E illustrate exemplary user interfaces for searching for text corresponding to speech of an audio file, in accordance with some embodiments. The user interfaces in these figures are used to illustrate the processes described below, including the processes in FIG. 11.

Figure 10A:
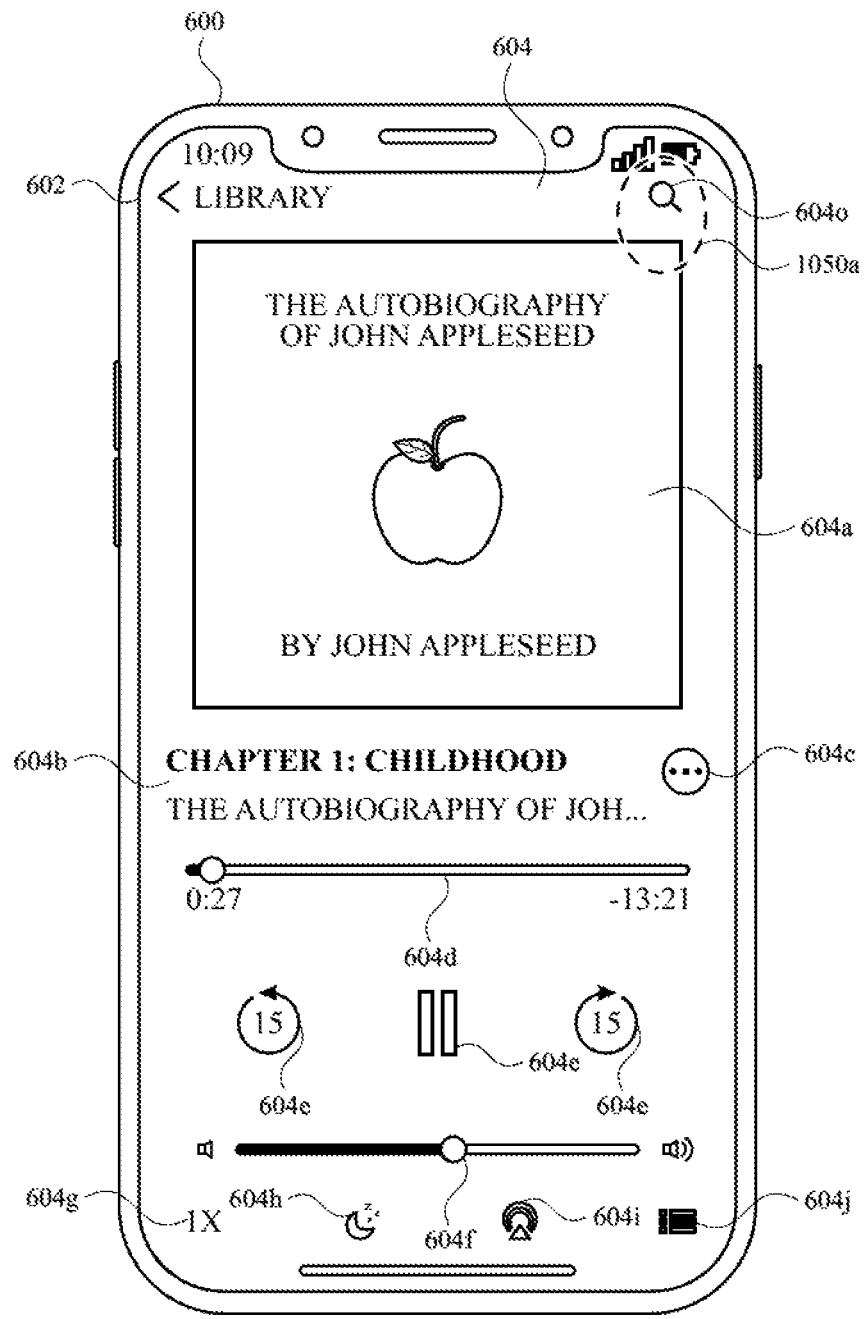
FIGS. 10A-10E illustrate exemplary user interfaces for searching for text corresponding to speech of an audio file in accordance with some embodiments.
Figure 11:
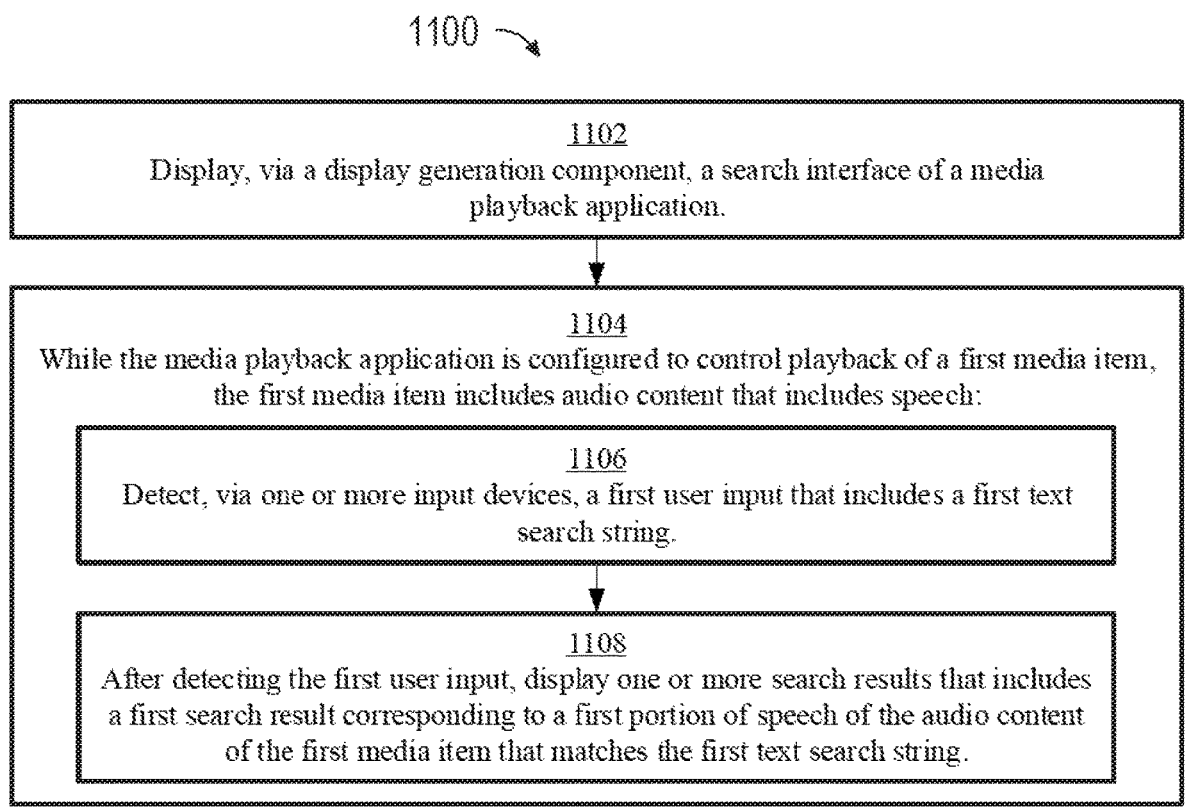
FIG. 11 is a flow diagram illustrating a method for searching for text corresponding to speech of an audio file in accordance with some embodiments.

FIG. 10A illustrates electronic device 600 (e.g., a smartphone) with display 602 (e.g., touch screen). At FIG. 10A, electronic device 600 displays, on display 602, media playback user interface 604 associated with the media application (e.g., a books application, an audiobooks application) of electronic device 600.

A user of electronic device 600 may wish to search for a specific portion of an audio file configured to be played back via media playback user interface 604. For example, a user may wish to find and cause playback of an audio file at a particular portion of the audio file that includes specific dialogue and/or lyrics. Media playback user interface 604 includes features that facilitate a user's ability to find and cause playback of particular portions of an audio file via a search for text of speech of the audio associated with the audio file.

In some embodiments, audio files accessible by electronic device 600 do not include pre-generated text data corresponding to the speech of the audio files. In other words, the audio files do not include metadata, embedded data, and/or any associated data including the text of the speech. As such, electronic device 600 (or an external device in communication with electronic device 600) performs speech recognition (e.g., transcription) of the audio files to generate text corresponding to speech in the audio files. In some embodiments, speech recognition is performed in real time (e.g., while electronic device 600 outputs audio of an audio file), at the time when a particular audio file is selected for control via media playback user interface 604, and/or at the time when an audio file is stored on electronic device 600 (e.g., in memory of electronic device 600 and/or in a cloud).

At FIG. 10A, media playback user interface 604 controls playback of audio of an audiobook file (e.g., an audiobook file corresponding to an audiobook entitled "The Autobiography of John Appleseed"). At FIG. 10A, media playback user interface 604 includes audiobook indicator 604*a* (e.g., an image of a book cover of an audiobook associated with the audiobook file, text identifying the audiobook file, and/or another visual indication of the audiobook), now playing indicator 604*b* (e.g., text indicating a chapter or portion of the selected audiobook file (e.g., the audiobook file currently playing) and/or text indicating a title of the selected audiobook file), settings user interface object 604*c*, scrubber bar 604*d*, audio control user interface objects 604*e*, volume control user interface object 604*f*, audio speed user interface object 604*g*, sleep setting user interface object 604*h*, share audio user interface object 604*i*, table of contents user interface object 604*j*, and/or search user interface object 604*o*.

At FIG. 10A, electronic device 600 detects tap gesture 1050*a* on search user interface object 604*o*. In response to detecting tap gesture 1050*a* on search user interface object 604*o*, electronic device 600 displays search user interface 1002, as shown at FIG. 10B.

Figure 10B:
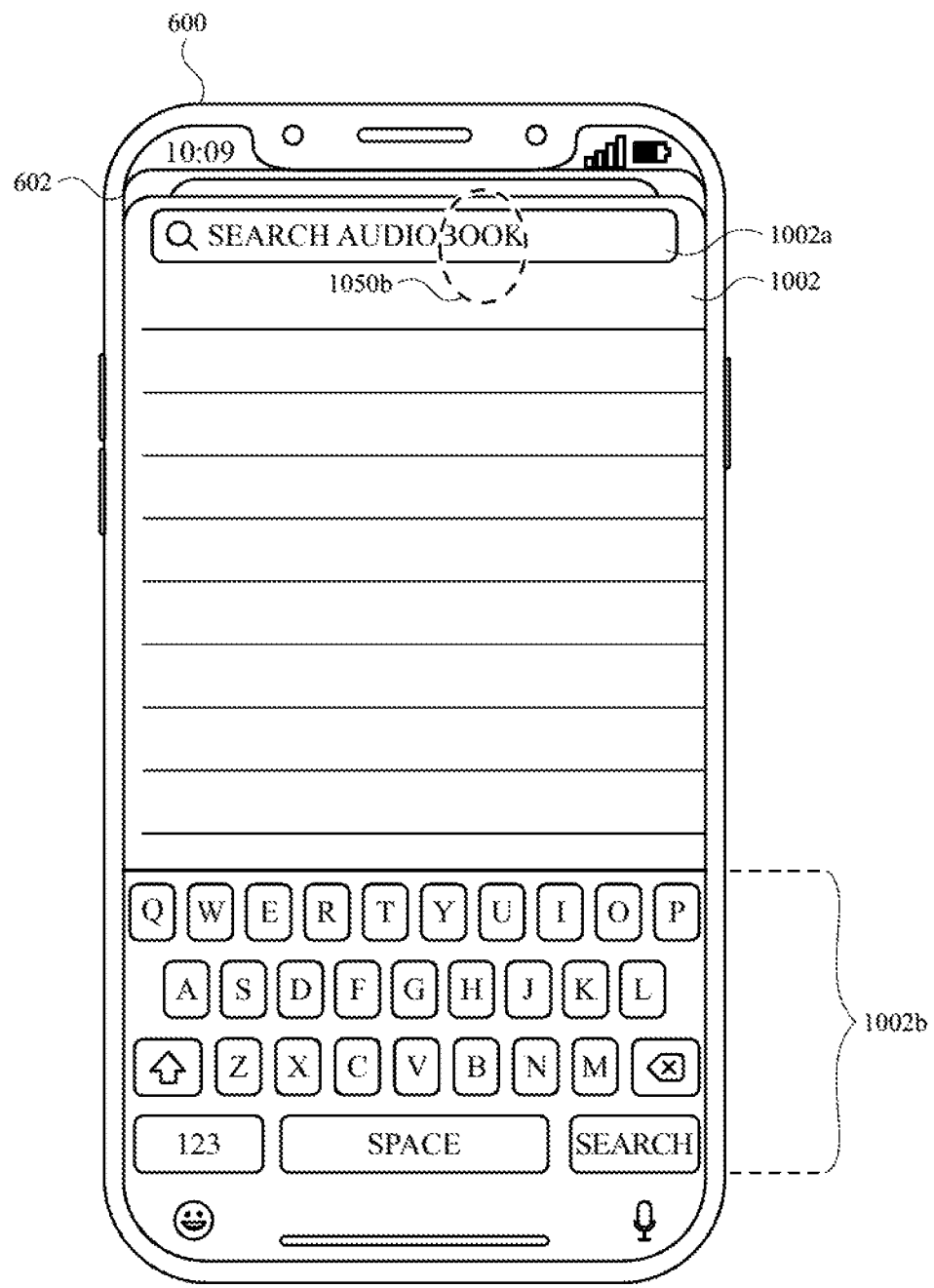

At FIG. 10B, search user interface 1002 includes search bar 1002*a* and keyboard 1002*b*. At FIG. 10B, electronic device 600 detects tap gesture 1050*b* on search bar 1002*a*. In response to detecting tap gesture 1050*b*, electronic device 600 enables a user to input a search term or text into search bar 1002*a*. For example, after detecting tap gesture 1050*b*, electronic device 600 detects one or more user inputs (e.g., tap gestures and/or swipe gestures) on keyboard 1002*b* and displays text in search bar 1002*a* that corresponds to characters selected on keyboard 1002*b*.

Figure 10C:
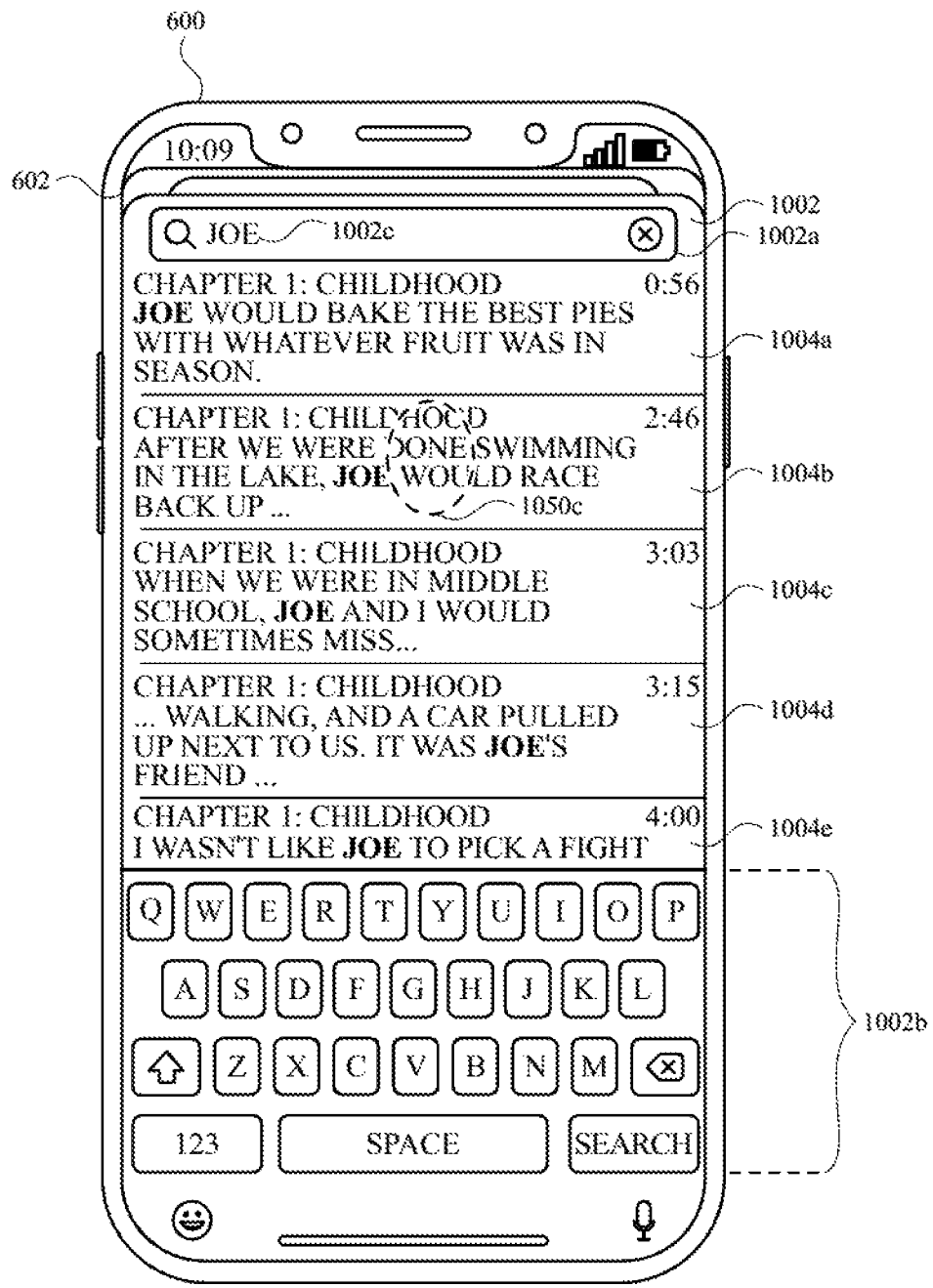

At FIG. 10C, electronic device 600 displays search term 1002*c* (e.g., "Joe"). Accordingly, after detecting tap gesture 1050*b*, electronic device 600 detects user inputs on keyboard 1002*b* corresponding to the characters "J," "O," and "E."

Additionally, at FIG. 10C, electronic device 600 displays search results associated with search term 1002*c* in search results area 1004. Search results area 1004 includes first result user interface object 1004*a*, second result user interface object 1004*b*, third result user interface object 1004*c*, fourth result user interface object 1004*d*, and fifth result user interface object 1004*e* (e.g., a partial view of fifth result user interface object 1004*e*). Each of the search results displayed in search result area 1004 include search term 1002*c*. Further, each result user interface object 1004*a*-1004*e* emphasizes search term 1002*c* as bolded text. Emphasizing search term 1002*c* in each result user interface object 1004*a*-1004*e* enables a user to quickly identify search term 1002*c* within the search results and determine which search result corresponds to the desired portion of the audiobook file that the user is seeking.

In some embodiments, electronic device 600 performs a search of text corresponding to speech of audio of the audiobook file using the text generated via speech recognition. Accordingly, electronic device 600 compares search term 1002*c* to text corresponding to speech of the audio of the audiobook file to determine search results represented by result user interface objects 1004*a*-1004*e*. In some embodiments, electronic device 600 causes speech recognition to be performed in response to detecting tap gesture 1050*b* and/or in response to detecting a first user input on keyboard 1002*b*. In some embodiments, electronic device 600 updates search results represented by result user interface objects as additional user inputs are detected by electronic device 600 on keyboard 1002*b*.

At FIG. 10C, result user interface objects 1004*a*-1004*e* include additional information that enables a user to quickly identify which search result corresponds to the desired portion of the audiobook file. At FIG. 10C, result user interface objects 1004*a*-1004*e* each include time indicator 1006 (e.g., a time associated with audio output of the search term and/or a time associated with a beginning of a structural component (e.g., a sentence or a paragraph) including the search term) and/or portion indicator 1008 (e.g., text indicating the chapter and/or section of the audiobook file including the search term). In some embodiments, time indicator 1006 includes a time associated with a portion of the audiobook file when search term 1002*c* corresponding to speech of the audio is output. In some embodiments, time indicator includes a time associated with a portion of the audiobook file when a beginning of a structural component (e.g., a sentence or paragraph) that includes search term 1002*c* corresponding to speech of the audio is output. Time indicator 1006 provides user with an indication as to when (e.g., a time at or near) in the audiobook file search term 1002*c* occurs. Additionally, portion indicator 1008 provides user with an indication as to a portion (e.g., a chapter and/or section) of the audiobook file where search term 1002*c* occurs.

Further, result user interface objects 1004*a*-1004*e* include accompanying text 1010 in addition to search term 1002*c*. Accompanying text 1010 includes text (e.g., words) corresponding to speech of the audio near the time of the audiobook file associated with search term 1002*c* (e.g., a time of the audiobook file when search term 1002*c* corresponding to speech of audio is output by electronic device). Accordingly, accompanying text 1010 includes words that precede and/or follow search term 1002*c* in speech of the audio of the audiobook file. Accompanying text 1010 may thus display additional context for search term 1002*c*, such that the user can select a search result (e.g., one of result user interface objects 1004*a*-1004*e*) that matches the portion of audiobook file for which user was searching.

In some embodiments, accompanying text 1010 includes at least one terminus (e.g., a beginning and/or an end) of a structural component (e.g., a sentence) having search term 1002*c*. At FIG. 10C, first result user interface object 1004*a*, second result user interface object 1004*b*, third result user interface object 1004*c*, and fifth result user interface object 1004*e* include accompanying text 1010 having a beginning of the structural component (e.g., the sentence) that includes search term 1002*c*. In some embodiments, result user interface objects 1004*a*-1004*e* include the at least one terminus of the structural component having search term 1002*c*, as well as search term 1002*c* and additional text corresponding to speech of the audio of audiobook file. The additional text corresponding to speech of the audio of the audiobook file may include as many words that fit within a predetermined size of result user interface objects 1004*a*-1004*e*. Additionally, at FIG. 10C, fourth result user interface object 1002*d* includes an end of the structural component (e.g., the sentence) including search term 1002*c*. As such, in some embodiments, electronic device 600 displays accompanying text 1010 with the beginning of the structural component having search term 1002*c* and/or the end of the structural component having search term 1002*c* based on where in the structural component search term 1002*c* is included (e.g., towards a beginning half or towards an ending half of structural component). In some embodiments, accompanying text 1010 does not include a terminus of the structural component.

In some embodiments, search user interface 1002 is scrollable (e.g., via user input), such that electronic device 600 is configured to display additional result user interface objects in response to user input (e.g., a swipe gesture). In some embodiments, search user interface 1002 includes result user interface objects for all instances of search term 1002*c*, but displays a predetermined amount of result user interface objects at a given time. As such, electronic device 600 displays additional result user interface objects in response to user input (e.g., a scroll gesture). In some embodiments, electronic device 600 displays result user interface objects in chronological order (e.g., in chronological order associated with a time of audiobook file at which search term 1002*c* and/or a structural component including search term 1002*c* corresponding to speech of the audio is configured to be output).

In some embodiments, electronic device 600 detects user input (e.g., a tap and hold gesture) on one of result user interface objects 1004*a*-1004*e*. In response to detecting user input, electronic device 600 initiates a process to create a bookmark for the search result represented by the selected user interface object, as discussed above with reference to FIGS. 8A-8I.

At FIG. 10C, electronic device 600 detects tap gesture 1050*c* on second result user interface object 1004*b*. In response to detecting tap gesture 1050*c* on second result user interface object 1004*b*, electronic device 600 causes audio to be output, as shown at FIG. 10D.

Figure 10D:
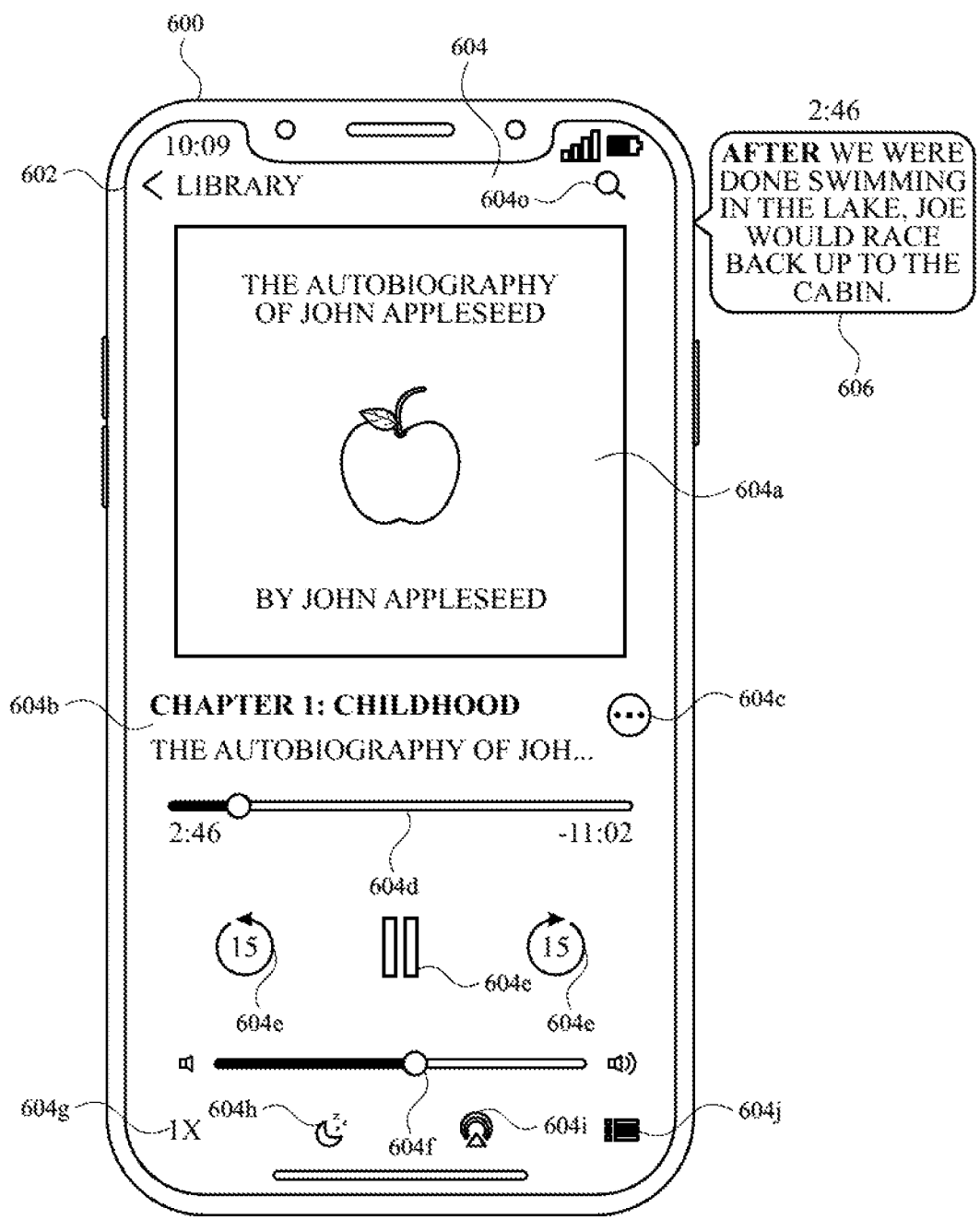
Figure 10E:
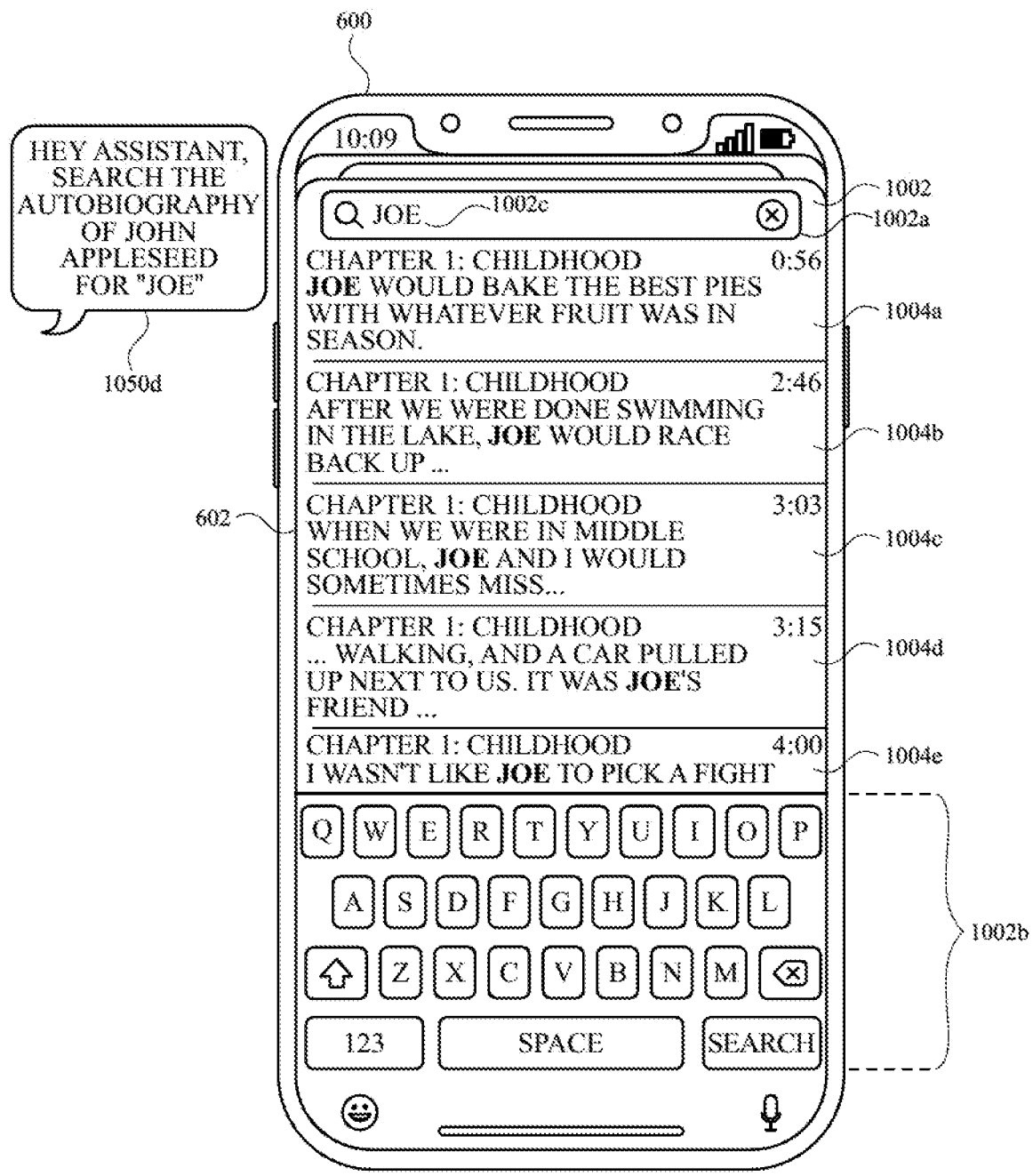

At FIG. 10D, outputted audio 606 includes text corresponding to speech of the audio that is output by electronic device 600 (e.g., output via internal speakers of electronic device 600 and/or via external speakers in communication with electronic device 600). As shown at FIG. 10D, outputted audio 606 emphasizes the word "After" at the beginning of the structural component (e.g., the sentence) including search term 1002*c* (e.g., "Joe"). Accordingly, electronic device 600 causes audio output to begin at the beginning of the structural component including search term 1002*c* in response to detecting tap gesture 1050*c*. In other words, in some embodiments, electronic device 600 does not cause audio output to begin at the time of the audiobook file when search term 1002*c* is configured to be output. Initiating audio output at the beginning of the structural component including search term 1002*c* facilitates user comprehension of the audio by providing the user with additional context for search term 1002*c* (e.g., the entire sentence including search term 1002*c*).

In some embodiments, electronic device 600 displays search user interface 1002, as well as search term 1002*c* in search bar 1002*a*, in response to detecting a voice command. At FIG. 10E, electronic device 600 detects voice command 1050*d* (e.g., "Hey Assistant, Search the Autobiography of John Appleseed for 'Joe'"). In response to detecting voice command 1050*d*, electronic device 600 displays search user interface 1002, search term 1002*c* in search bar 1002*a*, and result user interface objects 1004*a*-1004*e* corresponding to search term 1002*c*. Thus, electronic device 600 is configured to search the audiobook file in response to detecting both inputs from keyboard 1002*b* as well as voice command 1050*d*.

FIG. 11 is a flow diagram illustrating a method for searching text corresponding to speech of an audio file using an electronic device in accordance with some embodiments. Method 1100 is performed at a computer system (e.g., 100, 300, 500, 600) with a display generation component and one or more input devices. Some operations in method 1100 are, optionally, combined, the orders of some operations are, optionally, changed, and some operations are, optionally, omitted.

As described below, method 1100 provides an intuitive way for searching text corresponding to speech of an audio file. The method reduces the cognitive burden on a user for accessing and/or finding a particular portion of the audio file, thereby creating a more efficient human-machine interface. For battery-operated computing devices, enabling a user to access a particular portion of the audio file faster and more efficiently conserves power and increases the time between battery charges.

In method 1100, the computer system (e.g., 600) (e.g., a smart phone; a tablet computer; a personal computer; an electronic document reader) is in communication with a display generation component (e.g., 602) (e.g., an integrated display, a connected (e.g., wirelessly) display) and one or more input devices (e.g., a touch-sensitive surface (e.g., a touchscreen); a mouse). The computer system (e.g., 600) displays (1102), via the display generation component (e.g., 602), a search interface (e.g., 1002) of a media playback application (e.g., an interface of an audiobook playback application) (e.g., that includes a set of one or more media playback control user interface objects).

While the media playback application is configured to control playback of a first media item (1104) (e.g., an audiobook; a vocal recording), the first media item includes audio content that includes speech (e.g., recorded human speech; synthesized speech), the computer system (e.g., 600) detects (1106) via the one or more input devices, a first user input (e.g., 1050*b*) (e.g., a keyboard input; a voice input processed via speech-to-text) that includes a first text search string (e.g., 1002*c*) (e.g., a single word; a plurality of words (e.g., a phrase)).

After (e.g., and in response to) detecting the first user input (e.g., 1050*b*), the computer system (e.g., 600) displays (1108) one or more search results (e.g., 1004*a*, 1004*b*, 1004*c*, 1004*d*, and/or 1004*e*) that includes a first search result (e.g., 1004*b*) corresponding to a first portion of speech of the audio content of the first media item that matches (e.g., that includes) the first text search string (e.g., 1002*c*).

Enabling a user to search for speech of the audio content that matches the first text search string reduces the number of inputs needed by the user to access a particular portion of the audio content. For example, instead of attempting to locate a portion of the audio content via skipping, the user may easily find a particular portion of the audio content by searching with the first text search string. Reducing the number of inputs needed to access a particular portion of the audio content enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the computer system (e.g., 600) detects, via the one or more input devices, a second user input (e.g., 1050*c*) corresponding to the first search result (e.g., 1004*b*). In response to detecting the second user input (e.g., 1050*c*), the computer system (e.g., 600) outputs audio content of the first media item from a first playback time that corresponds to the first portion of speech of the audio content of the first media item. In some embodiments, outputting the audio content includes initiating output of audio content while no audio is being outputted. In some embodiments, outputting the audio content includes skipping to the first playback time, while audio was already being outputted.

In some embodiments, the first playback time corresponds to speech that is at a start of a first instance of a grammatical structure of a first type (e.g., a sentence; a paragraph). The grammatical structure of the first type includes a plurality of words. The first text search string (e.g., 1002*c*) matches one or more words in the first instance of the grammatical structure of the first type (e.g., matches one or more words in the sentence).

Outputting audio content of the first media item from a first playback time that corresponds to the first portion of speech that is at a start of a first instance of a grammatical structure provides improved audio feedback to the user. For example, the start of the first instance of the grammatical structure enables the user to obtain additional context for the remaining portion of the grammatical structure. Providing improved audio feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the first search result (e.g., 1004*b*) includes a textual representation of (e.g., text from) at least a portion of the first instance of the grammatical structure of the first type that includes the one or more words (e.g., 1002*c*) in the first instance of the grammatical structure of the first type. The one or more words (e.g., 1002*c*) in the first instance of the grammatical structure of the first type are visually emphasized (e.g., bolded, underlined) relative to the words (e.g., 1010) in the textual representation that do not match the first text search string (e.g., 1002*c*).

Displaying a textual representation of at least a portion of the first instance of the grammatical structure and emphasizing the one or more words in the first instance of the grammatical structure provides the improved visual feedback. For example, the user may quickly identify the one or more words that match the first text search string and also identify the particular portion of the audio content for which the user was searching. Providing improved visual feedback enhances the operability of the device and makes the user-device interface more efficient (e.g., by helping the user to provide proper inputs and reducing user mistakes when operating/interacting with the device) which, additionally, reduces power usage and improves battery life of the device by enabling the user to use the device more quickly and efficiently.

In some embodiments, the at least a portion of the first instance of the grammatical structure of the first type includes at least a start or at least an end of the first instance of the grammatical structure of the first type (e.g., a start or an end of the sentence).

In some embodiments, the first search result (e.g., 1004*b*) includes an indication of a location (e.g., 1006 and/or 1008) (e.g., a time stamp; a chapter identifier of an audiobook) within the first media item that corresponds to the first portion of speech of the audio content of the first media item that matches the first text search string (e.g., 1002*c*).

In some embodiments, the indication of the location is a first time stamp (e.g., 1006) (e.g., in hours, minutes, and/or seconds) that corresponds to speech that is at a start of a first instance of a grammatical structure of a second type (e.g., a sentence; a paragraph)(e.g., that is different from the first type; that is the same as the first type) that includes the first text string (e.g., 1002*c*). In some embodiments, the time stamp (e.g., 1006) is a start time associated with a sentence of the speech in the audio that includes the text.

In some embodiments, the indication of the location is a second time stamp (e.g., 1006) (e.g., in hours, minutes, and/or seconds) that corresponds to speech that matches the first text string (e.g., 1002*c*). In some embodiments, the time stamp is a time associated with the text of the speech in the audio.

In some embodiments, the one or more search results (e.g., 1004*a*, 1004*b*, 1004*c*, 1004*d*, and/or 1004*e*) includes results for all identified occurrences (e.g., identified via speech-to-text analysis) of the first text string (e.g., 1002*c*) in the speech of the audio content of the first media item. In some embodiments, a certain number of results may be initially displayed, and the results may be scrolled (e.g., via a swipe gesture) to display additional results. In some embodiments, the search results are chronologically ordered with respect to playback of the audio.

In some embodiments, the computer system (e.g., 600) detects, via the one or more input devices, a first set of one or more inputs that includes an input corresponding to the first search result (e.g., 1004*b*). In response to detecting the first set of one or more inputs, the computer system (e.g., 600) creates a playback bookmark that, when activated (e.g., via selection of a corresponding bookmark indication), causes output of audio content of the first media item from a first playback time that corresponds to the first portion of speech of the audio content of the first media item.

In some embodiments, the first user input is a voice input (e.g., a spoken command) detected by one or more microphones in connection with the computer system (e.g., 600).

In some embodiments, the first media item does not include pre-generated text data corresponding to speech of the audio content. In some embodiments, the first media item is received at the computer system (e.g., downloaded) without text data corresponding to speech of the audio content included in the media item or received in conjunction with the media item. In some embodiments, the first text is determined (e.g., generated for display) using one or more speech-to-text functions directly from the audio content of the first media item.

Note that details of the processes described above with respect to method 1100 (e.g., FIG. 11) are also applicable in an analogous manner to the methods described below/above. For example, methods 700 and 900 optionally include one or more of the characteristics of the various methods described above with reference to method 1100.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the techniques and their practical applications. Others skilled in the art are thereby enabled to best utilize the techniques and various embodiments with various modifications as are suited to the particular use contemplated.

Although the disclosure and examples have been fully described with reference to the accompanying drawings, it is to be noted that various changes and modifications will become apparent to those skilled in the art. Such changes and modifications are to be understood as being included within the scope of the disclosure and examples as defined by the claims.

As described above, one aspect of the present technology is the gathering and use of data available from various sources to improve management of audio content. The present disclosure contemplates that in some instances, this gathered data may include personal information data. Such personal information data can include email addresses and/or payment information.

The present disclosure recognizes that the use of such personal information data, in the present technology, can be used to the benefit of users. For example, the personal information data can be used to access audio content. Accordingly, use of such personal information data enables users to better manage audio content. Further, other uses for personal information data that benefit the user are also contemplated by the present disclosure.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of sharing audio content, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A computer system, comprising:
a display generation component;
one or more input devices;
one or more processors; and
memory storing one or more programs configured to be executed by the one or more processors, the one or more programs including instructions for:
displaying, via the display generation component, a media playback interface that includes a set of one or more media playback control user interface objects;
while the media playback interface is configured to control playback of a first media item, wherein the first media item includes audio content that includes speech, detecting a first user input;
in response to detecting the first user input:
displaying, via the display generation component, a first user interface that includes a selectable playback bookmark indicator associated with a first playback time of the first media item, wherein the first user interface is overlaid on at least a portion of the media playback interface and covers the set of one or more media playback control user interface objects;
detecting, via the one or more input devices, a second user input corresponding to the selectable playback bookmark indicator; and
in response to detecting the second user input, outputting audio content of the first media item from a second playback time;
while displaying the selectable playback bookmark indicator, detecting a third user input requesting to display a note user interface object; and
in response to detecting the third user input, displaying, via the display generation component, the note user interface object that includes user-entered text that corresponds to the first media item and includes a time indicator corresponding to a time of day and/or a date at which the note user interface object was created.

2. The computer system of claim 1, wherein the one or more programs further include instructions for:
prior to displaying the selectable playback bookmark indicator and while outputting audio content of the first media item at a third playback time or while the media playback interface is configured to output audio content of the first media item at the third playback time:
detecting, via the one or more input devices, a fourth user input; and
in response to detecting the fourth user input, creating a playback bookmark that corresponds to the selectable playback bookmark indicator;
wherein the third playback time is different from the second playback time.

3. The computer system of claim 2, wherein the fourth user input includes a flick gesture.

4. The computer system of claim 1, wherein the second user input is a voice input detected by one or more microphones in connection with the computer system.

5. The computer system of claim 1, wherein displaying the selectable playback bookmark indicator includes displaying text corresponding to the first playback time.

6. The computer system of claim 1, wherein the one or more programs further include instructions for:
detecting, via the one or more input devices, a fifth user input, wherein the fifth user input is a voice input detected by one or more microphones in connection with the computer system; and
in response to detecting the fifth user input, creating a note corresponding to the selectable playback bookmark indicator.

7. The computer system of claim 1, wherein the selectable playback bookmark indicator is displayed in a first portion of the first user interface, and
wherein the note user interface object is displayed in a second portion of the first user interface that is visibly distinct from the first portion of the first user interface.

8. The computer system of claim 1, wherein the one or more programs further include instructions for:
detecting, via the one or more input devices, a sixth user input corresponding to the note user interface object;
in response to detecting the sixth user input, outputting audio content of the first media item from a fourth playback time that corresponds to speech that is at the start of a first instance of a grammatical structure of a first type, wherein the grammatical structure of the first type includes a plurality of words.

9. The computer system of claim 1, wherein the first media item does not include pre-generated text data corresponding to speech of the audio content.

10. A non-transitory computer-readable storage medium storing one or more programs configured to be executed by one or more processors of a computer system that is in communication with a display generation component and one or more input devices, the one or more programs including instructions for:
displaying, via the display generation component, a media playback interface that includes a set of one or more media playback control user interface objects;
while the media playback interface is configured to control playback of a first media item, wherein the first media item includes audio content that includes speech, detecting a first user input;
in response to detecting the first user input:
displaying, via the display generation component, a first user interface that includes a selectable playback bookmark indicator associated with a first playback time of the first media item, wherein the first user interface is overlaid on at least a portion of the media playback interface and covers the set of one or more media playback control user interface objects;

detecting, via the one or more input devices, a second user input corresponding to the selectable playback bookmark indicator; and in response to detecting the second user input, outputting audio content of the first media item from a second playback time;

while displaying the selectable playback bookmark indicator, detecting a third user input requesting to display a note user interface object; and in response to detecting the third user input, displaying, via the display generation component, the note user interface object that includes user-entered text that corresponds to the first media item and includes a time indicator corresponding to a time of day and/or a date at which the note user interface object was created.

11. The non-transitory computer-readable storage medium of claim 10, wherein the one or more programs further include instructions for:

prior to displaying the selectable playback bookmark indicator and while outputting audio content of the first media item at a third playback time or while the media playback interface is configured to output audio content of the first media item at the third playback time:
detecting, via the one or more input devices, a fourth user input; and
in response to detecting the fourth user input, creating a playback bookmark that corresponds to the selectable playback bookmark indicator;
wherein the third playback time is different from the second playback time.

12. The non-transitory computer-readable storage medium of claim 11, wherein the fourth user input includes a flick gesture.

13. The non-transitory computer-readable storage medium of claim 10, wherein the second user input is a voice input detected by one or more microphones in connection with the computer system.

14. The non-transitory computer-readable storage medium of claim 10, wherein displaying the selectable playback bookmark indicator includes displaying text corresponding to the first playback time.

15. The non-transitory computer-readable storage medium of claim 10, wherein the one or more programs further include instructions for:

detecting, via the one or more input devices, a fifth user input, wherein the fifth user input is a voice input detected by one or more microphones in connection with the computer system; and in response to detecting the fifth user input, creating a note corresponding to the selectable playback bookmark indicator.

16. The non-transitory computer-readable storage medium of claim 10, wherein the selectable playback bookmark indicator is displayed in a first portion of the first user interface, and wherein the note user interface object is displayed in a second portion of the first user interface that is visibly distinct from the first portion of the first user interface.

17. The non-transitory computer-readable storage medium of claim 10, wherein the one or more programs further include instructions for:

detecting, via the one or more input devices, a sixth user input corresponding to the note user interface object;

in response to detecting the sixth user input, outputting audio content of the first media item from a fourth playback time that corresponds to speech that is at the start of a first instance of a grammatical structure of a first type, wherein the grammatical structure of the first type includes a plurality of words.

18. The non-transitory computer-readable storage medium of claim 10, wherein the first media item does not include pre-generated text data corresponding to speech of the audio content.

19. A method, comprising:

at a computer system that is in communication with a display generation component and one or more input devices:
displaying, via the display generation component, a media playback interface that includes a set of one or more media playback control user interface objects;
while the media playback interface is configured to control playback of a first media item, wherein the first media item includes audio content that includes speech, detecting a first user input
in response to detecting the first user input:
displaying, via the display generation component, a first user interface that includes a selectable playback bookmark indicator associated with a first playback time of the first media item, wherein the first user interface is overlaid on at least a portion of the media playback interface and covers the set of one or more media playback control user interface objects;
detecting, via the one or more input devices, a second user input corresponding to the selectable playback bookmark indicator; and
in response to detecting the second user input, outputting audio content of the first media item from a second playback time;
while displaying the selectable playback bookmark indicator, detecting a third user input requesting to display a note user interface object; and
in response to detecting the third user input, displaying, via the display generation component, the note user interface object that includes user-entered text that corresponds to the first media item and includes a time indicator corresponding to a time of day and/or a date at which the note user interface object was created.

20. The method of claim 19, further comprising:

prior to displaying the selectable playback bookmark indicator and while outputting audio content of the first media item at a third playback time or while the media playback interface is configured to output audio content of the first media item at the third playback time:
detecting, via the one or more input devices, a fourth user input; and
in response to detecting the fourth user input, creating a playback bookmark that corresponds to the selectable playback bookmark indicator;
wherein the third playback time is different from the second playback time.

21. The method of claim 20, wherein the fourth user input includes a flick gesture.

22. The method of claim 19, wherein the second user input is a voice input detected by one or more microphones in connection with the computer system.

23. The method of claim 19, wherein displaying the selectable playback bookmark indicator includes displaying text corresponding to the first playback time.

24. The method of claim 19, further comprising:
- detecting, via the one or more input devices, a fifth user input, wherein the fifth user input is a voice input detected by one or more microphones in connection with the computer system; and
- in response to detecting the fifth user input, creating a note corresponding to the selectable playback bookmark indicator.

25. The method of claim 19, wherein the selectable playback bookmark indicator is displayed in a first portion of the first user interface, and wherein the note user interface object is displayed in a second portion of the first user interface that is visibly distinct from the first portion of the first user interface.

26. The method of claim 19, further comprising:
- detecting, via the one or more input devices, a sixth user input corresponding to the note user interface object;
- in response to detecting the sixth user input, outputting audio content of the first media item from a fourth playback time that corresponds to speech that is at the start of a first instance of a grammatical structure of a first type, wherein the grammatical structure of the first type includes a plurality of words.

27. The method of claim 19, wherein the first media item does not include pre-generated text data corresponding to speech of the audio content.

\* \* \* \* \*